United States Patent
Moore et al.

(10) Patent No.: US 7,875,404 B2
(45) Date of Patent: Jan. 25, 2011

(54) MICROSTRUCTURES AND METHODS OF FABRICATION THEREOF

(75) Inventors: Christopher W. Moore, Maricopa, AZ (US); Jun Li, Norwood, MA (US); Paul Kohl, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 557 days.

(21) Appl. No.: 11/596,607

(22) PCT Filed: Jun. 30, 2005

(86) PCT No.: PCT/US2005/023746

§ 371 (c)(1),
(2), (4) Date: Feb. 6, 2008

(87) PCT Pub. No.: WO2006/014403

PCT Pub. Date: Feb. 9, 2006

(65) Prior Publication Data

US 2008/0241604 A1    Oct. 2, 2008

Related U.S. Application Data

(60) Provisional application No. 60/584,104, filed on Jun. 30, 2004.

(51) Int. Cl.
*H01M 8/10*    (2006.01)

(52) U.S. Cl. .......... 429/483; 429/523; 429/524
(58) Field of Classification Search .......... 429/483, 429/523, 524
See application file for complete search history.

(56) References Cited

U.S. PATENT DOCUMENTS

| | | | |
|---|---|---|---|
| 6,524,750 B1 * | 2/2003 | Mansuetto | 429/232 |
| 2002/0020053 A1 * | 2/2002 | Fonash et al. | 29/623.1 |
| 2004/0197629 A1 * | 10/2004 | Arishima et al. | 429/30 |
| 2004/0241520 A1 * | 12/2004 | Ha et al. | 429/33 |
| 2006/0046122 A1 * | 3/2006 | Chang et al. | 429/33 |
| 2006/0183809 A1 * | 8/2006 | Liu et al. | 521/27 |
| 2007/0015022 A1 * | 1/2007 | Chang et al. | 429/33 |
| 2007/0053826 A1 * | 3/2007 | Kim et al. | 423/512.1 |
| 2007/0134530 A1 * | 6/2007 | Nakamura et al. | 429/30 |
| 2007/0154763 A1 * | 7/2007 | Lee et al. | 429/33 |
| 2008/0187795 A1 * | 8/2008 | Highgate et al. | 429/15 |

OTHER PUBLICATIONS

Cha et al., "Performance of Proton Exchange Membrane Fuel Cell Electrodes Prepared by Direct Deposition of Ultrathin Platinum on the Membrane Surface", Journal of the Electrochemical Society, 146 (11) 4055-4060 (1999).*

* cited by examiner

*Primary Examiner*—Patrick Ryan
*Assistant Examiner*—Ladan Mohaddes
(74) *Attorney, Agent, or Firm*—Thomas, Kayden, Horstemeyer & Risley, LLP

(57) ABSTRACT

Fuel cells, fuel cell membranes, micro-fuel cells, and methods of fabricating each, are disclosed.

26 Claims, 27 Drawing Sheets

MICROSTRUCTURES AND METHODS OF FABRICATION THEREOF

CLAIM OF PRIORITY TO RELATED APPLICATION

This application claims priority to U.S. provisional application entitled "THIN-FILM MEMBRANES FOR FUEL CELLS" having Ser. No.: 60/584,104, filed on Jun. 30, 2004, which is entirely incorporated herein by reference.

STATEMENT REGARDING FEDERALLY SPONSORED RESEARCH OR DEVELOPMENT

The U.S. government may have a paid-up license in this invention(s) and the right in limited circumstances to require the patent owner to license others on reasonable terms as provided for by the terms of MDA awarded by DARPA (Grant # 1906Z18) of the U.S. Government.

TECHNICAL FIELD

The present invention(s) is generally to related fuel cells, and, more particularly, is related to fuel cell membranes, micro-fuel cells, and methods of making fuel cell membranes and micro-fuel cells.

BACKGROUND

Portable electronic devices, including those for mobile communications, microsensors, micro-electromechanical systems (MEMS), and microfluidic devices will benefit from advances in energy storage. The availability of power sources with higher energy density and lower cost will enable a wider range of usage and functionality. One possible higher energy density source is the fuel cell.

For electronic devices with small power requirements, microfabricated power sources, including fuel cells, are being investigated. Issues to consider include reducing size and weight, improving signal integrity with fewer interconnects, increasing processing efficiency, and lowering cost.

Some fuels of interest in micro-fuel cells for devices include hydrogen, methanol, and other hydrocarbons (e.g., ethylene glycol or formic acid). Hydrogen fuel cells and direct methanol fuel cells (DMFCs) operate at relatively low temperature (e.g., ambient to 120° C.). They employ a solid proton exchange membrane (PEM) to transport the protons from the anode to the cathode. Hydrogen can be stored as a pressured gas or in a metal hydride form. It requires humidification for high membrane conductivity.

A methanol-water mixture can be oxidized at the anode in either liquid or vapor form. Methanol is an attractive fuel because it can be stored as a liquid, is inexpensive, and has a high specific energy. Compared with other fuel cell systems, the liquid-feed DMFC is relatively simple and could be easily miniaturized since it does not need a fuel reformer, complicated humidification, or thermal management system. Furthermore, methanol has a high energy density in comparison with lithium polymer and lithium ion polymer batteries.

Proton exchange membranes can be used in low-temperature fuel cells that operate with either hydrogen or methanol. The solid membrane in conventional fuel cells is usually a perfluorinated polymer with sidechains terminating in sulfonic acid moieties, such as Nafion™. Membranes in PEM fuel cells generally contain water to keep the conductivity high. Methanol crossover causes a mixed potential and poisoning of the oxygen reduction reaction, leading to decreased performance. Therefore, there is a need in the industry to overcome at least some of the aforementioned inadequacies and deficiencies.

SUMMARY

Briefly described, embodiments of this disclosure, among others, include fuel cells, fuel cell membranes, micro-fuel cells, and methods of fabricating each. One exemplary fuel cell, among others, includes a membrane comprising a membrane material selected from organic conducting materials, inorganic conducting materials, and combinations thereof; a catalyst layer disposed on a first side of the membrane; and a concentrated methanol fuel having a concentration of greater than about 3M methanol.

Another exemplary fuel cell, among others, includes: a membrane comprising a membrane material selected from organic conducting materials, inorganic conducting materials, and combinations thereof, wherein the membrane has a thickness of about 0.01 to 10 μm, wherein the membrane has a permeability of about $10^{-8}$ to $10^{-14}$ g/cm*s*Torr.

Another exemplary fuel cell, among others, includes: a membrane comprising a membrane material selected from organic conducting materials, inorganic conducting materials, and combinations thereof, wherein the membrane includes at least a first membrane layer and a second membrane layer, wherein the first membrane layer is about 10 to 100 Å thick; and a catalyst layer disposed on a first side of the membrane, wherein the catalyst layer includes a plurality of layers of catalyst having the first layer of membrane material disposed between each layer of the catalyst.

Another exemplary micro-fuel cell, among others, includes: a substrate having anode current collectors disposed thereon; a membrane disposed on the anode current collectors, wherein the membrane comprises a material selected from silicon dioxide, doped silicon dioxide, silicon nitride, doped silicon nitride, silicon oxynitride, doped silicon oxynitride, metal oxides, doped metal oxides, metal nitrides, doped metal nitrides, metal oxynitrides, doped metal oxynitrides, and combinations thereof, wherein the membrane includes at least a first membrane layer and a second membrane layer, wherein the first membrane layer is about 10 to 100 Å thick; a hollow channel substantially defined by a portion of the substrate and a portion of the membrane, wherein a catalyst layer is disposed on a side of the membrane exposed to the hollow channel, wherein the catalyst layer includes a plurality of layers of catalyst having the first layer of membrane material disposed between each layer of the catalyst; a cathode current collector disposed on the membrane on the side opposite the substrate; wherein there is an electrically conductive path between the catalyst layer and the anode current collector.

Methods of fabricating a micro-fuel cell are also provided. One exemplary method includes, among others: disposing a sacrificial polymer layer onto a substrate; removing portions of the sacrificial material to form sacrificial material portions; disposing a first porous catalyst layer onto the sacrificial material portions; disposing a first layer of a membrane material onto the sacrificial material portions, and the first porous catalyst layer; disposing a second porous catalyst layer onto the first layer of a membrane material; disposing a second layer of a membrane material onto the second porous catalyst layer; and removing the sacrificial material portions to form hollow channels substantially defined by the substrate, membrane material, and the first porous catalyst layer.

Other structures, systems, methods, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. Moreover, in the drawings, like reference numerals designate corresponding parts throughout the several views.

DETAILED DESCRIPTION

In general, fuel cell membranes, micro-fuel cells, and methods of fabrication thereof are disclosed. Embodiments of the fuel cell membranes are made of a glass or glassy metal-oxide (e.g., silicon dioxide, doped silicon dioxide, titanium dioxide, and the like) and the membranes are relatively thin and have comparable area resistivities as thicker polymer membranes. The thinner the membrane, the easier it is for protons to move through it, thus increasing the amount of electrical current that can be generated. Meanwhile, the materials used to make the membranes are superior to currently used proton exchange membranes (PEMs) in preventing reactants from passing through the membrane, a common problem particularly in direct methanol fuel cells. In addition, the membranes can be fabricated using well-known micro-electronic fabrication techniques. In this regard, the membrane can be fabricated onto the micro-electronic structure to which the fuel cell is going to be used.

In an embodiment, the fuel cell membrane and the micro-fuel cell can be directly integrated into the electronic device. For example, the fuel cell membrane and the micro-fuel cell can be integrated by placing the fuel cell membrane or the micro-fuel cell on the semiconductor chip, integrating the fuel cell membrane or the micro-fuel cell in the electronic package, chip-substrate, or printed circuit board, and interposing or attaching the fuel cell membrane or the micro-fuel cell to the chip as a separate part that is bonded to the chip.

In general, the fuel cell membranes and micro-fuel cells can be used in technology areas such as, but not limited to, microelectronics (e.g., microprocessor chips, communication chips, and optoelectronic chips), micro-electromechanical systems (MEMS), microfluidics, sensors, and analytical devices (e.g., microchromatography), communication/positioning devices (e.g., beacons and GPS systems), recording devices, and the like.

The fuel cell can actively and/or passively deliver fuel to the fuel cell membrane. For example, a pump or other delivery mechanism can be used to deliver a fuel to the fuel cell membrane. In another example, a fuel can be stored adjacent the fuel cell membrane. In the later embodiment, the fuel cell is sealed and non-flowing so that natural convection moves the fuel within the channel adjacent the fuel cell membrane. Also, combinations of these two embodiments can be used as well. In addition, the chemical products produced while using the fuel cell are released through an open vent, in embodiments of an open fuel cell system, and through a permeable membrane, in embodiments of a closed fuel cell system.

Part A

Figure 1:
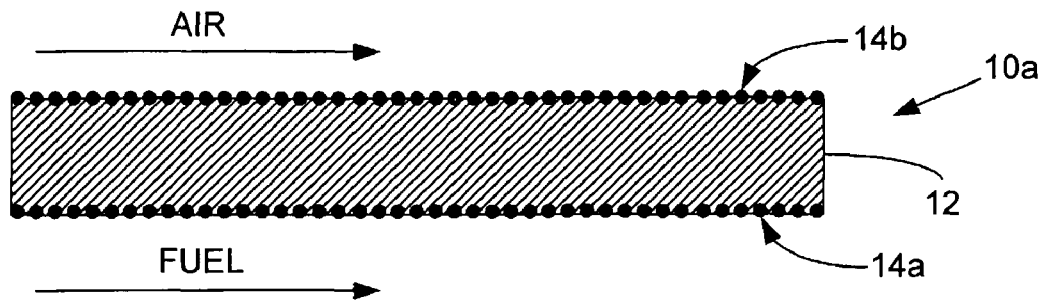
FIG. 1 illustrates a cross-sectional view of a representative fuel cell membrane.

FIG. 1 illustrates a cross-sectional view of a representative fuel cell membrane 10a. The fuel cell membrane 10a includes a membrane 12 (or membrane layer) and a catalyst layer 14a and 14b disposed on each side of the membrane 12. As depicted in FIG. 1, a fuel (e.g., $H_2$, methanol, formic acid, ethylene glycol, ethanol, and combinations thereof) are contacted with one side of the fuel cell membrane 10a (e.g., on the anode side of the membrane (not shown)), while air is contacted on the opposite side of the fuel cell membrane 10a (e.g., on the cathode side of the membrane (not shown)). For example, the following reactions occur on the anode and cathode side of the fuel cell membrane, respectively, when using methanol: $CH_3OH + H_2O \rightarrow CO_2 + 6H^+ + 6e^-$ and $3/2O_2 + 6H^+ + 6e^- \rightarrow 3H_2O$.

The membrane can include materials such as, but not limited to, organic conducting materials and inorganic conducting materials. For example, the membrane can include material such as, but not limited to, silicon dioxide, doped silicon dioxide, silicon nitride, doped silicon nitride, silicon oxynitride, doped silicon oxynitride, metal oxides (e.g., titanium oxide, tungsten oxide), metal nitrides (e.g., titanium nitride), doped metal oxides, metal oxynitrides (e.g., titanium oxynitride), doped metal oxynitrides, and combinations thereof. In general, the membranes can be doped with about 0.1 to 20% of dopant in the membrane and about 0.1 to 5% of dopant in the membrane.

The doped silicon dioxide can include, but is not limited to, phosphorous doped silicon dioxide, boron doped silicon dioxide, aluminum doped silicon dioxide, arsenic doped silicon dioxide, and combinations thereof. In general, the doping causes atomic scale defects such as M-OH (M is a metal) and distort the lattice so that protons can be transported therethrough. The amount of doping can be from 0.1 to 20% by weight of dopant in membrane, 0.5 to 10% by weight of dopant in membrane, and 2 to 5% by weight of dopant in membrane.

The membrane 12 has a thickness of less than about 10 micrometers (μm), about 0.01 to 10 μm, about 0.1 to 5 μm, about 0.1 to 2 μm, about 0.5 to 1.5 μm, and about 1 μm. The length of the membrane 12 can be from about 0.001 m to 100 m, and the width can be from about 1 μm to 1000 μm. It should be noted that the length and width are dependent on the application and can be adjusted accordingly.

The membrane 12 has an area resistivity of about 0.1 to 1000 ohms $cm^2$, about 0.1 to 100 ohms $cm^2$, about 0.1 to 10 ohms $cm^2$, about 1 to 100 ohms $cm^2$, and about 1 to 10 ohms $cm^2$. The area resistivity is defined as the resistivity across the area of the membrane exposed to the fuel (e.g., resistance times area or resistivity times thickness).

The membranes 12 can be formed using methods such as, but not limited to, spin-coating, plasma enhanced chemical vapor deposition (PECVD), screen printing, doctor blading, spray coating, roller coating, meniscus coating, and combinations thereof.

The catalyst layer 14a and 14b can include a catalyst such as, but not limited to, platinum, platinum/ruthenium, nickel, palladium, alloys of each, and combinations thereof. In general, in one embodiment a platinum catalyst is used when the fuel is hydrogen and in another embodiment a platinum/ruthenium catalyst is used when the fuel is methanol. The catalyst layer 14a and 14b can include the same catalyst or a different catalyst. The catalyst layer 14a and 14b is typically a porous catalyst layer that allows protons to pass through the porous catalyst layer. In addition, there is an electrically conductive path between the catalyst layer and the anode current collector.

The catalyst layer 14a and 14b can have a thickness of less than 1μ, about 0.01 to 100 μm, about 0.1 to 5 μm, and about 0.3 to 1 μm.

The catalyst layer 14a and 14b can include alternative layering of catalyst and the membrane material, which builds a thicker catalyst layer 14a and 14b (e.g., two or more layers). For example, two layers improve the oxidation rate of the fuel. This is advantageous because it can increase the anode catalyst loading and keep the catalyst layer porous. The high surface area will allow a high rate of oxidation of the fuel. A higher rate corresponds to higher electrical current and power.

The membrane can be further processed by post-doping. The dopants can be diffused or implanted into the membrane to increase the ionic conductivity. The dopants can include, but are not limited to, boron and phosphorous. Each dopant can be individually diffused into the membrane from a liquid or from a solid source, or can be ion implanted using a high voltage ion accelerator. The conductivity of the membrane can be increased by diffusion of acidic compounds (e.g., carboxylic acids (in the form of acetic acid and trifluoracetic acid) and inorganic acids such as phosphoric acid and sulfuric acid) into the membrane.

Figure 2:
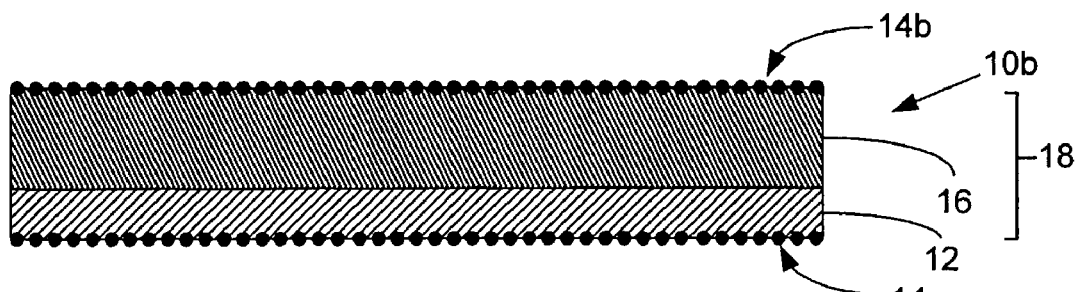
FIG. 2 illustrates a cross-sectional view of another representative fuel cell membrane.

FIG. 2 illustrates a cross-sectional view of a representative fuel cell membrane 10b. The fuel cell membrane 10b includes a composite membrane 18 and a catalyst layer 14a and 14b. The composite membrane 18 includes two membrane layers 12 and 16 (polymer layer 16). In another embodiment, the fuel cell membrane 10b can include three or more layers. One catalyst layer 14a is disposed on the polymer layer 16, while the second catalyst layer 14b is disposed on the membrane layer 12. The membrane layer 12 and the catalyst layers 14a and 14b are similar to those described in reference to FIG. 1. In addition, the fuel cell membrane 10b operates in a manner that is the same or similar to, that described above.

Although the membrane layer 12 and polymer layer 16 are separate layers, they both operate as a fuel cell membrane. The combination of properties (e.g., ionic conductivity, fuel crossover resistance, mechanical strength, and the like) of the dual-layer membrane may be superior in some instances than either layer individually. For example, the polymer layer 16 may add additional mechanical support and stability to the membrane layer 12.

In addition, in embodiments where the membrane layer 12 is silicon dioxide, this material is similar to the other insulators being used to fabricate the device, for example, when the membrane 12 is used with a semiconductor device.

The polymer layer 16 can include polymers such as, but not limited to, Nafion™ (perfluorosulfonic acid/polytetrafluoroethylene copolymer), polyphenylene sulfonic acid, modified polyimide, and combinations thereof. For example, when Nafion™ is used as the polymer layer 16, the open circuit potential has been shown to increase without loss to current density, resulting in an increase in power density and efficiency.

The polymer layer 16 has a thickness of about 1 to 50 μm, 5 to 50 μm, and 10 to 50 μm. The length of the polymer layer 16 can be from about 0.01 m to 100 m, and the width can be from about 1 μm to 500 μm. It should be noted that the length and width are dependent on the application and can be adjusted accordingly. The polymer can be deposited using techniques such as, but not limited to, spin-coating, and therefore, the polymer can completely cover the substrate, and/or can be selectively deposited into a desired area.

The polymer layer 16 has an area resistivity of about 0.001 to 0.5 ohms cm$^2$.

Figure 3A:
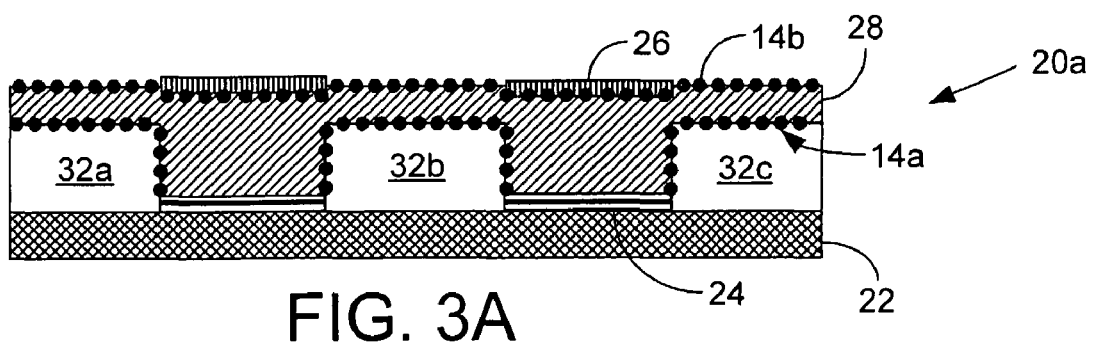
FIGS. 3A through 3D illustrate four embodiments of micro-fuel cells.

FIGS. 3A through 3D illustrate four embodiments of micro-fuel cells 20a, 20b, 20c, and 20d. FIG. 3A illustrates a micro-fuel cell 20a having a membrane 28, a substrate 22, an anode current collector 24, a cathode current collector 26, a first porous catalyst layer 14a, a second catalyst layer 14b, and three channels 32a, 32b, and 32c. The membrane 28 can include the same chemical composition, dimensions, and characteristics, as that described for membrane 12 described above in reference to FIG. 1. The thickness of the membrane 28 is measured from the top of the channels 32a, 32b, and 32c.

The substrate 22 can be used in systems such as, but not limited to, microprocessor chips, microfluidic devices, sensors, analytical devices, and combinations thereof. Thus, the substrate 22 can be made of materials appropriate for the system under consideration (e.g., for printed wiring board, epoxy boards can be used). Exemplar materials include, but are not limited to, glasses, silicon, silicon compounds, germanium, germanium compounds, gallium, gallium compounds, indium, indium compounds, other semiconductor materials and/or compounds, and combinations thereof. In addition, the substrate 12 can include non-semiconductor substrate materials, including any dielectric material, metals (e.g., copper and aluminum), or ceramics or organic materials found in printed wiring boards, for example. Furthermore, the substrate 22 can include one or more components, such as the particular components used in certain systems described above.

The first porous catalyst layer 14a is disposed on the bottom side of the membrane closed to the substrate 22. The second porous catalyst layer 14b is disposed on the top side of the membrane on the side opposite to the substrate 22. The micro-fuel cell 20a includes a first porous catalyst layer 14a and a second porous catalyst layer 14b, which form electrically conductive paths to the anode current collector 24 and the cathode current collector 26, respectively. The first porous catalyst layer 14a and the second porous catalyst layer 14b can include the same catalysts as those described above, and also have the same thickness and characteristics as those described above.

The anode current collector 24 collects electrons through the first porous catalyst layer 14a. The anode current collector 24 can include, but is not limited to, platinum, gold, silver, palladium, aluminum, nickel, carbon, alloys of each, and combinations thereof.

The cathode current collector 26 collects electrons. The cathode current collector 26 can include, but is not limited to, platinum, gold, silver, palladium, aluminum, nickel, carbon, alloys of each, and combinations thereof.

The various anode current collectors 24 and the cathode current collector 26 can be electronically connected in series or parallel, depending on the configuration desired (e.g., the wiring could be from anode-to-cathode (in series) or anode-to-anode (in parallel)). In one embodiment, the individual micro-fuel cells can be connected electronically in series to form fuel cell stacks to increase the output voltage. In another embodiment, the connections can be made in parallel to increase the output current at the rated voltage.

The channels 32a, 32b, and 32c are substantially defined (e.g., bound on all sides in the cross-sectional view) by the membrane 28, the first porous catalyst layer 14a, and the substrate 22. A fuel (e.g., hydrogen and methanol) is flowed into the channels and interacts with the first porous catalyst layer 14a in a manner as described above. The channels 32a, 32b, and 32c, can be in series, parallel, or some combination thereof. The anode current collector 24 is disposed adjacent the channels 32a, 32b, and 32c, but is electrically connected to the porous catalyst layer 14a.

In an embodiment, the channels 32a, 32b, and 32c are formed by the removal (e.g. decomposition) of a sacrificial polymer layer from the area in which the channels 32a, 32b, and 32c are located. During the fabrication process of the structure 20a, a sacrificial polymer layer is deposited onto the substrate 12 and patterned. Then, the membrane 28 is deposited around the patterned sacrificial polymer layer. Subsequently, the sacrificial polymer layer is removed, forming the channels 32a, 32b, and 32c. The processes for depositing and removing the sacrificial polymer are discussed in more detail hereinafter.

Although a rectangular cross-section is illustrated for the channels 32a, 32b, and 32c, the three-dimensional boundaries of the channels can have cross-sectional areas such as, but not limited to, rectangular cross-sections, non-rectangular cross-sections, polygonal cross-sections, asymmetrical cross-sections, curved cross sections, arcuate cross sections, tapered cross sections, cross sections corresponding to an ellipse or segment thereof, cross sections corresponding to a parabola or segment thereof, cross sections corresponding to a hyperbola or segment thereof, and combinations thereof. For example, the three-dimensional structures of the channels can include, but are not limited to, rectangular structures, polygonal structures, non-rectangular structures, non-square structures, curved structures, tapered structures, structures corresponding to an ellipse or segment thereof, structures corresponding to a parabola or segment thereof, structures corresponding to a hyperbola or segment thereof, and combinations thereof. In addition, the channels can have cross-sectional areas having a spatially-varying height. Moreover, multiple air-regions can be interconnected to form microchannels and microchambers, for example.

The channels 32a, 32b, and 32c height can be from about 0.1 to 100 μm, about 1 to 100 μm, 1 to 50 μm, and 10 to 20 μm. The channels 32a, 32b, and 32c width can be from about 0.01 to about 1000 μm, about 100 to about 1000 μm, about 100 to about 300 μm. The length of the channels 32a, 32b, and 32c can vary widely depending on the application and configuration in which they are used. The channels 32a, 32b, and 32c can be in series, parallel, serpentine, and other configurations that are appropriate for a particular application.

In an embodiment, the sacrificial polymer used to produce the sacrificial material layer can be a polymer that slowly decomposes and does not produce undue pressure build-up while forming the channels 32a, 32b, and 32c within the surrounding materials. In addition, the decomposition of the sacrificial polymer produces gas molecules small enough to permeate the membrane 28. Further, the sacrificial polymer has a decomposition temperature less than the decomposition or degradation temperature of the membrane 28.

The sacrificial polymer can include compounds such as, but not limited to, polynorbornenes, polycarbonates, polyethers, polyesters, functionalized compounds of each, and combinations thereof. The polynorbornene can include, but is not limited to, alkenyl-substituted norbornene (e.g., cycloacrylate norbornene). The polycarbonate can include, but is not limited to, norbornene carbonate, polypropylene carbonate, polyethylene carbonate, polycyclohexene carbonate, and combinations thereof.

In addition, the sacrificial polymer can include additional components that alter the processability of the sacrificial polymer (e.g., increase or decrease the stability of the sacrificial polymer to thermal and/or light radiation). In this regard, the components can include, but are not limited to, photoinitiators and photoacid initiators.

The sacrificial polymer can be deposited onto the substrate using techniques such as, for example, spin coating, doctor-blading, sputtering, lamination, screen or stencil-printing, melt dispensing, evaporation, CVD, MOCVD, and/or plasma-based deposition systems.

The thermal decomposition of the sacrificial polymer can be performed by heating to the decomposition temperature of the sacrificial polymer and holding at that temperature for a certain time period (e.g., 1-2 hours). Thereafter, the decomposition products diffuse through the membrane 28 leaving a virtually residue-free hollow structure (channels 32a, 32b, and 32c).

Figure 3B:
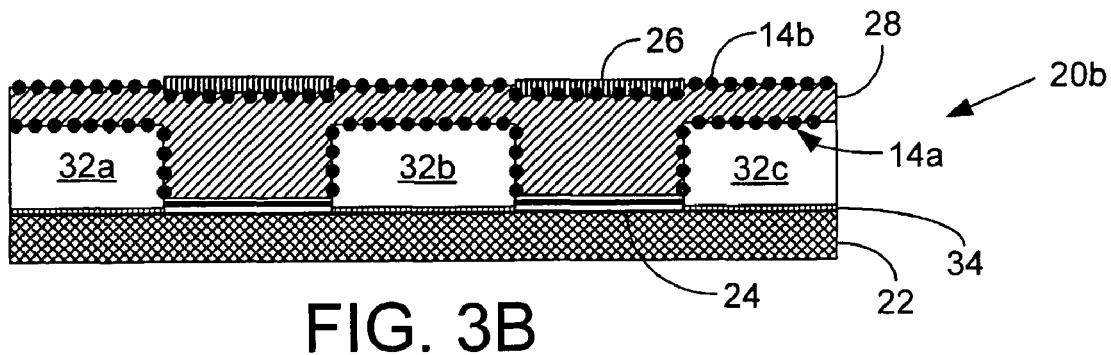

FIG. 3B illustrates a micro-fuel cell 20b having a membrane 28, a substrate 22, an anode current collector 24, a cathode current collector 26, a first porous catalyst layer 14a, a second catalyst layer 14b, a catalyst layer 34, and three channels 32a, 32b, and 32c. The membrane 28 can include the same chemical composition, dimensions, and characteristics, as that described for membrane 12 described above in reference to FIG. 1. The thickness of the membrane 28 is measured from the top of the channels 32a, 32b, and 32c.

The substrate 22, the anode current collector 24, the cathode current collector 26, the first porous catalyst layer 14a, the second catalyst layer 14b, and the three channels 32a, 32b, and 32c are similar to those described above in reference to FIG. 3A.

The catalyst layer 34 is disposed on the substrate 12 within each of the channels 32a, 32b, and 32c. In another embodiment, the catalyst layer 34 can be disposed in less than all of the channels, which is determined by the micro-fuel cell configuration desired. The catalyst layer 34 can be a porous layer or can be a large surface area layer. The catalyst layer 34 can cover the entire portion of the substrate that would otherwise be exposed to the fuel in the channels 32a, 32b, and 32c, or cover a smaller area, as determined by the configuration desired. The catalyst layer 34 can include catalysts such as, but not limited to, platinum, platinum/ruthenium, nickel, palladium, alloys of each, and combinations thereof.

Figure 3C:
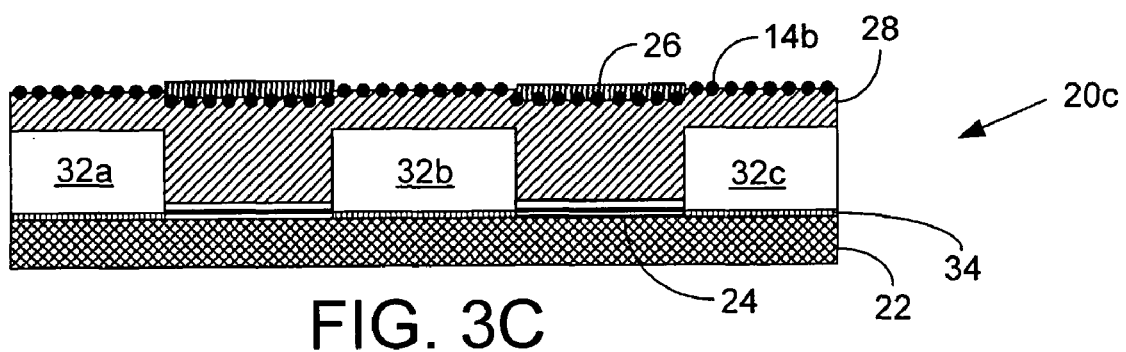

FIG. 3C illustrates a micro-fuel cell 20c having a membrane 28, a substrate 22, an anode current collector 24, a cathode current collector 26, a second catalyst layer 14b, a catalyst layer 34, and three channels 32a, 32b, and 32c. The membrane 28 can include the same chemical composition, dimensions, and characteristics, as that described for membrane 12 described above in reference to FIG. 1. The thickness of the membrane 28 is measured from the top of the channels 32a, 32b, and 32c.

The substrate 22, the anode current collector 24, the cathode current collector 26, the second catalyst layer 14b, the catalyst layer 34, and the three channels 32a, 32b, and 32c are similar to those described above in reference to FIGS. 3A and 3B.

In this embodiment, the micro-fuel cell 20c does not include a first porous catalyst layer, however, the catalytic reaction and activity can be created by the catalyst layer 34.

Figure 3D:
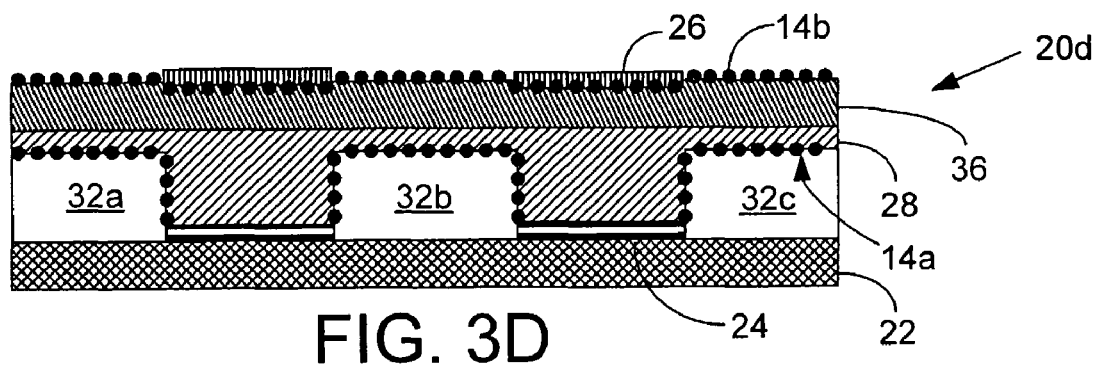

FIG. 3D illustrates a micro-fuel cell 20d having a membrane 28, a substrate 22, an anode current collector 24, a cathode current collector 26, a first catalyst layer 14a, a second catalyst layer 14b, and three channels 32a, 32b, and 32c. The membrane 28 can include the same chemical composition, dimensions, and characteristics, as that described for membrane 12 described above in reference to FIG. 1. The thickness of the membrane 28 is measured from the top of the channels 32a, 32b, and 32c.

The polymer layer 36 is disposed on the top side of the membrane 28 opposite the substrate 22. The second porous catalyst layer 14b and the cathode current collector 26 are disposed on the top side of the polymer layer 36 on the side opposite the membrane 28.

The substrate 22, the anode current collector 24, the cathode current collector 26, the second catalyst layer 14b, first catalyst layer 14a, and the three channels 32a, 32b, and 32c are similar to those described above in reference to FIGS. 3A and 3B. It should be noted that a catalyst layer as described in FIGS. 3B and 3C can be included in an embodiment similar to micro-fuel cell 20d.

The polymer layer 36 is similar to the polymer layer 16 described in FIG. 2. The polymer layer 36 can include the same polymers as described in reference to FIG. 2, and also include the same dimensions. In addition, the dimensions are partially limited to the overall dimensions of the micro-fuel cell 20d and the dimensions of the membrane 28.

Now having described the structure 10 having micro-fuel cells 20a, 20b, 20c, and 20d in general, the following describes exemplar embodiments for fabricating the micro-fuel cell 20a, which could be extended to fabricate micro-fuel cells 20b, 20c, and 20d. It should be noted that for clarity, some portions of the fabrication process are not included in FIGS. 4A through 4H. As such, the following fabrication process is not intended to be an exhaustive list that includes all steps required for fabricating the micro-fuel cell 20a. In addition, the fabrication process is flexible because the process steps may be performed in a different order than the order illustrated in FIGS. 4A through 4H, or some steps may be performed simultaneously.

FIGS. 4A through 4H are cross-sectional views that illustrate a representative method of fabricating the micro-fuel cell 20a illustrated in FIG. 3A. It should be noted that for clarity, some portions of the fabrication process are not included in FIGS. 4A through 4H. As such, the following fabrication process is not intended to be an exhaustive list that includes all steps required for fabricating the micro-fuel cell 20a. In addition, the fabrication process is flexible because the process steps may be performed in a different order than the order illustrated in FIGS. 4A through 4H and/or some steps may be performed simultaneously.

Figure 4A:
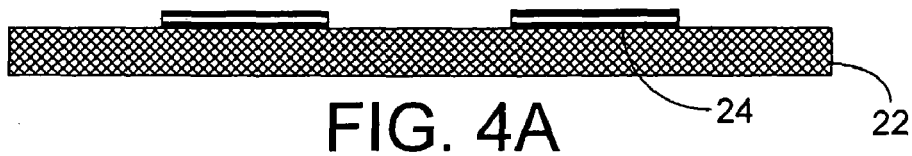
FIGS. 4A through 4H are cross-sectional views that illustrate a representative method of fabricating the micro-fuel cell illustrated in FIG. 3A.
Figure 4B:
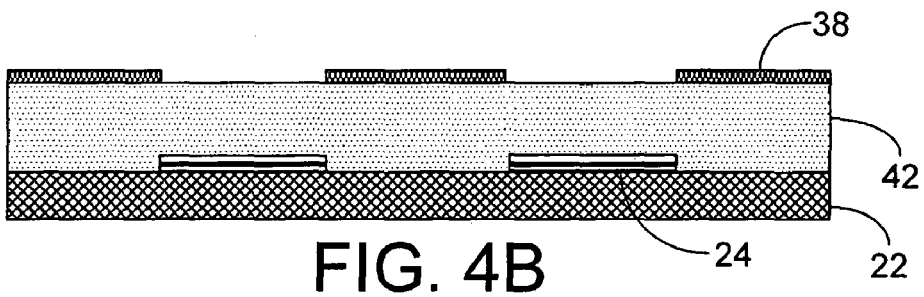
Figure 4C:
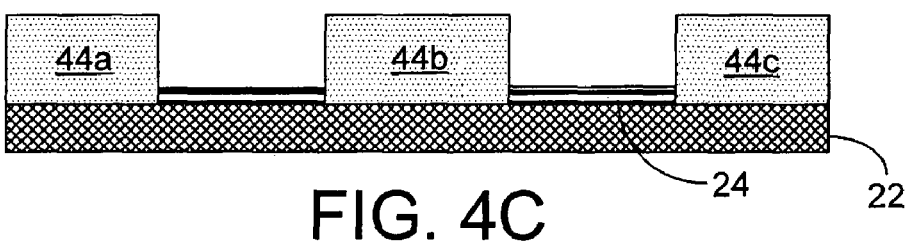

FIG. 4A illustrates the substrate 22 having an anode current collector 24 disposed thereon. FIG. 4B illustrates the formation of the sacrificial material layer 42 on the substrate 22 and the anode current collector 24. The sacrificial polymer layer 22 can be deposited onto the substrate 22 using techniques such as, for example, spin coating, doctor-blading, sputtering, lamination, screen or stencil-printing, melt dispensing, CVD, MOCVD, and/or plasma-based deposition systems. In addition, a mask 38 is disposed on the sacrificial material layer 42 to remove portions of the sacrificial material layer 42 to expose the anode current collector 24. FIG. 4C illustrates the removal of portions of the sacrificial material layer 42 to form sacrificial portions 44a, 44b, and 44c.

Figure 4D:
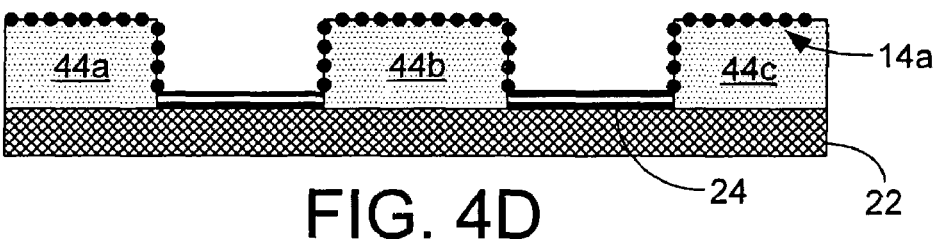

FIG. 4D illustrates the formation of the first porous catalyst layer 14a on the sacrificial portions 44a, 44b, and 44c. The first porous catalyst layer 14a can be formed by sputtering, evaporation, spraying, painting, chemical vapor deposition and combinations thereof.

Figure 4E:
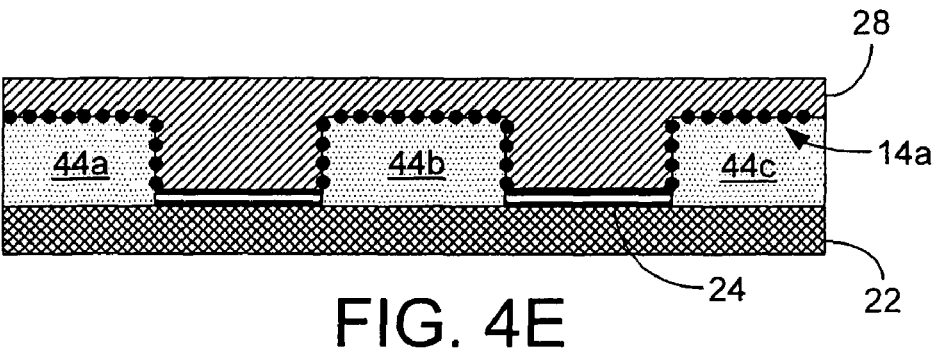

FIG. 4E illustrates the formation of the membrane layer 28 on the porous catalyst layer 14a, the sacrificial portions 44a, 44b, and 44c, and the anode current collectors 24. The membrane can be formed using methods such as, but not limited to, spin-coating, plasma enhanced chemical vapor deposition (PECVD), chemical vapor deposition, sputtering, evaporation, laser ablation deposition, and combinations thereof. The temperature at which the membrane 28 is formed should be from about 25 to 400° C., about 50 to 200° C., or about 100 to 150° C. It should be noted that temperature is limited to the range at which the other materials are stable (e.g., decomposition temperature).

Figure 4F:
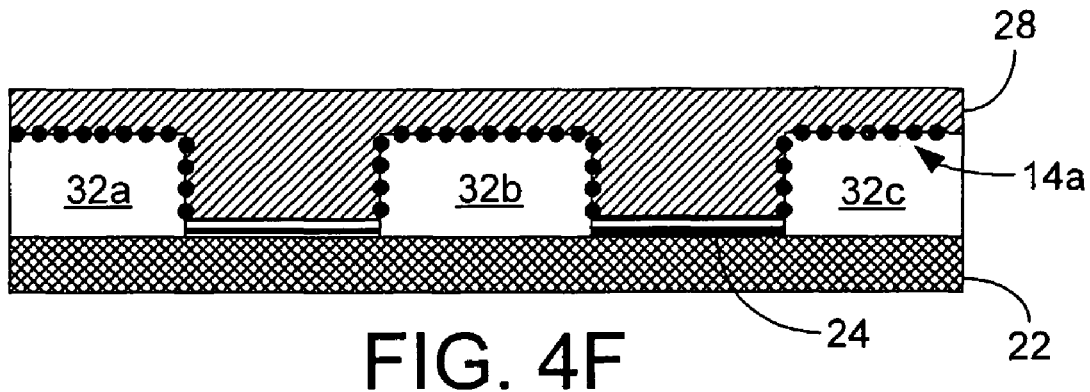

FIG. 4F illustrates the removal of the sacrificial portions 44a, 44b, and 44c to form the channels 32a, 32b, and 32c. The sacrificial portions 44a, 44b, and 44c can be removed using thermal decomposition, microwave irradiation, uv/visible irradiation, plasma exposure, and combinations thereof. It should be noted that the sacrificial portions 44a, 44b, and 44c can be removed at a different step in the fabrication process, such as after the step illustrated in FIG. 4G and/or FIG. 4H.

Figure 4G:
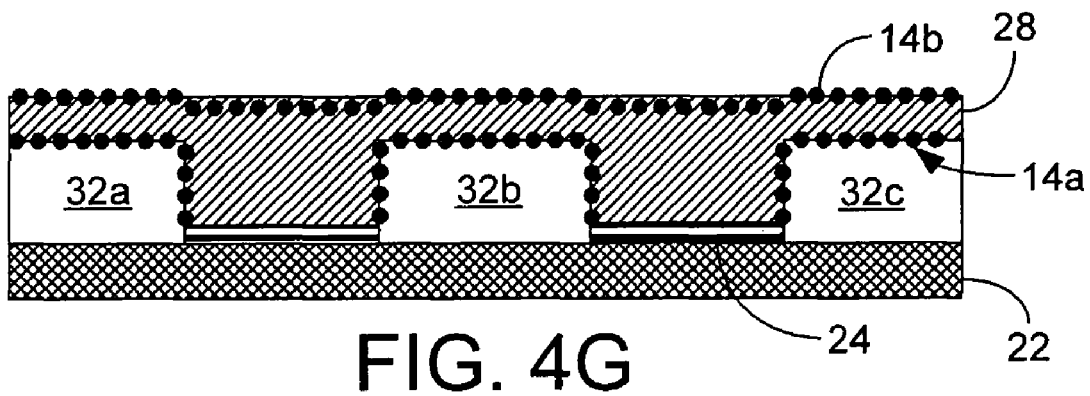

FIG. 4G illustrates the formation of the second porous catalyst layer 14b on the sacrificial portions 44a, 44b, and 44c. The second porous catalyst layer 14b can be formed by sputtering, evaporation, spraying, painting, chemical vapor deposition, and combinations thereof.

Figure 4H:
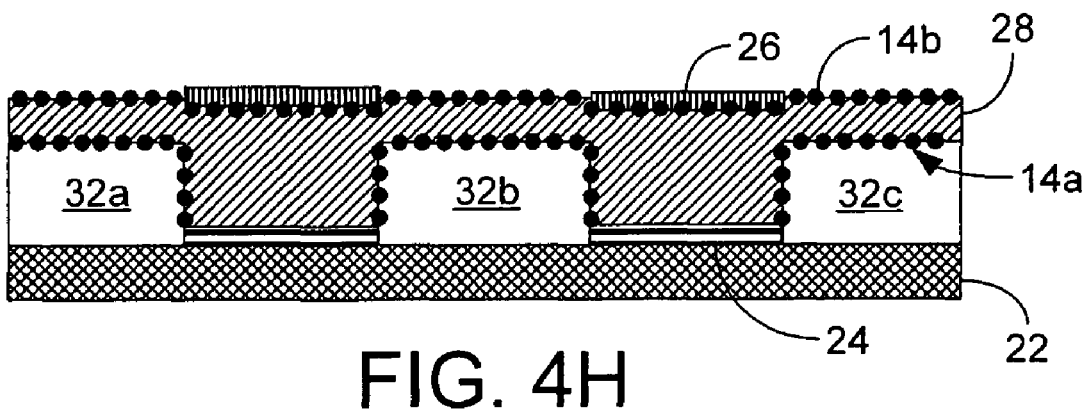

FIG. 4H illustrates the formation of the cathode current collector 26 on the second porous catalyst layer 14b and the membrane 28.

As mentioned above, a step can be added between the steps illustrated in FIGS. 4F and 4G to add a polymer layer as shown in FIG. 2 and FIG. 3D, and the second porous catalyst layer and the cathode current collector can be formed on the polymer layer. The polymer layer can be formed by methods such as, but not limited to, spin coating, doctor-blading, sputtering, lamination, screen or stencil-printing, melt dispensing, CVD, MOCVD, and plasma-based deposition systems. Likewise, the step of adding the first porous catalyst layer 14a can be omitted to form the micro-fuel cell 20c illustrated in FIG. 3C. In addition, the catalyst layer 34 (for FIGS. 3B and 3C) can be disposed at some step prior to forming the membrane layer.

Part B

In another embodiment, a fuel cell can include a fuel cell membrane including a high-surface area catalyst layer. The catalyst layer is multi-layered in that the catalyst layer includes a plurality of catalyst layers. The catalyst layers are at different depths and enhance the surface area upon which a fuel can contact.

Figure 5:
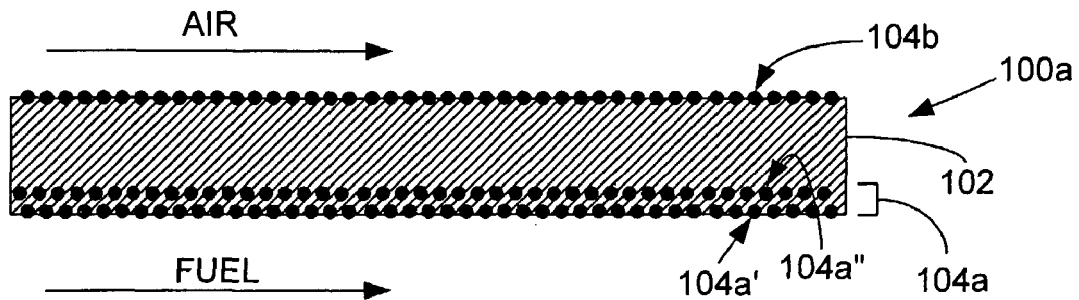
FIG. 5 illustrates a cross-sectional view of a representative fuel cell membrane.

FIG. 5 illustrates a cross-sectional view of a representative fuel cell membrane 100a. The fuel cell membrane 100a includes a membrane 102 (or membrane layers) and a catalyst layer 104a and 104b disposed on each side of the membrane 102. As depicted in FIG. 5, a fuel (e.g., $H_2$, methanol, formic acid, ethylene glycol, ethanol, and combinations thereof) are contacted with one side of the fuel cell membrane 100a (e.g., on the anode side of the membrane (not shown)), while air is contacted on the opposite side of the fuel cell membrane 100a (e.g., on the cathode side of the membrane (not shown)).

The membrane 100a can include materials such as, but not limited to, organic conducting materials and inorganic conducting materials. For example, the membrane 100a can include material such as, but not limited to, silicon dioxide, doped silicon dioxide, silicon nitride, doped silicon nitride, silicon oxynitride, doped silicon oxynitride, metal oxides (e.g., titanium oxide, tungsten oxide), metal nitrides (e.g., titanium nitride), doped metal oxides, metal oxynitrides (e.g., titanium oxynitride), doped metal oxynitrides, and combinations thereof. In general, the membrane 100a can be doped with about 0.1 to 20% of dopant in the membrane and about 0.1 to 5% of dopant in the membrane 100a.

The doped silicon dioxide can include, but is not limited to, phosphorous doped silicon dioxide, boron doped silicon dioxide, aluminum doped silicon dioxide, arsenic doped silicon dioxide, and combinations thereof. In general, the doping causes atomic scale defects such as M-OH (M is a metal) and distort the lattice so that protons can be transported therethrough. The amount of doping can be from 0.1 to 20% by weight of dopant in membrane 100a, 0.5 to 10% by weight of dopant in membrane, and 2 to 5% by weight of dopant in membrane 100a.

The membrane 102 has a thickness of less than about 10 micrometers (μm), about 0.01 to 10 μm, about 0.1 to 7 μm, about 0.5 to 7 μm, about 2 to 7 μm, about 5 to 7 μm, about 0.1 to 2 μm, about 0.5 to 1.5 μm, and about 1 μm. The length of the membrane 102 can be from about 0.001 m to 100 m, and the width can be from about 1 μm to 1000 μm. It should be noted that the length and width are dependent on the application and can be adjusted accordingly.

The membrane 102 has an area resistivity of about 0.1 to 1000 ohms $cm^2$, about 0.1 to 100 ohms $cm^2$, about 0.1 to 10 ohms $cm^2$, about 1 to 100 ohms $cm^2$, and about 1 to 10 ohms $cm^2$. The area resistivity is defined as the resistivity across the area of the membrane 102 exposed to the fuel (e.g., resistance times area or resistivity times thickness).

The membrane 102 can be formed using methods such as, but not limited to, spin-coating, plasma enhanced chemical vapor deposition (PECVD), screen printing, doctor blading, spray coating, roller coating, meniscus coating, and combinations thereof.

The membrane 102 could be further processed by post-doping procedures. The dopants can be diffused or implanted into the membrane 102 to increase the ionic conductivity. The dopants can include, but are not limited to, boron and phosphorous. Each dopant can be individually diffused into the membrane from a liquid or from a solid source, or can be ion implanted using a high voltage ion accelerator. The conductivity of the membrane can be increased by diffusion of acidic compounds (e.g., carboxylic acids (in the form of acetic acid and trifluoroacetic acid) and inorganic acids such as phosphoric acid and sulfuric acid) into the membrane 102.

The catalyst layer 104a and 104b can include a catalyst such as, but not limited to, platinum, platinum/ruthenium, nickel, palladium, alloys of each, and combinations thereof. In general, in one embodiment a platinum catalyst is used when the fuel is hydrogen and in another embodiment a platinum/ruthenium catalyst is used when the fuel is methanol. The catalyst layer 104a and 104b can include the same catalyst or a different catalyst. The catalyst layer 104a and 104b is typically a porous catalyst layer that allows protons to pass through the porous catalyst layer. In addition, there is an electrically conductive path between the catalyst layer and the anode current collector. In general, the catalyst layer 104a and the catalyst layer 104b are formed using different techniques. For example, in an embodiment, the catalyst layer 104b could be thicker than the catalyst layer 104a, so different techniques can be used to apply each layer.

The catalyst layer 104a can include alternative layering of the catalyst (catalyst layers 104a' and 104a") and the membrane material (the same or a different material), which builds a thicker catalyst layer 104a. In another embodiment, the membrane material is a different type of material as the membrane, and the result is a composite membrane.

For example, two or more layers of catalyst can be fabricated (two layers are depicted in FIG. 5, catalyst layers 104a' and 104a"), where one of the layers is on the surface, while the other layer(s) is embedded in the membrane material. As discussed in more detail below, the plurality of catalyst layers can be formed by applying a catalyst layer (catalyst layer 104a") on a layer of membrane material, applying a thin layer (e.g., about 10 to 100 Å) of membrane material on the catalyst layer, and then dispose another catalyst layer (catalyst layer 104a') (e.g., about 10 to 100 Å). This process can be repeated as determined for a particular application. The thickness of each catalyst layer and the thickness of each thin layer of membrane material can be varied as determined for a particular application. The actual or effective surface area could be calculated by dividing the observed current, as obtained for a multi-layered catalyst, by the current observed for a single-layer catalyst.

Having a plurality of layers can improve the oxidation rate of the fuel. This is advantageous because it can increase the anode catalyst loading and keep the catalyst layer porous. The high surface area will allow a high rate of oxidation of the fuel. A higher rate corresponds to higher electrical current and power. In addition, a more concentrated fuel (e.g., concentrated MeOH can be used). In embodiments where a concentrated fuel such as MeOH can be used, a higher electrical current and power can be generated relative to fuel cells using an unconcentrated fuel (i.e., 1M MeOH).

In general, the catalyst layer 104a and 104b can each have a thickness of less than 1 μm, about 0.01 to 100 μm, about 0.1 to 5 μm, and about 0.3 to 1 μm. The catalyst layer 104a' and 104a" can each have a thickness of about 50 to 250 Å and about 50 to 150 Å. The thickness of the membrane material disposed between each layer can be about 10 to 100 Å.

As mentioned above, the fuel used in the fuel cell depends, in part, on the catalyst in the catalyst layer 104a. In an embodiment, the fuel can include, but is not limited to, a concentrated MeOH (e.g., concentrated as compared to MeOH used in the fuel cell, which is about 1M MeOH). The concentration of the MeOH that can be used is about 2M, about 3M, about 4M, about 5M, about 6M, about 7M, about 8M, about 9M, about 10M, about 11M, and about 12M. In addition, the concentration of the MeOH can be from about 2M to 12M, about 3M to 12M, about 4M to 12M, about 5M to 12M, about 6M to 12M, about 7M to 12M, about 8M to 12M, about 9M to 12M, about 10M to 12M, and about 11M to 12M.

Typical proton exchange membrane fuel cells using MeOH need a large amount of water because highly-hydrated protons are transplanted across the polymer membrane through relatively large channels in the polymer membrane (e.g., Nafion™). Without the water (8 to 12 water molecules per proton), transport is suppressed. In contrast, embodiments of the present disclosure can use relatively higher concentrations of MeOH because the membrane 102 has a low molecular permeability. In an embodiment, the permeability of the membrane 102 is about $10^{-8}$ to $10^{-14}$ g/cm*s*Torr, about $10^{-9}$ to $10^{-14}$ g/cm*s*Torr, about $10^{-10}$ to $10^{-14}$ g/cm*s*Torr, about $10^{-11}$ to $10^{-14}$ g/cm*s*Torr, and about $10^{-12}$ to $10^{-14}$ g/cm*s*Torr, for the thickness range of the membrane 102 noted above.

Figure 6:
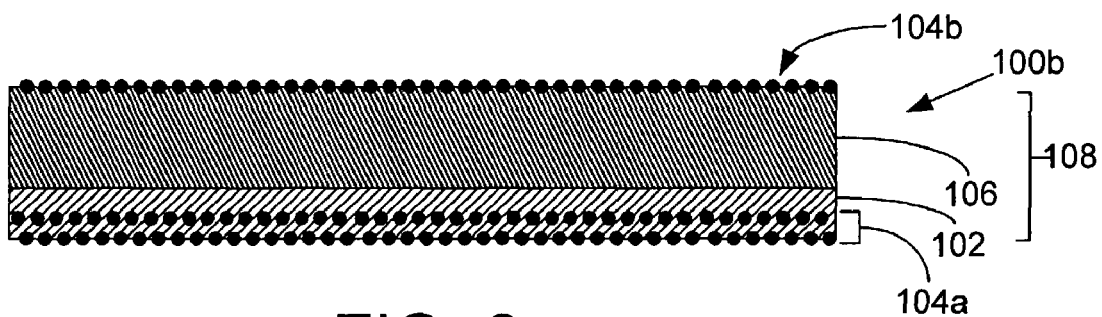
FIG. 6 illustrates a cross-sectional view of a representative fuel cell membrane.

FIG. 6 illustrates a cross-sectional view of a representative fuel cell membrane 100b. The fuel cell membrane 100b includes a composite membrane 108 and a catalyst layer 104a and 104b. The composite membrane 108 includes two membrane layers 102 and 106 (polymer layer 106). In another embodiment, the fuel cell membrane 100b can include three or more layers. One catalyst layer 104a is disposed on the polymer layer 106, while the second catalyst layer 104b is disposed on the membrane layer 102. The membrane layer 102 and the catalyst layers 104a and 104b are similar to those described in reference to FIG. 5. In addition, the fuel cell membrane 100b operates in a manner that is the same or similar to, that described above.

Although the membrane layer 102 and polymer layer 106 are separate layers, they both operate as a fuel cell membrane. The combination of properties (e.g., ionic conductivity, fuel crossover resistance, mechanical strength, and the like) of the dual-layer membrane may be superior in some instances than either layer individually. For example, the polymer layer 106 may add additional mechanical support and stability to the membrane layer 102.

In addition, in embodiments where the membrane layer 102 is silicon dioxide, this material is similar to the other insulators being used to fabricate the device, for example, when the membrane 102b is used with a semiconductor device. In addition, the membrane layer 102 can be made of other materials as described above in reference to membrane layer 12.

The polymer layer 106 is similar (e.g., materials, dimensions, characteristics, and properties) to the polymer layer 16 described above. The catalyst layer 104a and 104b are similar to those described above in reference to FIG. 5.

Figure 7A:
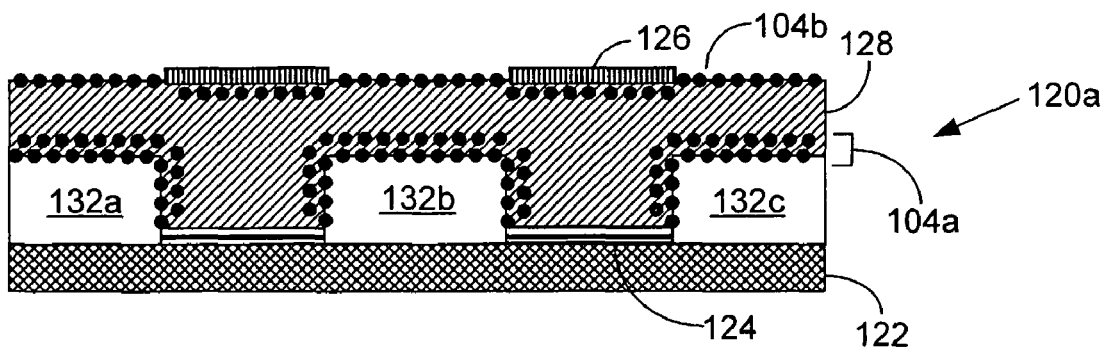
FIGS. 7A through 7C illustrate four embodiments of micro-fuel cells.
Figure 7B:
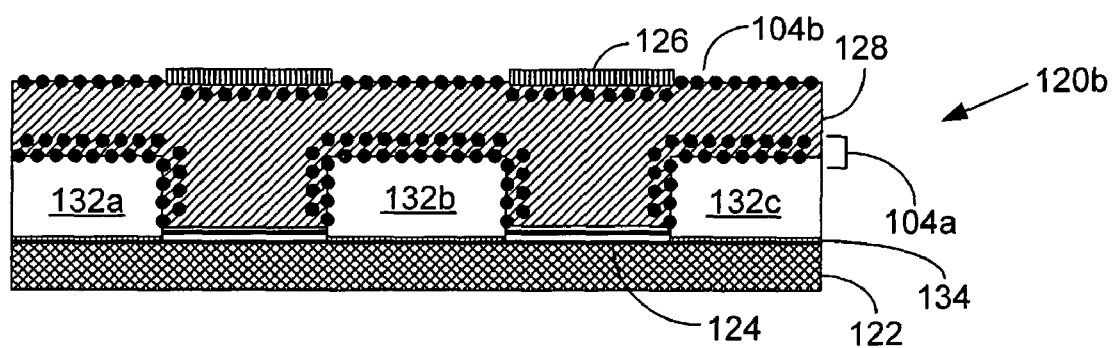
Figure 7C:
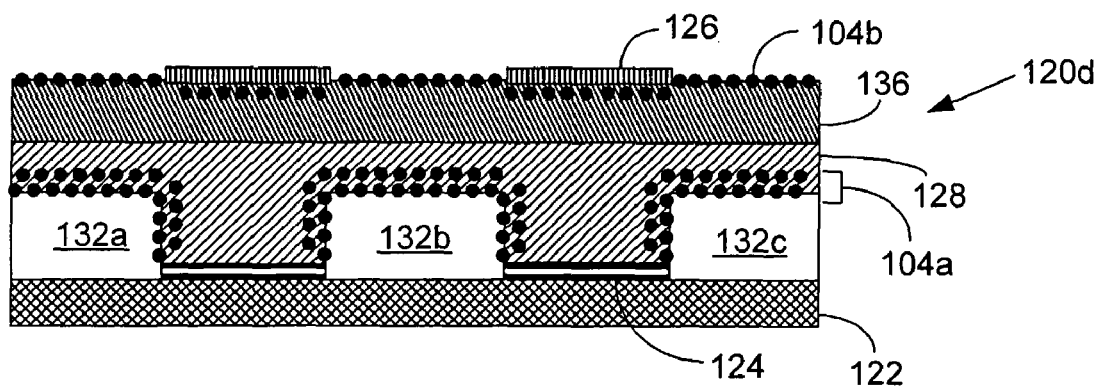

FIGS. 7A through 7C illustrate four embodiments of micro-fuel cells 120a, 120b, and 120c. FIG. 7A illustrates a micro-fuel cell 120a having a membrane 128, a substrate 122, an anode current collector 124, a cathode current collector 126, a first porous catalyst layer 104a, a second catalyst layer 104b, and three hollow channels 132a, 132b, and 132c. The membrane 128 can include the same chemical composition, dimensions, and characteristics, as that described for membrane 102 described above in reference to FIG. 5. The thickness of the membrane 128 is measured from the top of the channels 132a, 132b, and 132c.

The substrate 122 can be used in systems such as, but not limited to, microprocessor chips, microfluidic devices, sensors, analytical devices, and combinations thereof. Thus, the substrate 122 can be made of materials appropriate for the system under consideration (e.g., for printed wiring board, epoxy boards can be used). Exemplar materials include, but are not limited to, glasses, silicon, silicon compounds, germanium, germanium compounds, gallium, gallium compounds, indium, indium compounds, other semiconductor materials and/or compounds, and combinations thereof. In addition, the substrate 122 can include non-semiconductor substrate materials, including any dielectric material, metals (e.g., copper and aluminum), or ceramics or organic materials found in printed wiring boards, for example. Furthermore, the substrate 122 can include one or more components, such as the particular components used in certain systems described above.

The first porous catalyst layer 104a is disposed on the bottom side of the membrane closed to the substrate 122. The second porous catalyst layer 104b is disposed on the top-side of the membrane 128 on the side opposite to the substrate 122. The micro-fuel cell 120a includes a first porous catalyst layer 104a and a second porous catalyst layer 104b, which form electrically conductive paths to the anode current collector 124 and the cathode current collector 126, respectively. The first porous catalyst layer 104a and the second porous catalyst layer 104b can include the same catalysts as those described above, and also have the same thickness and characteristics as those described above.

The anode current collector 124 collects electrons through the first porous catalyst layer 104a. The anode current collector 124 can include, but is not limited to, platinum, gold, silver, palladium, aluminum, nickel, carbon, alloys of each, and combinations thereof.

The cathode current collector 126 collects electrons. The cathode current collector 126 can include, but is not limited to, platinum, gold, silver, palladium, aluminum, nickel, carbon, alloys of each, and combinations thereof. In another embodiment, the positions of the anode current collector 124 and the cathode current collector 126 could be switched.

The various anode current collectors 124 and the cathode current collector 126 can be electronically connected in series or parallel, depending on the configuration desired (e.g., the wiring could be from anode-to-cathode (in series) or anode-to-anode (in parallel)). In one embodiment, the individual micro-fuel cells can be connected electronically in series to form fuel cell stacks to increase the output voltage. In another embodiment, the connections can be made in parallel to increase the output current at the rated voltage.

The channels 132a, 132b, and 132c are substantially defined (e.g., bound on all sides in the cross-sectional view) by the membrane 128, the first porous catalyst layer 104a, and the substrate 122. In other embodiments, other components could be present that also define the channels. A fuel (e.g., hydrogen or methanol) is flowed into the channels and interacts with the first porous catalyst layer 104a in a manner as described above. The channels 132a, 132b, and 132c, can be in series, parallel, or some combination thereof. The anode current collector 124 is disposed adjacent the channels 132a, 132b, and 132c, but is electrically connected to the porous catalyst layer 104a.

In an embodiment, the channels 132a, 132b, and 132c are formed by the removal (e.g. decomposition) of a sacrificial polymer layer from the area in which the channels 132a, 132b, and 132c are located. During the fabrication process of the structure 120a, a sacrificial polymer layer is deposited onto the substrate 122 and patterned. Then, the membrane 128 is deposited around the patterned sacrificial polymer layer. Subsequently, the sacrificial polymer layer is removed, forming the channels 132a, 132b, and 132c. The processes for depositing and removing the sacrificial polymer are discussed in more detail hereinafter.

Although a rectangular cross-section is illustrated for the channels 132a, 132b, and 132c, the three-dimensional boundaries of the channels can have cross-sectional areas such as, but not limited to, rectangular cross-sections, non-rectangular cross-sections, polygonal cross-sections, asymmetrical cross-sections, curved cross sections, arcuate cross sections, tapered cross sections, cross sections corresponding to an ellipse or segment thereof, cross sections corresponding to a parabola or segment thereof, cross sections corresponding to a hyperbola or segment thereof, and combinations thereof. For example, the three-dimensional structures of the channels can include, but are not limited to, rectangular structures, polygonal structures, non-rectangular structures, non-square structures, curved structures, tapered structures, structures corresponding to an ellipse or segment thereof, structures corresponding to a parabola or segment thereof, structures corresponding to a hyperbola or segment thereof, and combinations thereof. In addition, the channels can have cross-sectional areas having a spatially-varying height. Moreover, multiple air-regions can be interconnected to form microchannels and microchambers, for example.

The channels 132a, 132b, and 132c height can be from about 0.1 to 100 µm, about 1 to 100 µm, 1 to 50 µm, and 10 to 20 µm. The channels 132a, 132b, and 132c width can be from about 0.01 to about 1000 µm, about 100 to about 1000 µm, about 100 to about 300 µm. The length of the channels 132a, 132b, and 132c can vary widely, depending on the application and configuration in which they are used. The channels 132a, 132b, and 132c can be in series, parallel, serpentine, and other configurations that are appropriate for a particular application.

In an embodiment, the sacrificial polymer used to produce the sacrificial material layer can be a polymer that slowly decomposes and does not produce undue pressure build-up while forming the channels 132a, 132b, and 132c within the surrounding materials. In addition, the decomposition of the sacrificial polymer produces gas molecules small enough to permeate the membrane 128. Further, the sacrificial polymer has a decomposition temperature less than the decomposition or degradation temperature of the membrane 128.

The sacrificial polymer can include compounds such as, but not limited to, polynorbornenes, polycarbonates, polyethers, polyesters, functionalized compounds of each, and combinations thereof. The polynorbornene can include, but is not limited to, alkenyl-substituted norbornene (e.g., cycloacrylate norbornene). The polycarbonate can include, but is not limited to, norbornene carbonate, polypropylene carbonate, polyethylene carbonate, polycyclohexene carbonate, and combinations thereof.

In addition, the sacrificial polymer can include additional components that alter the processability of the sacrificial polymer (e.g., increase or decrease the stability of the sacrificial polymer to thermal and/or light radiation). In this regard, the components can include, but are not limited to, photoinitiators and photoacid initiators.

The sacrificial polymer can be deposited onto the substrate using techniques such as, for example, spin coating, doctor-blading, sputtering, lamination, screen or stencil-printing, melt dispensing, evaporation, CVD, MOCVD, and/or plasma-based deposition systems.

The thermal decomposition of the sacrificial polymer can be performed by heating to the decomposition temperature of the sacrificial polymer and holding at that temperature for a certain time period (e.g., about 1-2 hours). Thereafter, the decomposition products diffuse through the membrane 28 leaving a virtually residue-free hollow structure (channels 132a, 132b, and 132c).

FIG. 7B illustrates a micro-fuel cell 120b having a membrane 128, a substrate 122, an anode current collector 124, a cathode current collector 126, a first porous catalyst layer 104a, a second catalyst layer 104b, a catalyst layer 134, and three channels 132a, 132b, and 132c. The membrane 128 can include the same chemical composition, dimensions, and characteristics, as that described for membrane 102 described above in reference to FIG. 5. The thickness of the membrane 128 is measured from the top of the channels 132a, 132b, and 132c.

The substrate 122, the anode current collector 124, the cathode current collector 126, the first porous catalyst layer 104a, the second catalyst layer 104b, and the three channels 132a, 132b, and 132c are similar to those described above in reference to FIG. 7A. In another embodiment, the positions of the anode current collector 124 and the cathode current collector 126 could be switched.

The catalyst layer 134 is disposed on the substrate 122 within each of the channels 132a, 132b, and 132c. In another embodiment, the catalyst layer 134 can be disposed in less than all of the channels, which is determined by the micro-fuel cell configuration desired. The catalyst layer 134 can be a porous layer or can be a large surface area layer. The catalyst layer 134 can cover the entire portion of the substrate that would otherwise be exposed to the fuel in the channels 132a, 132b, and 132c, or cover a smaller area, as determined by the configuration desired. The catalyst layer 134 can include catalyst such as, but not limited to, platinum, platinum/ruthenium, nickel, palladium, alloys of each, and combinations thereof.

FIG. 7C illustrates a micro-fuel cell 120c having a membrane 128, a substrate 122, an anode current collector 124, a cathode current collector 126, a first catalyst layer 104a, a second catalyst layer 104b, and three channels 132a, 132b, and 132c. The membrane 128 can include the same chemical composition, dimensions, and characteristics, as that described for membrane 122 described above in reference to FIG. 5. The thickness of the membrane 28 is measured from the top of the channels 132a, 132b, and 132c.

The polymer layer 136 is disposed on the top-side of the membrane 128 opposite the substrate 122. The second porous catalyst layer 104b and the cathode current collector 126 are disposed on the top-side of the polymer layer 136 on the side opposite the membrane 128.

The substrate 122, the anode current collector 124, the cathode current collector 126, the second catalyst layer 104b, first catalyst layer 104a, and the three channels 132a, 132b, and 132c are similar to those described above in reference to FIGS. 7A and 7B. It should be noted that a catalyst layer as described in FIG. 7B could be included in an embodiment similar to micro-fuel cell 120c.

The polymer layer 136 is similar that the polymer layer 106 described in FIG. 6. The polymer layer 136 can include the same polymers as described in reference to FIG. 6, and also include the same dimensions. In addition, the dimensions are partially limited to the overall dimensions of the micro-fuel cell 120c and the dimensions of the membrane 128.

Now having described micro-fuel cells 120a, 120b, and 120c in general, the following describes exemplar embodiments for fabricating a micro-fuel cell with a channel 134. This fabrication could be extended to fabricate micro-fuel cells 120a, 120b, and 120c. It should be noted that for clarity, some portions of the fabrication process are not included in FIGS. 8A through 8F. As such, the following fabrication process is not intended to be an exhaustive list that includes all steps required for fabricating the micro-fuel cell. In addition, the fabrication process is flexible because the process steps may be performed in a different order than the order illustrated in FIGS. 8A through 8F, or some steps may be performed simultaneously.

FIGS. 8A through 8F are cross-sectional views that illustrate a representative method of fabricating the micro-fuel cell. It should be noted that for clarity, some portions of the fabrication process are not included in FIGS. 8A through 8F.

Figure 8A:
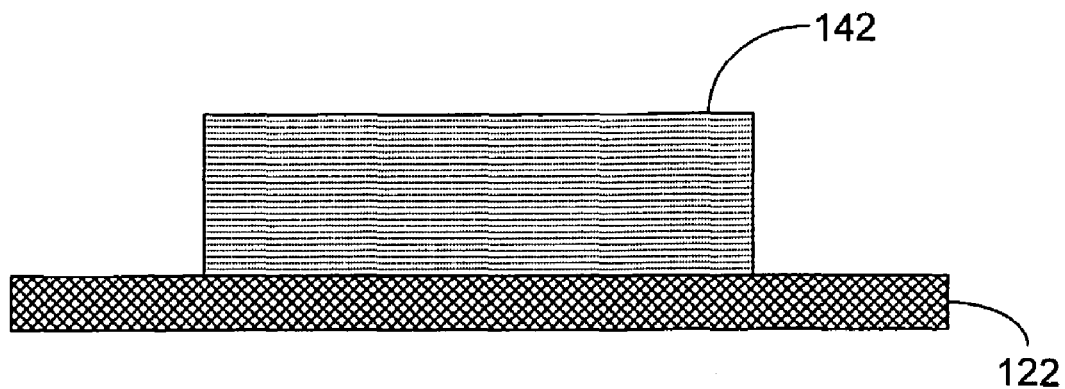
FIGS. 8A through 8F are cross-sectional views that illustrate a representative method of fabricating the micro-fuel cell.

FIG. 8A illustrates the substrate 122 having a sacrificial material layer 142 disposed on the substrate 122. The sacrificial polymer layer 122 can be deposited onto the substrate 122 using techniques such as, for example, spin coating, doctor-blading, sputtering, lamination, screen or stencil-printing, melt dispensing, CVD, MOCVD, and/or plasma-based deposition systems. The sacrificial material layer can be patterned using a mask, for example.

Figure 8B:
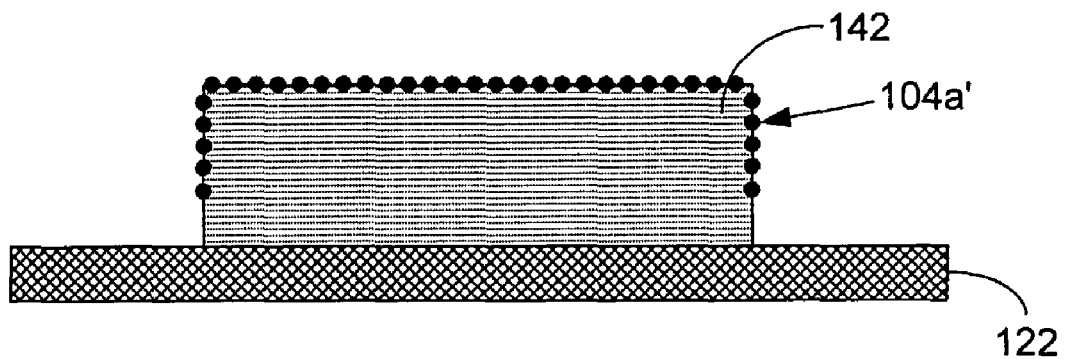

FIG. 8B illustrates the formation of the first porous catalyst layer 104a on the sacrificial material layer 142. The first porous catalyst layer 104a can be formed by sputtering, evaporation, spraying, painting, chemical vapor deposition, and combinations thereof.

Figure 8C:
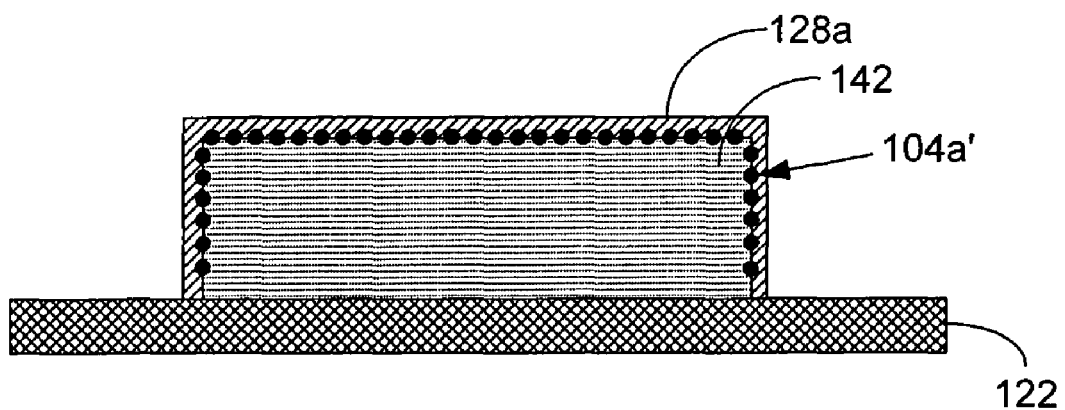

FIG. 8C illustrates the formation of a thin layer of a first membrane material 128a. The first membrane material 128a can be formed using methods such as, but not limited to, spin-coating, plasma enhanced chemical vapor deposition (PECVD), chemical vapor deposition, sputtering, evaporation, laser ablation deposition, and combinations thereof. The temperature at which the first membrane material 128a is formed should be from about 25 to 400° C., about 50 to 200° C., or about 100 to 150° C. It should be noted that temperature is limited to the range at which the other materials are stable (e.g., decomposition temperature). The thin layer of the first membrane material 128a can have a thickness of about 10 to 100 Å. The thickness can be adjusted depending, at least in part, on the catalyst, membrane material, fuel, and the like.

Figure 8D:
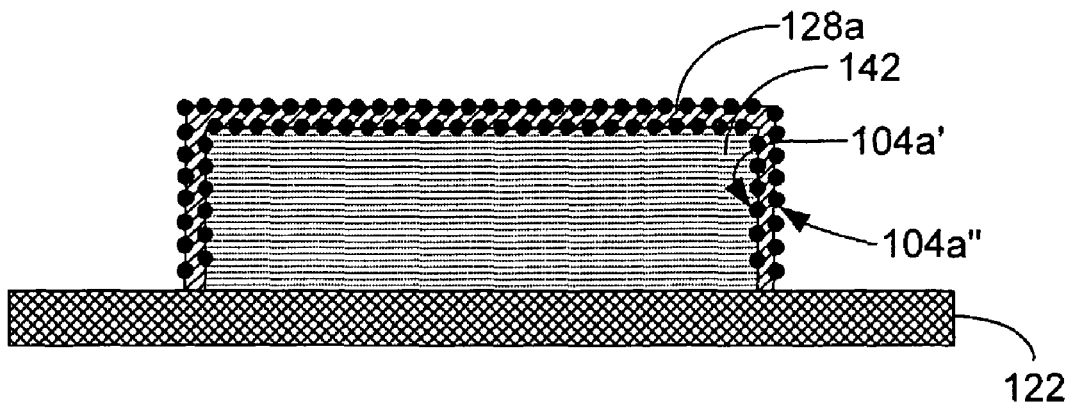

FIG. 8D illustrates the formation of the second porous catalyst layer 104b on the first membrane material 128a. The first porous catalyst layer 104b can be formed by sputtering, evaporation, spraying, painting, chemical vapor deposition, and combinations thereof.

Figure 8E:
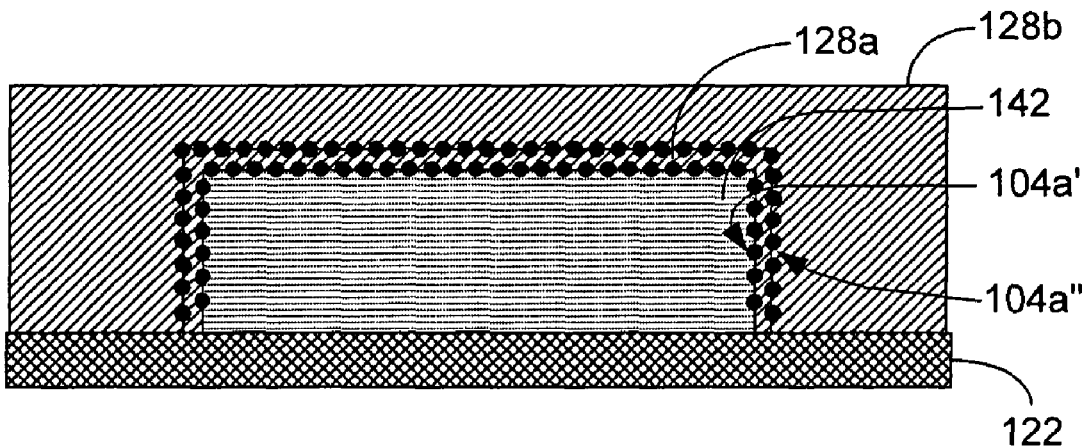

FIG. 8E illustrates the formation of the second membrane layer 128b on the second porous catalyst layer 104a. The second membrane layer 128b can be formed using methods described above in reference to the first membrane layer 128a. The first membrane layer 128a and the second membrane layer 128b form the membrane layer.

Figure 8F:
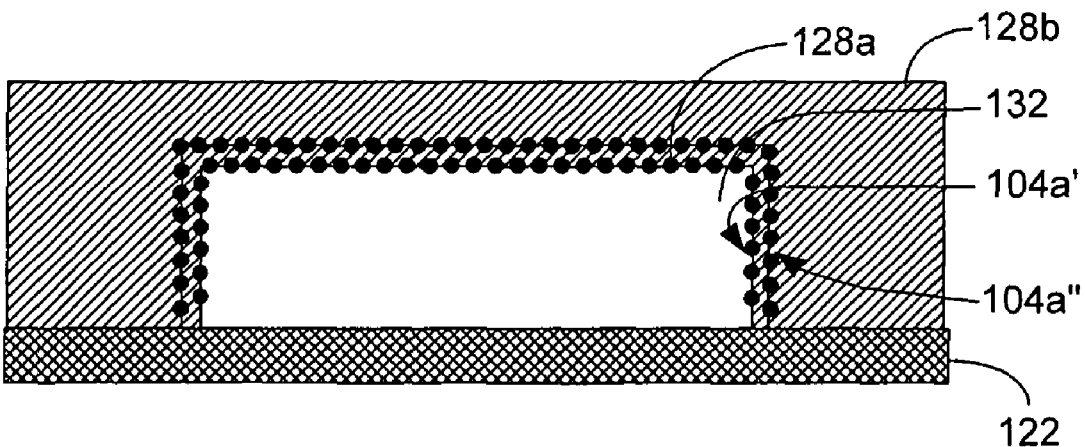

FIG. 8F illustrates the removal of the sacrificial material layer 142 to form the channels 132. The sacrificial material layer 142 can be removed using thermal decomposition, microwave irradiation, uv/visible irradiation, plasma exposure, and combinations thereof. It should be noted that the sacrificial material layer 142 could be removed at a different step in the fabrication process.

It should be noted that other features of the micro-fuel cell can be included in the fabrication process, such as the formation of the anode current collector, cathode current collector, a porous catalyst layer disposed on the top-side of the membrane opposite the side of the membrane 128a and 128b as the substrate 122, catalyst layer disposed on the substrate 122 on the bottom of the channel 132, a polymer layer, and the like. The steps of fabrication process can be altered to add these features.

EXAMPLE 1

Now having described the embodiments of the fuel cells in general, Example 1 describes some embodiments of the fuel cells and uses thereof. The following is a non-limiting illustrative example of an embodiment of the present disclosure that is described in more detail in "Microfabricated Fuel Cells with Thin-Film Silicon Dioxide Proton Exchange Membranes", *Journal of the Electrochemical Society* (in press) which is incorporated herein by reference. This example is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

Microfabricated fuel cells have been designed and constructed on silicon integrated circuit wafers using many processes common in integrated circuit fabrication, including sputtering, polymer spin coating, reactive ion etching, and photolithography. Proton exchange membranes (PEM) have been made by low-temperature, plasma-enhanced chemical vapor deposition (PECVD) of silicon dioxide. Fuel delivery channels were made through the use of a patterned sacrificial polymer below the PEM and anode catalyst. Platinum-ruthenium catalyst was deposited by DC sputtering. The resistivity of the oxide films was higher than traditional polymer electrolyte membranes (e.g., Nafion™) but they were also much thinner.

Experimental Method

The design and fabrication of the micro-fuel cells is based on a technique of using a sacrificial polymer to form the fuel delivery channels for the anode. This sacrificial polymer, Unity 2000P (Promerus LLC, Brecksville, Ohio), was patterned by ultraviolet exposure and thermal decomposition of the exposed areas. The membrane and electrodes coat the patterned features in a sequential buildup process. One of the last steps in the fabrication sequence is the thermal decomposition of the patterned Unity features, leaving encapsulated microchannels (e.g., similar to process shown in FIGS. 4A through 4H). Unity decomposition took place in a Lindberg tube furnace with a steady nitrogen flow. The final decomposition temperature and time was about 170° C. for about 1.5 hours. The micro fuel cell fabrication included deposition of catalytic electrodes and current collectors before and after the encapsulating material, which served as the PEM, was deposited. A schematic cross section of the device built on an array of parallel microchannels is shown in FIG. 3A.

Silicon dioxide was used as the encapsulating material and PEM. The deposition of $SiO_2$ took place in a Plasma-Therm PECVD system (Plasma-Therm, St. Petersburg, Fla.) at temperatures of 60-200° C. The reactant gases were silane and nitrous oxide with a $N_2O:SiH_4$ ratio of 2.25 and operating pressure of 600 mTorr. Deposition times of 60-75 minutes produced film thicknesses, measured with an Alpha-Step surface profilometer (KLA-Tencor, San Jose, Calif.), between 2.4 and 3.4 µm.

Figure 9:
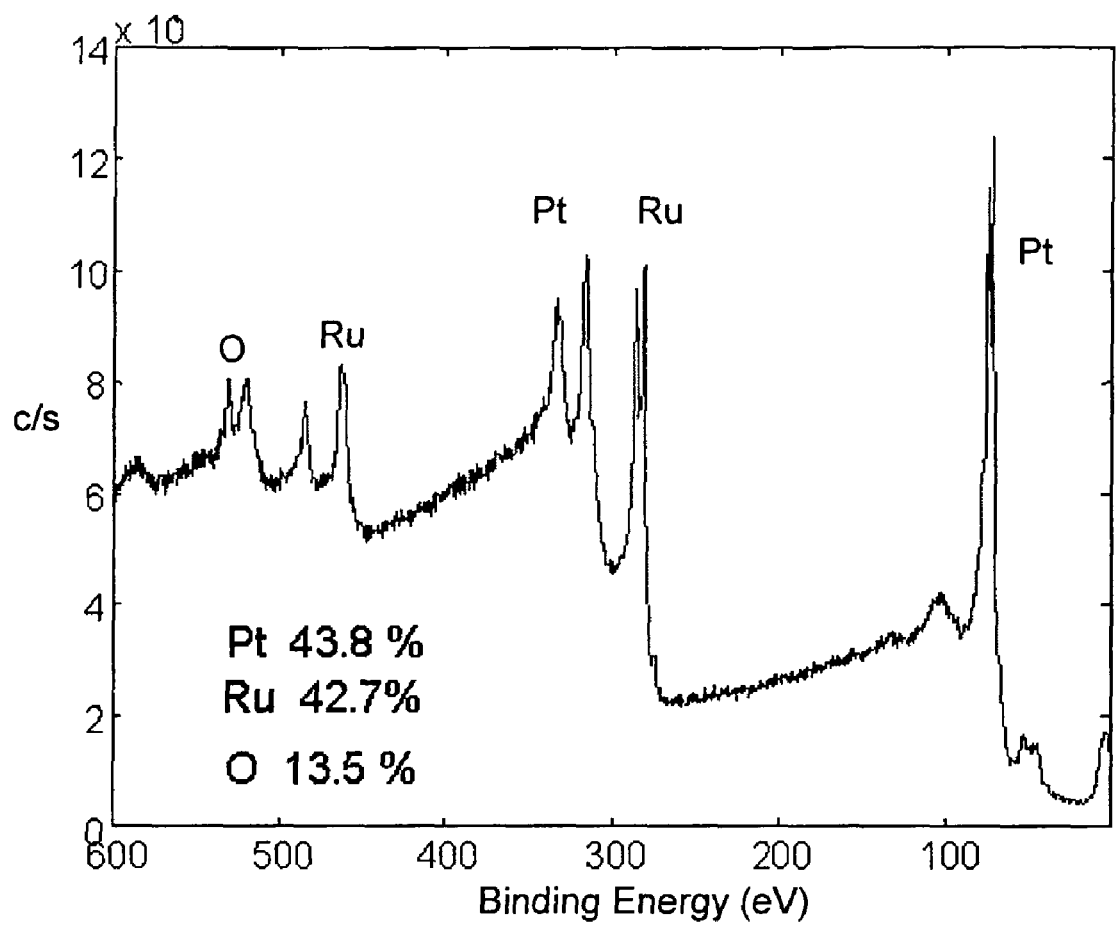
FIG. 9 is an XPS scan of sputtered platinum/ruthenium (Pt/Ru).

The catalyst layers were sputter deposited using a CVC DC sputterer (CVC Products, Inc., Rochester, N.Y.). A 50:50 atomic ratio platinum/ruthenium target (Williams Thin-Film Products, Brewster, N.Y.) was used as the source target. FIG. 9 shows an X-ray photoelectron spectroscopy (XPS) scan confirming that the sputtered films have equal amounts of the two metals. Porous films with an average thicknesses of about 50-200 Å were deposited on the sacrificial polymer, and then coated with the membrane, to serve as anode catalysts. In addition, an about 600 Å thick layer of Pt/Ru was deposited on the bottom of the anode microchannels opposite the membrane to serve as both additional catalyst and for current collection. This additional catalyst improved the performance of the microchannel fuel cells, particularly when using acidic methanol.

Porous catalytic cathodes were also fabricated by sputtering of Pt or Pt/Ru on the top, or outside, of the PEM. However, the cathodes on some samples were made by painting a prepared catalyst ink containing carbon-supported Pt in Nafion™ on the PEM, followed by coating with a porous gold current collector. This thick-film approach increased the catalyst loading and performance on the cathode side of the PEM. This was especially useful in studying the anode performance by eliminating the oxygen reduction at the cathode from being the rate-limiting step.

All electrochemical measurements, including impedance spectroscopy (IS) and linear voltamagrams, were performed with a PerkinElmer PARSTAT 2263 (EG&G, Princeton, N.J.) electrochemical system. The scan rate for linear sweep voltametry was 1 mV/s. Ionic conductivity was measured with impedance spectroscopy through $SiO_2$ films deposited onto aluminum-coated substrates and contacted with a mercury probe, as well as with actual cells. The frequency range for the impedance measurement was from 100 mHz to 1 MHz, with an AC signal amplitude of 10 mV. Half-cell devices were fabricated with the fuel delivery channels and sputtered catalyst under the $SiO_2$ PEM. Instead of a cathode, epoxy was used to form a well on top of the devices and filled with a 1 M sulfuric acid solution. Measurements were made with a saturated calomel electrode (SCE) and a Pt wire as the reference and counter electrodes, respectively, placed in the sulfuric acid solution. A PHD 2000 Programmable Syringe Pump (Harvard Apparatus, Holliston, Mass.) delivered liquid fuels and controlled the flow rates. Hydrogen was supplied with a pressurized tank of ultra high purity grade gas that passed through a bubbler to humidify the feed.

Results and Discussion

Microfabricated fuel cells were successfully fabricated using many materials and processes common to integrated circuit fabrication. The performance of the micro-fuel cells with different fuels and temperatures was measured for cells with different features, including half-cells and full cells. The purpose was to investigate the individual fuel cells components (e.g., anode, cathode, and PEM) as a function of processing conditions.

Figure 10:
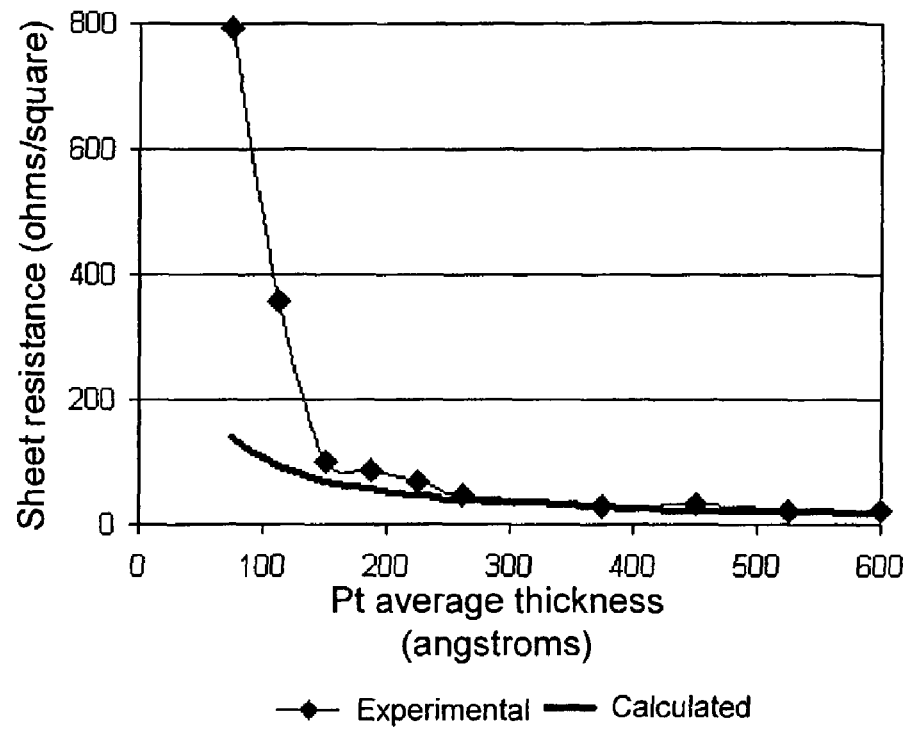
FIG. 10 is a plot of the measured and calculated resistances for sputtered platinum films.

In addition to catalytic activity, the key properties that were desired for the sputtered catalyst layers were porosity and electrical conductivity. The catalyst layer that contacts the membrane must be porous so that the protons generated during oxidation can come in contact with the PEM and pass to the cathode. The electrons generated at the anode catalyst need a path to the metal current collectors. Different amounts of Pt were sputtered onto substrates containing two solid electrodes patterned on opposite sides of an insulator. The sheet resistance of the Pt layers across the space between the electrodes was measured. FIG. 10 shows the measured resistance ($\Omega$/square) of sputtered Pt films as a function of thickness and the calculated values for smooth, continuous films of the indicated thickness. Above about 300 Å, the measured values correspond to the expected values, indicating that the films were contiguous. Below about 150 Å the resistance increased more dramatically with decreasing thickness. This corresponded to a porous, discontinuous film, which was desired. Roughening of the Unity sacrificial polymer's surface through RIE increased the amount of metal that could be sputtered before making a solid layer. In this work, Pt/Ru layers with an average thickness of about 50-200 Å were used as porous, conducting layers on roughened Unity sacrificial polymer.

A titanium adhesion layer was deposited on top of the Pt/Ru before $SiO_2$ deposition. The amount of Ti needed for adhesion was minimized. About 45 Å (average thickness) of Ti was deposited between Pt/Ru and $SiO_2$ in the sputtered electrodes.

Sputtering about 600 Å, or approximately 100 µg/cm$^2$, of Pt/Ru prior to the deposition and patterning of the Unity sacrificial polymer produced a relatively solid (non-porous) layer on the substrate that increased the total amount of anode catalyst in the cell that could be utilized by a conducting analyte (e.g., acidic methanol). It also seemed to somewhat improve performance with hydrogen. Therefore, all results are discussed herein for cells fabricated with a solid layer of Pt/Ru on the bottom of the microchannels.

Figure 11:
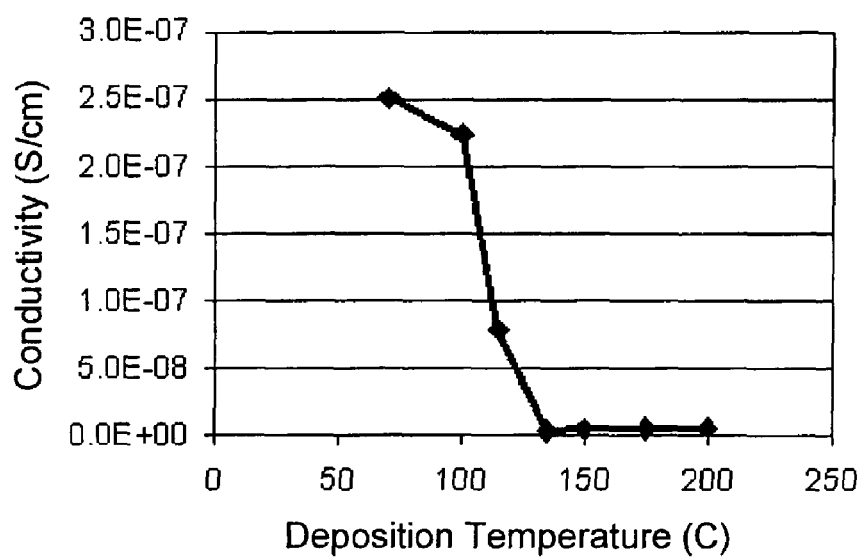
FIG. 11 is a plot of the ionic conductivity of $SiO_2$ films measured through impedance spectroscopy.

The requirements for the proton exchange membrane are different from the traditional PEM (e.g., Nafion™) due to the mechanical properties and thickness required in microfabricated fuel cells. Here, $SiO_2$ is shown to work as a stand-alone membrane. $SiO_2$ films were deposited by PECVD and the ionic conductivity was measured with impedance spectroscopy at room temperature. FIG. 11 shows the ionic conductivity of silicon dioxide vs. deposition temperature. As the deposition temperature decreased, the conductivity increased due to higher silonol concentration and lower density. The conductivity of the films was much lower than for other commonly used PEMs, such as Nafion™, but they are also much thinner than other fuel cell membranes. Extruded Nafion™ membranes (equivalent weight of 1100) have area resistances of 0.1-0.35 $\Omega$-$cm^2$. The area resistance of a 3 µm thick $SiO_2$ film deposited at 100° C. is 1200 $\Omega$-$cm^2$ at room temperature. The relatively high resistance leads to a decrease in cell voltage at higher current. The $SiO_2$ films used in these devices were adequate to investigate the other parameters, such as the anode and cathode catalyst loading. While they are sufficient for the lower current devices used in this example, improved $SiO_2$ PEMs are being investigated and will be reported in the future.

Figure 12:
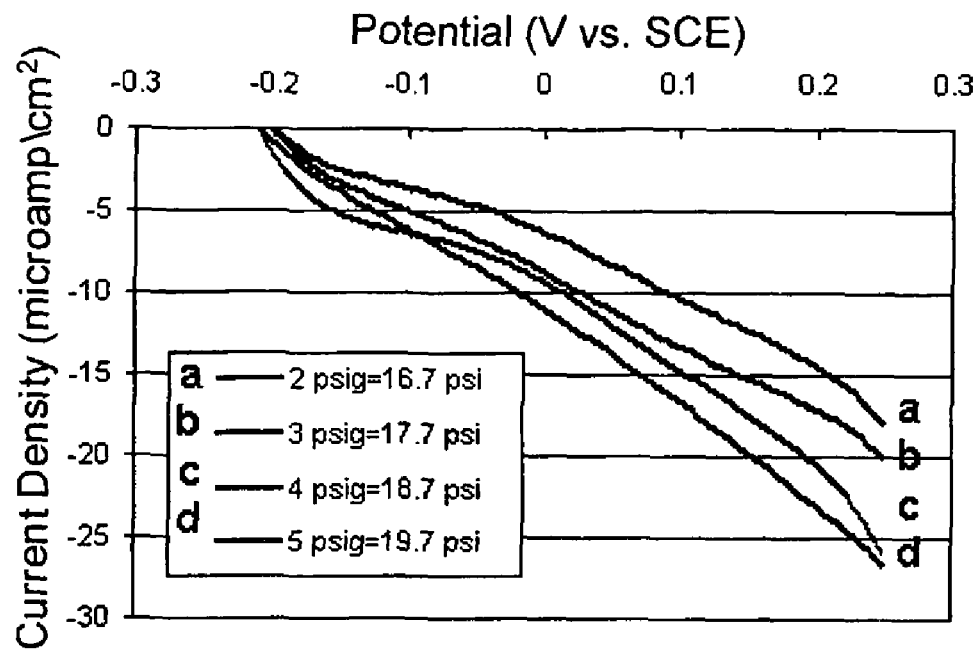
FIG. 12 is a plot of a half-cell performance of microchannels with humidified hydrogen.
Figure 13:
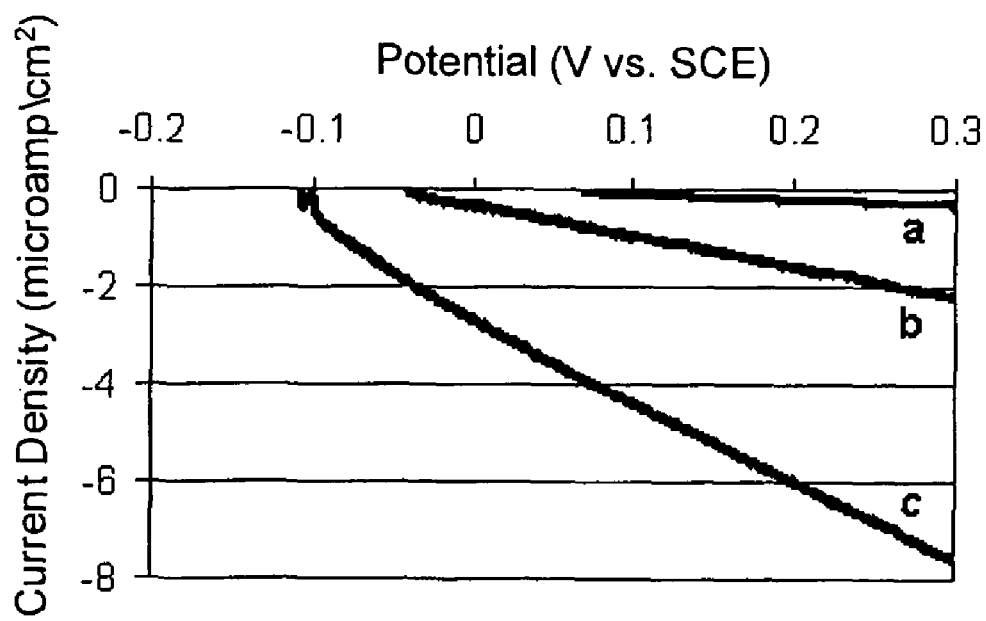
FIG. 13 is a plot of a half-cell performance of microchannels with methanol-water and acid-methanol-water solutions.

Half-cell devices were fabricated and tested to evaluate the anode performance with different fuels and provide a comparison for the full cell tests. FIGS. 12 and 13 show the half-cell results for hydrogen and methanol, respectively. A solid layer of Pt/Ru was deposited before the sacrificial polymer was patterned, as well as a porous layer on top of the patterned features to be in contact with the membrane. The catalyst weight at the membrane surface was 17 µg/$cm^2$.

Hydrogen was supplied with a pressurized tank of ultra high purity grade gas that passed through a bubbler to humidify the feed. FIG. 12 shows the results for inlet pressures of 1-4 psig (15.7-18.7 psia). The current densities of the half-cells scale with the partial pressure of the humidified hydrogen. This indicates that the performance is chiefly limited by the catalytic reaction kinetics at the anode, that is, proportional to hydrogen partial pressure. Further improvements in current density are possible with improved activity of the anode catalyst.

The methanol in water concentration was 1 M. The acidic methanol mixture contained 1 M sulfuric acid with 1 M methanol. FIG. 13 shows the half-cell polarization curves for methanol and acidic methanol. Adding sulfuric acid to the fuel made the solution conductive to protons. The higher active surface area, due to the conductivity of the acidic methanol solution, improved the current density. The Pt/Ru catalyst that was deposited on the walls of the channel not in contact with the membrane was utilized to increase the amount of methanol oxidation. Increasing the flow rate of the acidic methanol fuel improves the current density and open-circuit potential. The main detriment to performance at lower flow rates appears to be the formation of carbon dioxide bubbles at the anode that must be pushed out of the microchannels. With the current densities observed at 0.25 V vs. SCE (2 and 7 mA/$cm^2$ for 1 and 5 mL/hr, respectively), the production of gaseous $CO_2$ bubbles cover catalyst sites and may also restrict the proton conductance through the fuel from the bottom of the microchannels to the PEM.

Microfabricated full-cells were fabricated and tested with linear voltametry at a scan rate of 1 mV/sec from the open-circuit potential. Table 1 of Example 1 compares the differences in process between five sets of cells that are presented here to demonstrate the key parameters (anode and cathode construction) that affect cell performance for these power devices.

TABLE 1

Processing characteristics of micro-fuel cell samples

| Sample | Anode catalyst weight* (µg/$cm^2$) | $SiO_2$ membrane thickness (µm) | Cathode catalyst |
|---|---|---|---|
| A | 31 | 3.2 | Sputtered |
| B | 17 | 3.2 | thick-film |
| C | 34 | 3.2 | thick-film |
| D | 43** | 3.2 | thick-film |
| E | 17 | 2.4 | thick-film |

Figure 14:
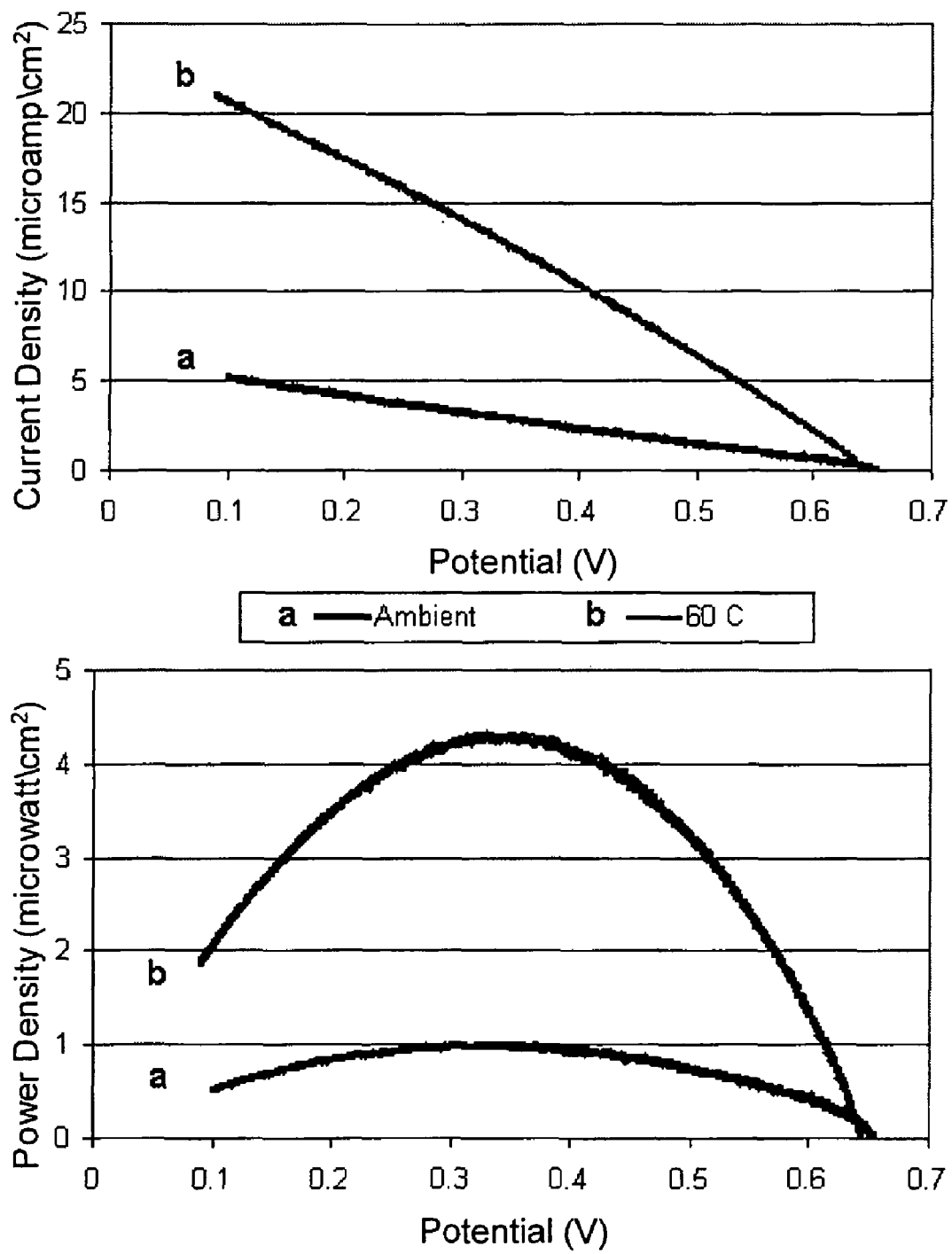
FIG. 14 is a plot of a micro-fuel cell performance with sputtered anode and cathode.

*Weight at membrane surface (100 µg/$cm^2$ at bottom of microchannels)
**Total weight of two Pt/Ru layers with 400 Å $SiO_2$ deposited between FIG. 14 shows polarization (top) and power (bottom) curves for one cell, sample A, that had sputtered catalyst with a loading of 31 µg/$cm^2$ at both the anode and cathode. Humidified hydrogen with an inlet pressure of 1 psig served as the fuel and oxygen from the air was reduced at the cathode. The performance at 60° C. was approximately four times greater than at ambient conditions with a measured peak power density of 4 µW/$cm^2$. The lower current densities of these devices with sputtered catalyst on the cathodes compared to the results from the anode half-cells run with hydrogen shown in FIG. 11 demonstrate that their performance is limited by the catalytic activity of the air cathode. This agrees with the expectation that ambient oxygen reduction at the cathode would be performance limiting when pressurized hydrogen was used at the anode.

Figure 15:
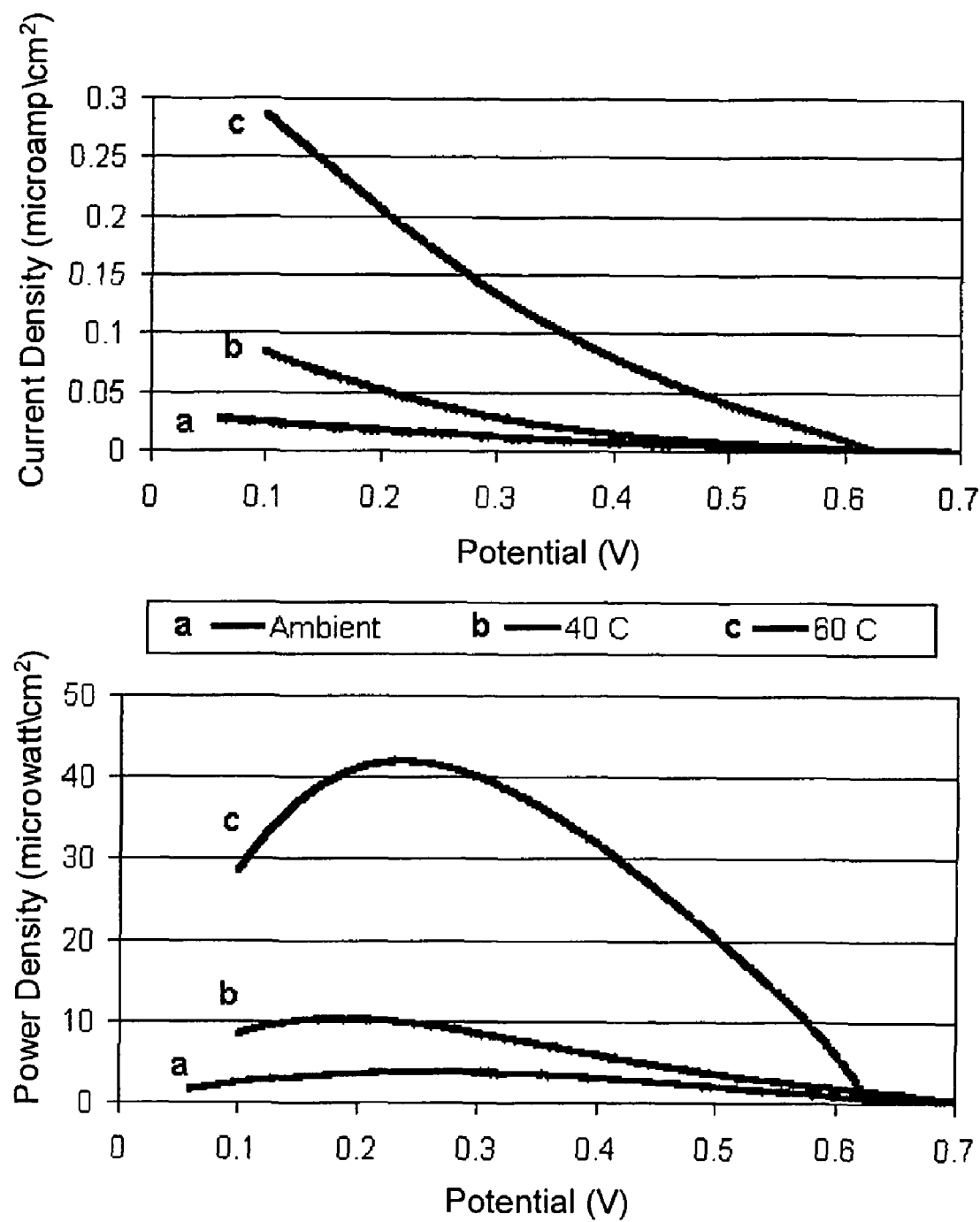
FIG. 15 is a plot of a micro-fuel cell performance of sample B at different temperatures.

A thick-film ink catalyst was coated onto the air-breathing cathode to improve its area and catalyst activity. When using the painted catalyst ink on top of the membrane, the full cell performance increased dramatically due to the increase in cathode catalyst loading. Because of the significant improvement to the oxygen reduction at the cathode, it was no longer the limiting electrode. The performance of cells with the thick-film cathode was a function of the anode composition. FIG. 15 shows the polarization (top) and power (bottom) curves at ambient temperature, 40° C., and 60° C. for sample B. This sample had an anode and membrane similar to sample A, but used the catalyst ink and porous gold current collector for the cathode. Hydrogen with an inlet pressure of 1 psig was the fuel and the cathode was air-breathing. The room-temperature polarization curve shows current densities very similar to the hydrogen half-cell results from FIG. 11. The performance was approximately one order of magnitude greater than sample A with a peak power density of 42 µW/$cm^2$ at 0.23 V and 60° C. These two results indicate that the anode limits the sample's performance when using the painted catalyst instead of the sputtered catalyst at the cathode.

The temperature dependence was such that greater power output could be achieved at elevated temperatures. Waste heat is produced in fuel cells, however, the size of these devices and the amount of power generated suggest that they would not be able to retain enough heat for operation at an elevated temperature. Integrated fuel cells could also use some heat released from the circuit (or other electronic devices) that they are built on.

Figure 16:
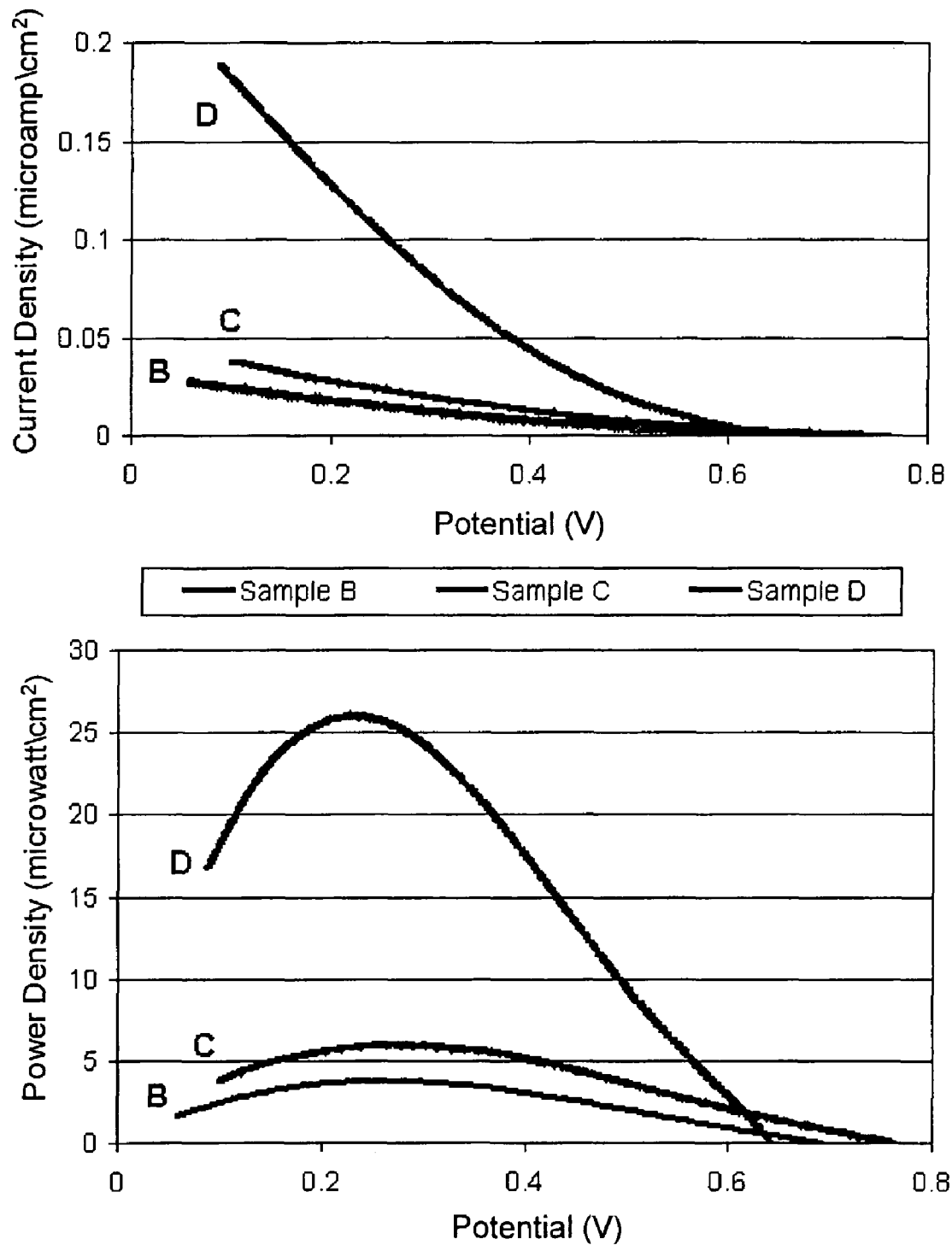
FIG. 16 is a plot of ambient temperature micro-fuel cell performance of samples B, C, and D with different amounts of sputtered anode catalyst.

Improvements in the activity and surface area of the anode can lead to higher currents and power densities. The anode performance was improved with a higher catalyst loading. FIG. 16 shows the room temperature polarization (top) and power (bottom) curves of three samples with different amounts of sputtered catalyst at the anode. Humidified hydrogen with an inlet pressure of 1 psig was the fuel and the thick-film cathodes were air-breathing. A solid layer of approximately 100 μg/cm² of Pt/Ru was deposited on the bottom of the microchannels on each sample. At the membrane surface, sample B had 17 μg/cm² of Pt/Ru and sample C had 34 μg/cm². With twice as much sputtered Pt/Ru at the membrane, sample C shows an improvement in performance of less than 50% over sample B. Sputtering twice as much Pt/Ru does not double the catalyst surface area because the deposited islands are getting bigger, forming a more continuous (less porous) film.

To improve the electrode performance, the catalyst surface area, particularly the catalyst that is in direct contact with the electrolyte, must be increased. A thin layer of $SiO_2$ electrolyte could be deposited between two catalyst depositions because it was deposited through PECVD. Sample D had the same 34 μg/cm² layer as C deposited on the patterned sacrificial polymer, followed by a deposition of 400 Å of $SiO_2$, and then an additional 8.5 μg/cm² of catalyst, before the thicker $SiO_2$ PEM layer was deposited. The second layer of sputtered Pt/Ru was embedded in $SiO_2$, increasing the catalyst/electrolyte contact area. With only 25% more Pt/Ru at the membrane, the peak power density of sample D was over four times greater than sample C at room temperature. This dramatic improvement in current and power density was due to the $SiO_2$-encapsulated layer of Pt/Ru that allowed for more membrane/catalyst contact in addition to the increase in total catalyst weight. The two thin layers of Pt/Ru and the small amount of $SiO_2$ between them most likely form a mixed matrix of catalyst and electrolyte that is conductive to both protons and electrons while increasing the overall catalyst surface area, particularly the area in contact with the electrolyte.

Figure 17:
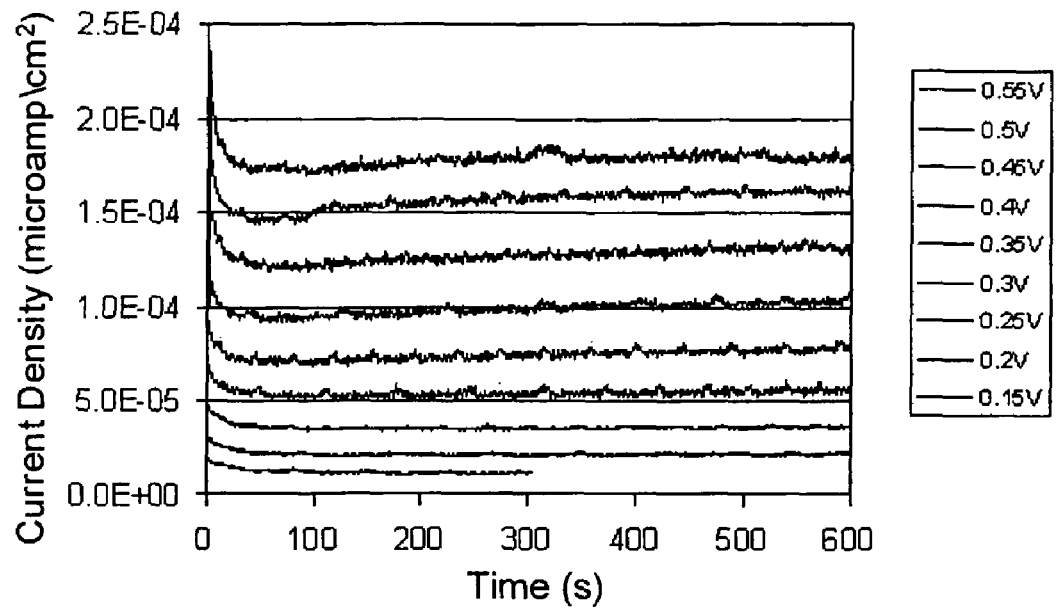
FIG. 17 is a plot of current density of the imbedded catalyst sample held at constant potential for about 10 minutes.
Figure 18:
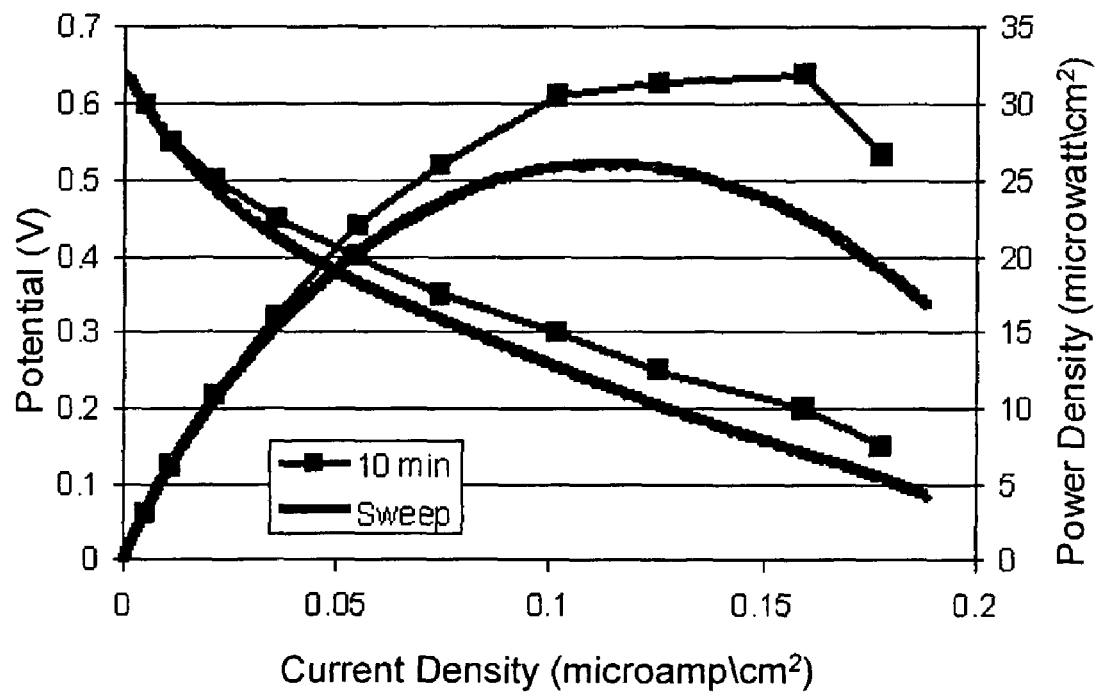
FIG. 18 is a plot of a comparison between steady-state (at 10 minutes) and linear voltametry polarization data for sample D with humidified hydrogen at room temperature.

The performance of the hydrogen fuel cells was studied as a function of time to determine if the data collected through linear voltammetry matches steady-state values at constant potential. FIG. 17 shows the current density of sample D when a constant potential is held for ten minutes. The data show a relatively constant performance that is very close to the values collected for a linear sweep of 1 mV/s, as shown in FIG. 18. Tests over longer periods of time, such as a few hours, with different devices have shown similar results. The $SiO_2$ did not swell with water like Nafion™ films, making them less susceptible to changes with time, such as a drop in performance from drying out.

Figure 19:
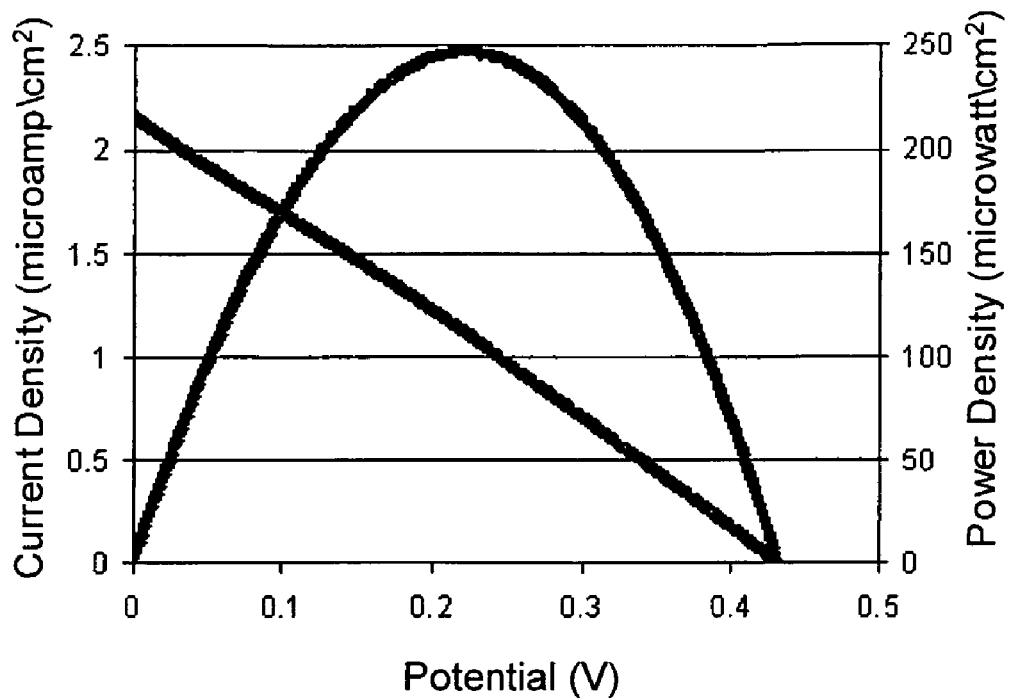
FIG. 19 is a plot of a microchannel fuel cell performance with 1.0 M acidic methanol at 1 mL/hr.

FIG. 19 shows the polarization and power curve for the acidic methanol solution run at room temperature with a flow rate of 1 mL/hr in sample E, a microchannel full cell with the thick-film cathode. The solid layer of catalyst at the bottom of the microchannel is utilized in addition to the porous Pt/Ru at the membrane in the oxidation of methanol because the fuel solution can conduct protons. While the open-circuit potential is lower than when using hydrogen, the peak current and power densities are much higher than the same device with hydrogen as the fuel.

The experiments have shown trends that are being used to further enhance the performance of microfabricated fuel cells. Adding catalyst to the bottom of microchannels is an effective technique for use with conductive fuels.

Conclusions

Micro-fuel cells utilizing sacrificial polymer-based microchannels and thin-film $SiO_2$ membranes have been successfully fabricated and tested. Low-temperature PECVD silicon dioxide shows promise for use in integrated thin-film devices. Lowering the deposition temperature dramatically increased the conductivity of the films to an acceptable level for the current densities achieved with the fabricated electrodes used in this study.

Repeated alternate catalyst sputtering and $SiO_2$ deposition steps to build up a catalyst matrix will provide an electrode with increased catalyst and membrane-catalyst contact area. Additional catalyst that is not in contact with the membrane can be utilized when using a conductive analyte, such as acidic methanol.

EXAMPLE 2

Now having described the embodiments of the fuel cells in general, Example 2 describes some embodiments of the fuel cells and uses thereof. The following is a non-limiting illustrative example of an embodiment of the present disclosure that is described in more detail in "Development of P-doped $SiO_2$ as Proton Exchange Membrane for Micro-Fuel Cells", *Electrochemical & Solid-State Letters* (submitted), which is incorporated herein by reference. This example is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

In microfabricated fuel cells, fuel delivery channels were made through the use of a patterned sacrificial polymer and a thin (about 3-6 μm) glass proton exchange membrane. The membranes were deposited using low-temperature plasma-enhanced chemical vapor deposition (PECVD) of silicon dioxide. Either Pt/Ru or Pt was sputtered on the membrane inside the microchannels as the anode catalyst.

The proton conductivity of the glass $SiO_2$ can be improved by phosphorus doping the $SiO_2$ to form phosphosilicate glass (PSG). The conductivity of PECVD PSG was higher by almost 2 orders of magnitude compared to undoped $SiO_2$[5]. The possible reason for higher proton conductivity is that phosphorus doping changes the $SiO_2$ structure and leads to a reduction in the strength of O—H bonding in the glass[5]. The higher conductivity of PSG, compared to pure $SiO_2$, allows the membrane to be thicker to increase the mechanical strength without sacrificing cell performance through higher cell resistance.

It has been shown that the design and materials for the integrated glass-membrane micro fuel cell are effective for either methanol or hydrogen fuels[6-7]. However, since the thin glass membrane is relatively brittle, defects and cracks can form during the fuel cell fabrication process, resulting in high fuel crossover and low reliability of the microfabricated fuel cells. One possible approach to overcoming this drawback is to cast a layer of polymer on the top of the membrane to form a composite membrane with the glass. The prerequisites for the polymer layer are acceptable proton conductivity (area conductivity>0.1 S/cm²), good mechanical properties, and adequate adhesion between the polymer and glass. In a conventional proton exchange membrane (PEM) fuel cells, Nafion™ (a perfluorinated polymer with sidechains terminated with sulfonic acid) polymer is often used as the PEM[8-9]. Although Nafion™ polymer has some shortcomings, such as cost, methanol crossover rate, and modest operating temperatures, Nafion™ is still a suitable membrane for use in the PEM fuel cells because of its high ionic conductivity, mechanical strength, chemical stability, and low water swelling at operating conditions[10-12]. In this example, a layer of Nafion™ polymer was cast on top of silicon dioxide or PSG in the microfabricated fuel cells. The performance and durability of the fuel cells with the composite membranes were studied using hydrogen and methanol as the fuels.

Experimental:

Porous platinum or platinum/ruthenium layers that served as the anode catalyst were sputter deposited on the sacrificial polymer by DC sputtering (CVC Products, Inc., Rochester, N.Y.). The average thickness of this catalyst layer was 200 Å (34 μg/cm$^2$). For the fuel cells with a dual-layer anode catalyst, an additional 50 Å of Pt or Pt/Ru was deposited after a very thin (750 Å) PECVD deposition of glass was deposited over the first anode catalyst layer. Also, a 600 Å-thick layer of Pt or Pt/Ru alloy was deposited on the bottom of the anode microchannels opposite the membrane to serve both as additional catalyst and for current collection. Unity 2000P (Promerus LLC, Brecksville, Ohio) was used as the sacrificial polymer to form the microchannel structures.

Silicon dioxide or PSG was used as the encapsulating material and PEM. The deposition of $SiO_2$ took place in a Plasma-Therm PECVD system (Plasma-Therm, St. Petersburg, Fla.) at 100° C. The reactant gases were silane and nitrous oxide with a $N_2O:SiH_4$ ratio of 2.25 and operating pressure of 600 mTorr. Deposition times of 60-75 minutes were used to produce film thicknesses, measured with an Alpha-Step surface profilometer (KLA-Tencor, San Jose, Calif.), between 2.4 and 3.4 μm.

Deposition of PSG took place in a Unaxis PECVD system (Unaxis, St. Petersburg, Fla.) at temperatures of 100-250° C. The reactant gases were nitrous oxide and a silane/phosphene mixture. The amount of phosphene in the mixture was 6% of the silane. Other parameters, such as $N_2O:SiH_4/PH_3$ ratio and RF power were varied and resulted in different deposition rates.

The Nafion™ solution (containing less than 10% perfluorosulfonic acid/PTFE copolymer resin manufactured by Dupont) and diethylene glycol (99% from Aldrich Chemical) in a ratio of 5:1 was cast on the surface of the silicon dioxide after treatment with an adhesion promoter. The sample was baked on a hot plate at 85° C. for 5 hr and a 40 to 50 μm-thick Nafion™ film was formed on the $SiO_2$ or PSG.

Figure 20:
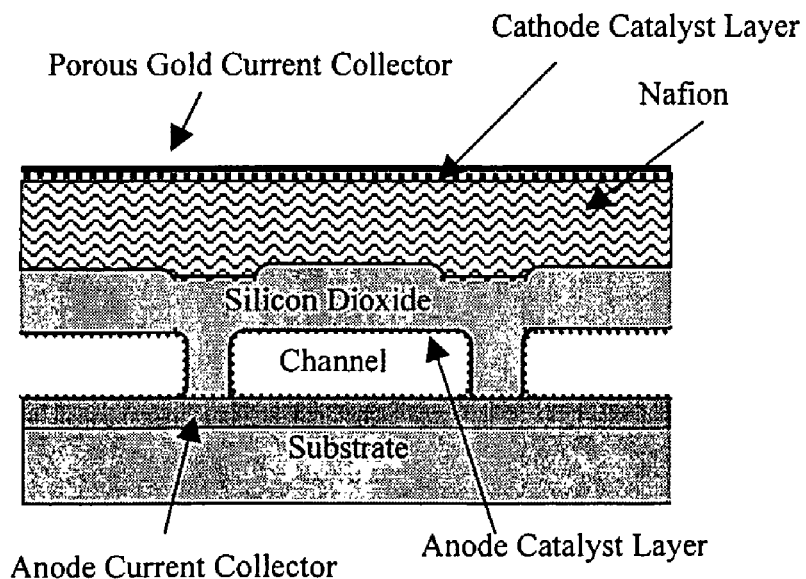
FIG. 20 is a cross-section of a composite membrane fuel cell with parallel microchannels.

The cathode catalyst was made by painting a prepared catalyst ink containing carbon-supported Pt (from E-TEK) in Nafion™ on the PEM, followed by coating with a porous gold current collector. The cathode catalyst loading was 0.1 mg/cm$^2$. Oxygen from the air was reduced at the cathode. A schematic cross section of the device built on an array of parallel microchannels is shown in FIG. 20.

All electrochemical measurements, including impedance spectroscopy (IS) and linear sweep voltammagrams, were performed with a PerkinElmer PARSTAT 2263 (EG&G, Princeton, N.J.) electrochemical system. The scan rate for linear sweep voltammetry was 1 mV/s. The frequency range for the impedance measurement was from 1 Hz to 1.25 MHz, with an AC signal amplitude of 10 mV. Hydrogen was supplied with a pressurized tank of ultra high purity grade gas that passed through a bubbler to humidify the feed. A PHD 2000 Programmable Syringe Pump (Harvard Apparatus, Holliston, Mass.) delivered methanol fuel and controlled the flow rate.

Figure 21:
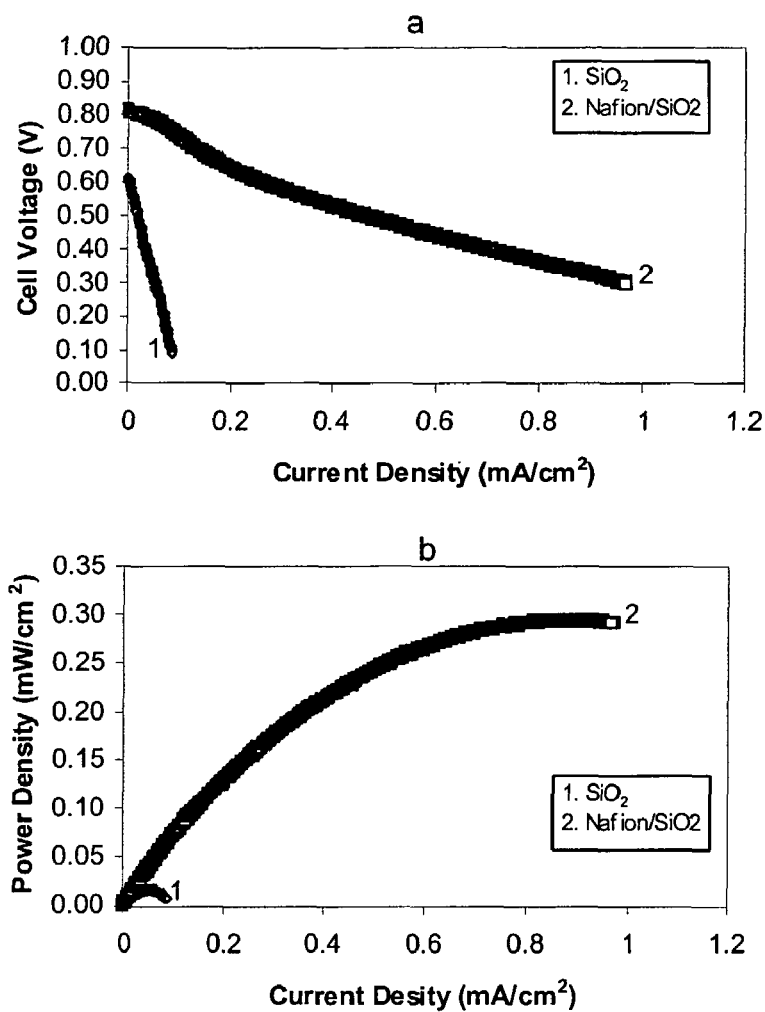
FIG. 21 is a plot that illustrates the performance of the micro fuel cells with $SiO_2$ and Nafion™/$SiO_2$ as membranes at room temperature: (a) current-potential curve; (b) current-power curve.
Figure 22:
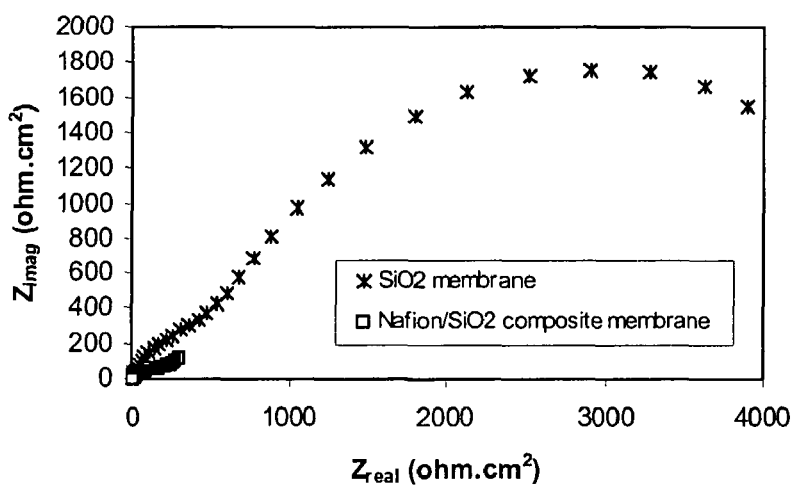
FIG. 22 is a plot that illustrates the electrochemical impedance of the micro fuel cells with and without Nafion™ on the $SiO_2$ membrane at room temperature and 0.45 V.

Results:

FIG. 21 shows the room temperature polarization and power curves for microfabricated fuel cells with 3 μm single $SiO_2$ film and Nafion™/$SiO_2$ composite film as the PEM. Humidified hydrogen with an inlet pressure of 1 psig served as the fuel at the anode and oxygen from the air was reduced at the cathode. The performance (open-circuit potential and current density) of the fuel cells were improved dramatically by forming a composite membrane. For the composite PEM, a thin $SiO_2$ glass film was used as the first layer and then coated with a layer of Nafion™ cast from solution. The glass protected the sacrificial polymer from being dissolved by the solvent used to cast the polymer layer during the micro fabrication process. The electrochemical characteristics of the fuel cells with and without Nafion™ on the glass were investigated using electrochemical impedance spectroscopy (EIS) at room temperature to elucidate the performance improvement of the fuel cells with the composite membranes. The Nyquist diagrams at 0.45 V cell potential are shown in FIG. 22. The diameter of the depressed semicircle corresponds to the total charge transfer resistance $R_{ct}$ (including anode and cathode) whereas the intercept with the real axis at high frequency represents the resistance of the membrane[13-14]. The area resistance of the $SiO_2$ membrane in the cell was reduced from 1.67 Ω·cm$^2$ to 1.00 Ω·cm$^2$ by casting a layer of Nafion™ on it to form a composite membrane. The $R_{ct}$ for the fuel cell with the composite membrane is much smaller than that with the single glass membrane leading to better fuel cell performance. The cathode electrochemical reaction was accelerated by the higher proton concentration of Nafion™ compared to the glass film. The improvement in the electrochemical reaction on the cathode in the cell with the composite membrane plays an important role in increasing the cell performance.

In the microfabricated fuel cells, the anode catalyst loadings were very low compared with conventional PEM fuel cells. The anode catalyst loading has been adjusted to improve the catalyst layer porosity. If the catalyst loading on the membrane is too high, the porosity of the catalyst layer will be insufficient for proton transport into the membrane. The key issue to improving the surface area of the catalyst without decreasing the porosity was to increase the anode catalyst. Multiple layers of Pt or Pt/Ru catalyst were deposited to increase the catalyst loading. A very thin layer of $SiO_2$ electrolyte was deposited between the two catalyst layers to form three-dimensional network structure 7.

Figure 23:
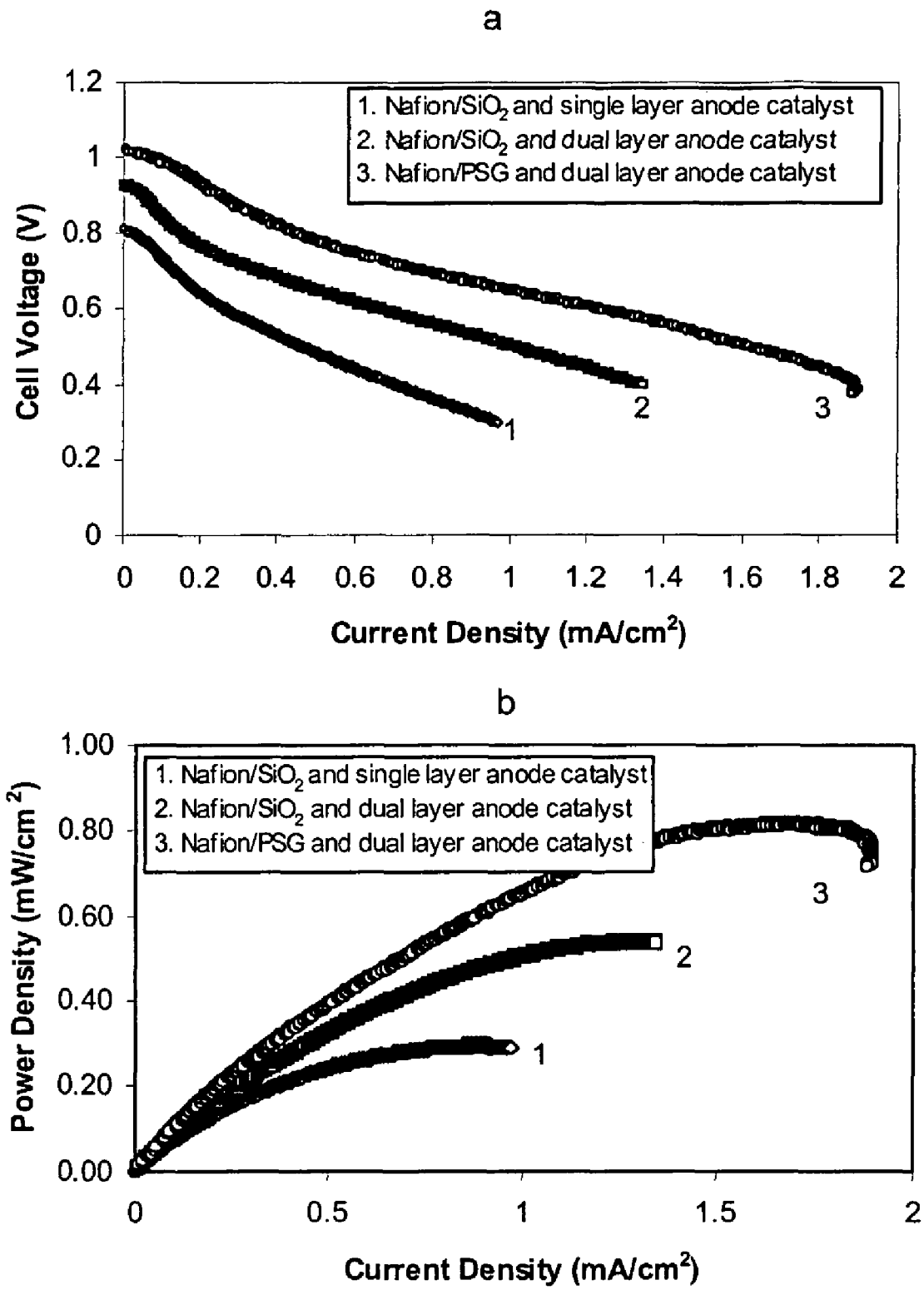
FIG. 23 is a plot that illustrates the performance of the micro fuel cells with Nafion™/glass composite membrane and single layer and dual layer anode catalyst at room temperature: (a) current-potential curve; (b) current-power curve.
Figure 24:
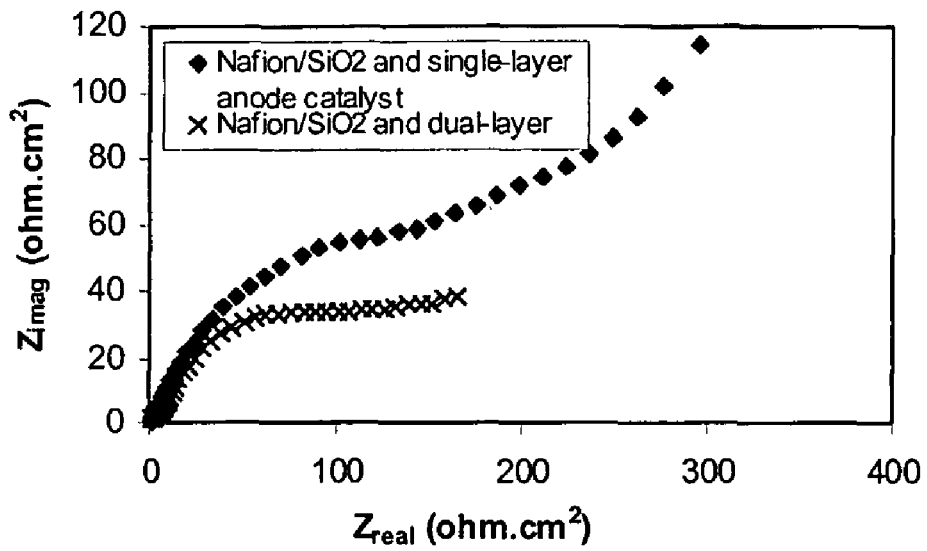
FIG. 24 is a plot that illustrates the electrochemical impedance of the micro fuel cell with Nafion™/$SiO_2$ composite membrane and single layer or dual layer anode catalyst at room temperature and 0.45 V.

FIG. 23 shows the performance of Nafion™/$SiO_2$ composite PEM fuel cells with single and dual-layer anode catalyst at room temperature. Humidified hydrogen was supplied at a pressure of 1 psig. After depositing another 50 Å of Pt, the total anode catalyst was increased by 11 μg/cm$^2$ and the performance increased significantly. FIG. 24 shows the Nyquist diagrams for the Nafion™/$SiO_2$ fuel cells with different anode catalyst loadings at the potential 0.45 V and room temperature. It indicates that the $R_{ct}$ for the fuel cell with dual-layer anode catalyst was smaller than the sample with single layer anode catalyst. Since the remainder of the configuration, such as membrane and cathode catalyst loading, were the same, the decrease in $R_{ct}$ can only be attributed to the increase in the anode catalyst loading. Thus, the multilayer anode catalyst fabrication is an effective way to increase the anode catalyst loading and active site for the hydrogen oxidation. In addition, the capacitive impedance for the cell with dual layer anode catalyst is lower than that with single layer anode catalyst due to the higher anode surface area.

FIG. 23 also shows the current and power for a cell with Nafion™/PSG (6 μm) composite PEM and dual layer anode catalyst. The performance was better than that of the cell with the Nafion™/$SiO_2$ PEM and dual layer anode catalyst because of the higher proton conductivity of the PSG. The maximum power density attained was 0.81 mW/cm$^2$. The PSG membrane was thicker than the $SiO_2$ membrane and provided additional mechanical strength with improved membrane conductivity and less diffusion of unreacted hydrogen from the anode to the cathode. Thus, all of the following results are based on cells with the Nafion™/PSG composite membrane and dual layer anode catalyst.

Figure 25:
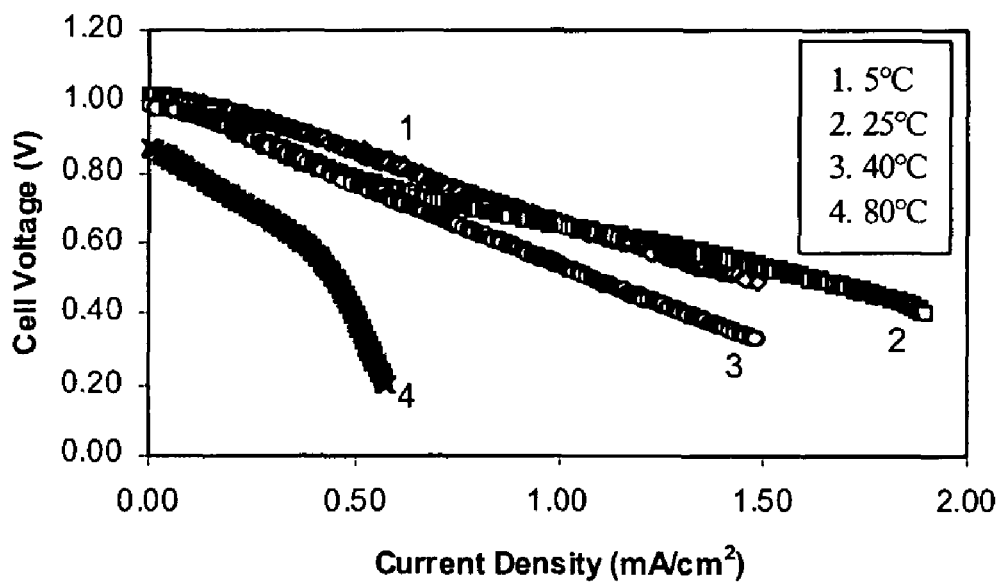
FIG. 25 is a plot that illustrates the performance of the hydrogen micro fuel cell at different temperatures with 1 psig inlet hydrogen pressure.

FIG. 25 shows the polarization curves at 5° C., 25° C., 40° C., and 80° C. for the cell with an inlet humidified hydrogen pressure of 1 psig. The performance of the cell, especially the open-circuit potential, decreased dramatically with the increasing operating temperature. When the temperature dropped back to room temperature, the open-circuit potential returned to 1.012 V and the fuel cell performance recovered. EIS was performed on the cell at different temperatures at the open-circuit potential. Table 1 lists the area resistance of the composite membrane in the cell at different temperatures. The area resistance of the composite membrane for proton transfer increases significantly with the temperature. The reason for the inferior performance and area resistance at elevated temperature is not clear, but it is specific to the cell components constructed in the microfabrication process. The expansion of the substrate with temperature is greater than that of the glass membrane (higher coefficient of thermal expansion), which could lead to poorer electrode-to-membrane conductivity.

TABLE 1

The area resistance at open-circuit potential of the Nafion ™/PSG PEM fuel cell with 1 psig inlet hydrogen pressure as a function of temperature.

| Temperature (° C.) | Area resistance of membrane ($\Omega \cdot cm^2$) |
|---|---|
| 25 | 1.25 |
| 40 | 2.42 |
| 80 | 7.43 |

The fuel cells with the Nafion™/PSG membrane and dual-layer anode catalysts have been operated at steady-state for a period of months. In a typical experiment using humidified hydrogen with inlet pressure of 1 psig at the room temperature, the cell current under constant-resistance load was 0.26 mA/cm$^2$ and the cell voltage was 0.4 V over a 7 day period.

In order to test the consumption of the hydrogen at the anode, the anode was charged with humidified hydrogen gas and sealed (with no exit, since only protons are produced upon oxidation of the hydrogen). The hydrogen was charged in the microchannel to a pressure of 3 psig (17.7 psia). A valve placed between the hydrogen source and the pressure transducer in the line was shut limiting the hydrogen available to the fuel cell to what was already in the tube and fuel cell channel. The total volume of this system, including the tubing, two valves, and the pressure transducer was 0.42 mL. At 3 psig, the total amount of hydrogen was 22.3 μmoles.

Figure 26:
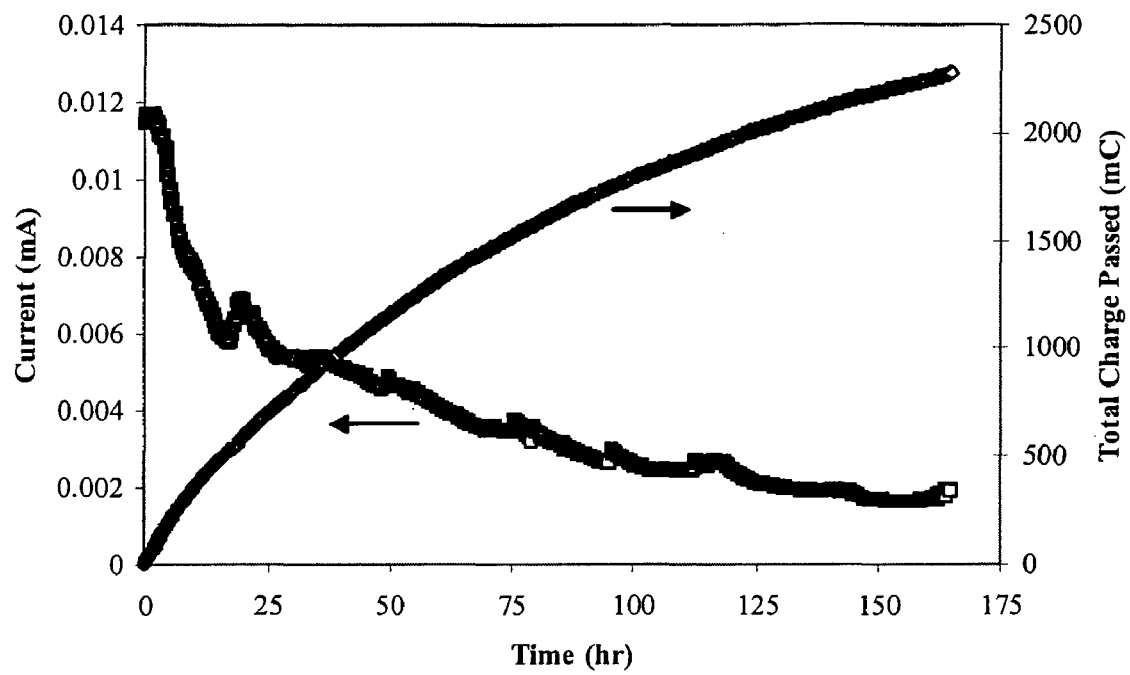
FIG. 26 is a plot that illustrates the current and total charge passed with time for a sealed microfabricated fuel cell cross 56 kΩ resistance operating on a limited supply of hydrogen at room temperature.
Figure 27:
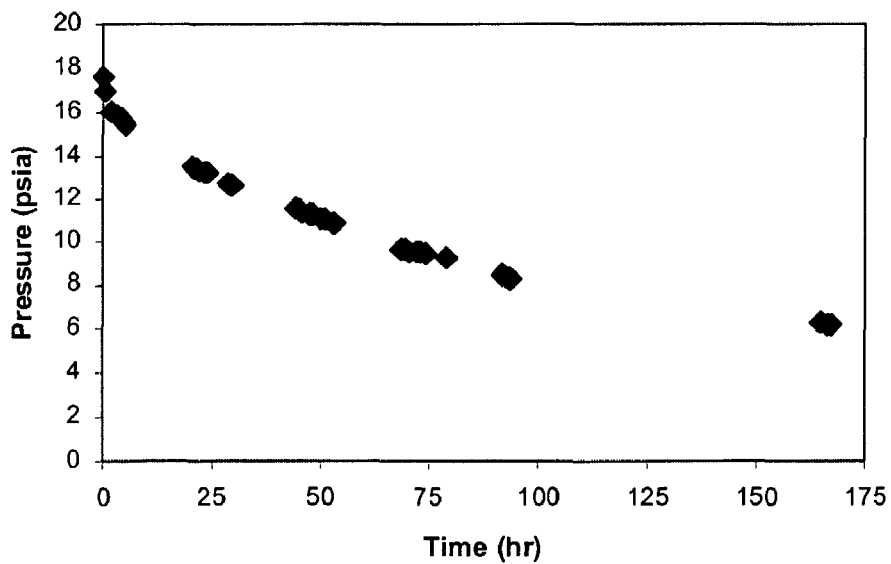
FIG. 27 is a plot that illustrates the pressure data for a microfabricated fuel cell operating on a limited supply of hydrogen.

A 56 kW resistor was placed across the cell to serve as the as the load and the potential was monitored throughout the discharge experiment. FIG. 26 shows the discharge current vs. time. Also plotted is the total calculated coulombs passed as the fuel cell discharged. After seven days, approximately 53% of the available hydrogen had been used. The pressure during the discharge test was recorded and is plotted in FIG. 27. The pressure at the end point of the experiment was −8.5 psig and remained constant at that value after the fuel cell load was removed (returned to open circuit conditions). The fact that the pressure fell below atmosphere conditions as hydrogen was consumed and did not change after the run indicated that the system was well sealed. The fuel utilization was 82%, as determined by the difference in initial and final hydrogen pressure. A comparison of the current and pressure data with time shows that the cell needs to be operated with the hydrogen pressure greater than one atmosphere to produce higher power density.

Figure 28:
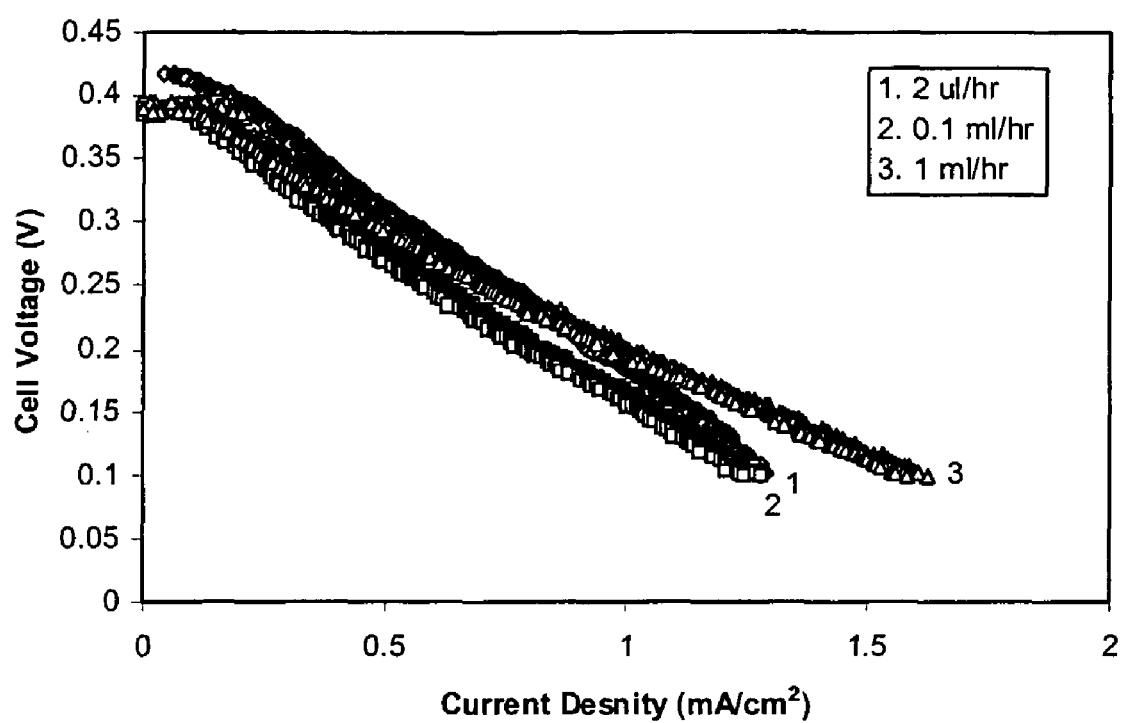
FIG. 28 is a plot that illustrates the performance of the direct methanol micro fuel cell with different 1 M methanol flow rate at room temperature.

Methanol provides a more convenient fuel for use in portable applications.[15] FIG. 28 shows the polarization curves for the cell (Nafion™/PSG composite membranes and dual layers anode catalyst) operated at room temperature and different fuel flow rates. The 1 M methanol fuel was fed by a syringe pump. The open circuit potential of the cell was 0.4 V and the performance was similar for fuel flow rates from 2 μl/hr to 1 ml/hr. In the micro channel, $CO_2$ evolution at the anode could collect and block the methanol from reaching the active catalytic sites on the anode. A flow rate of above 2 μl/hr was adequate for keeping the $CO_2$ from blocking the channel. The low voltage, as compared to Nafion™ membranes with a traditional membrane assembly is most likely due to the poor activity of the anode catalyst.

Figure 29:
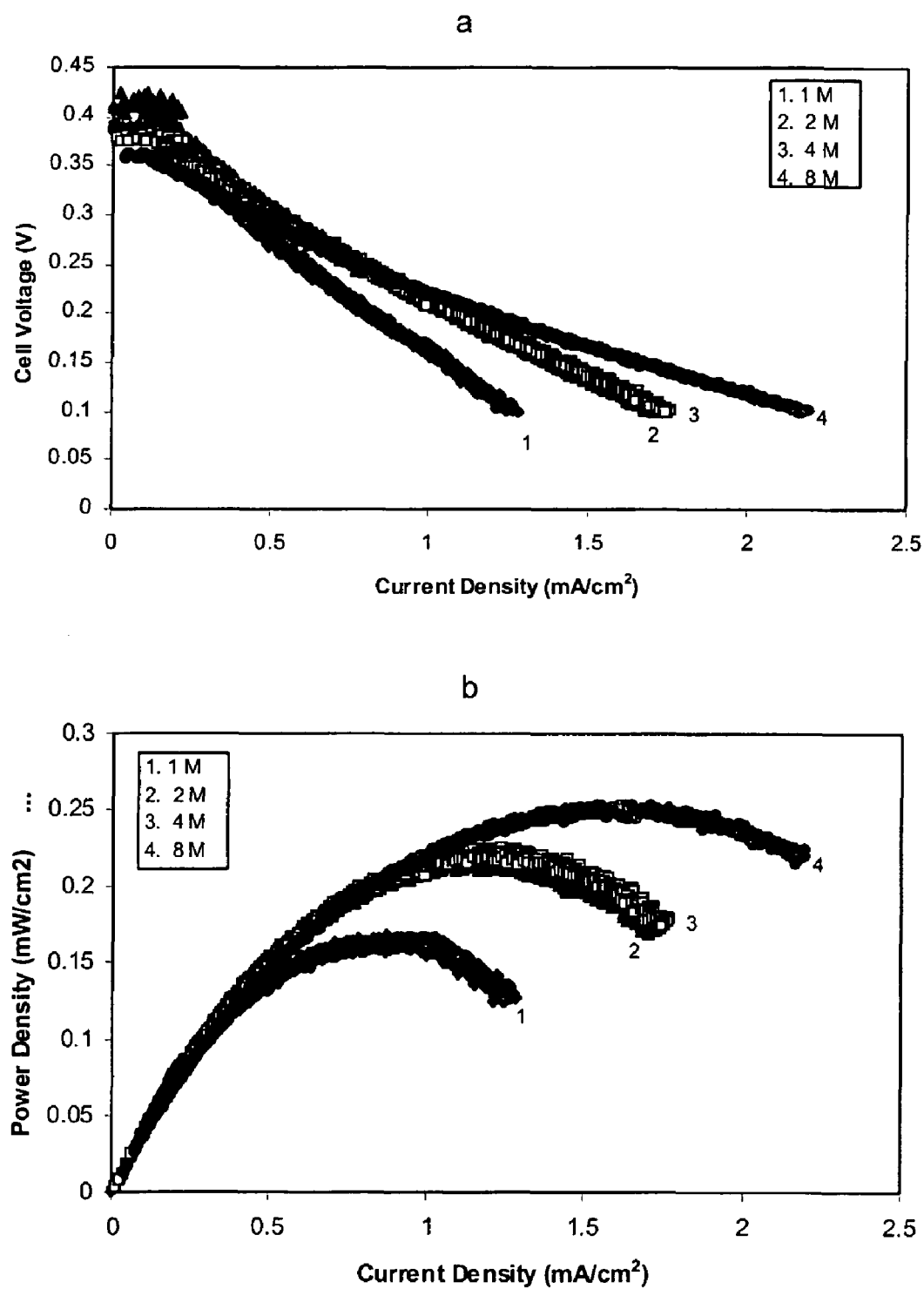
FIG. 29 is a plot that illustrates the performance of the direct methanol micro fuel cells with different methanol concentration at room temperature: (a) current-potential curve; (b) current-power curve.

FIG. 29 shows the performance of the micro fuel cell with different methanol concentrations at room temperature. The fuel flow rate was 100 μl/hr. The current density increased with higher methanol concentration, from 1 M to 8 M resulting in an increase in the maximum power density of the cell increased from 0.16 mW/cm$^2$ (at 1 M methanol) to 0.25 mW/cm$^2$ (at 8 M methanol). The low moisture content of the glass membrane does not require that the water concentration in the fuel be high. The high methanol concentration results in a higher energy density for the fuel. The methanol crossover through the glass membrane is also expected to be smaller than for polymer-based membranes due to the low permeability of glass[16]. Thus, at low power levels, the higher concentration of methanol can be used without a drop in cell performance.

Figure 30:
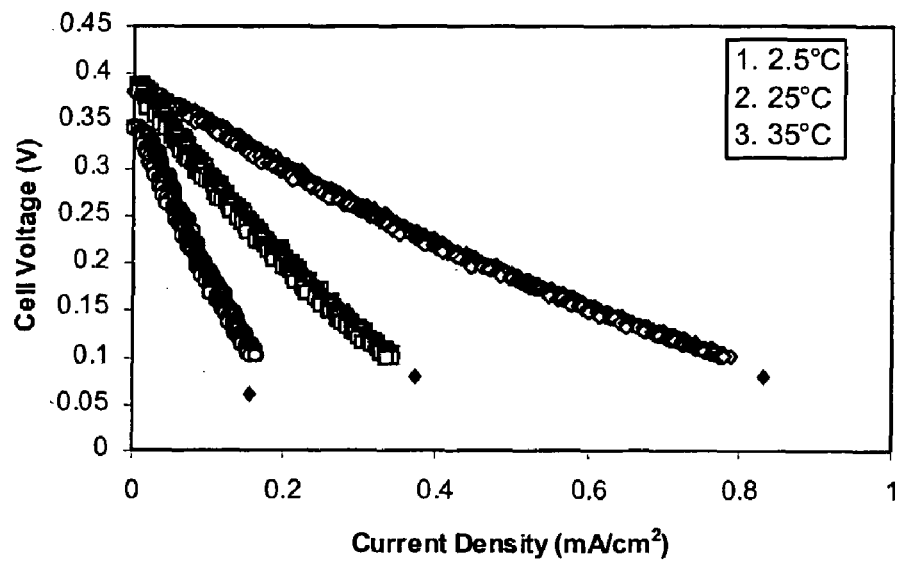
FIG. 30 is a plot that illustrates the performance of the direct methanol micro fuel cell operating at different temperatures on 8 M methanol with a flow rate of 0.1 ml/hr.
Figure 31:
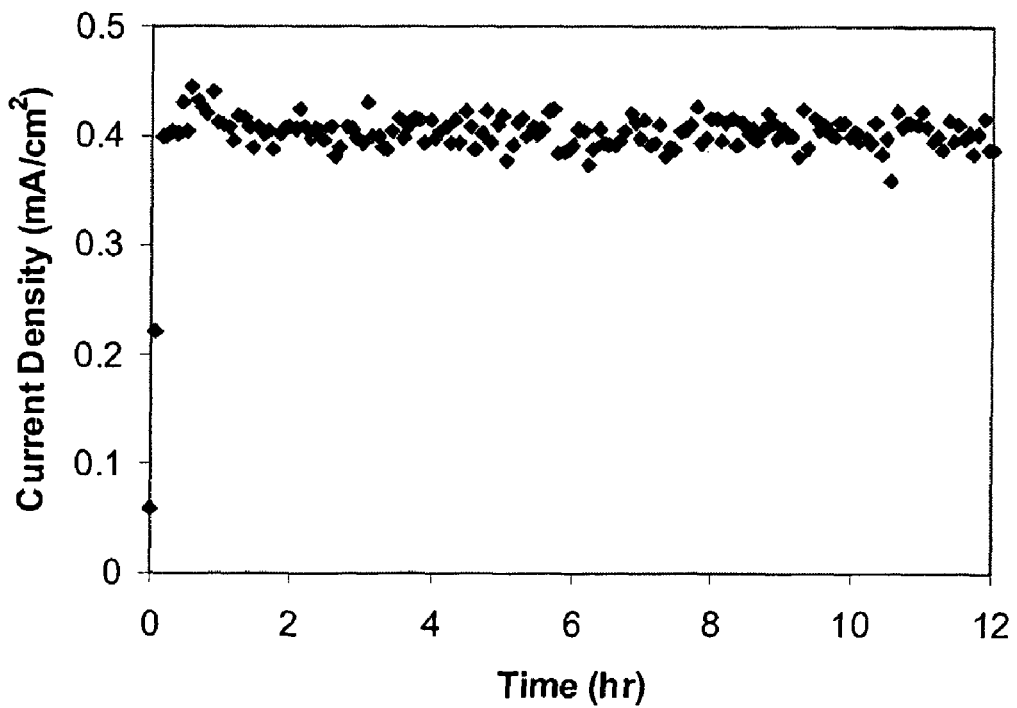
FIG. 31 is a plot that illustrates the current density-time curves at 250 mV of the direct methanol micro fuel cell operating at room temperature on 1.0 M methanol with a flow rate of 2 µL/hr.

FIG. 30 shows the polarization curves of one of the cells with a Nafion™/PSG composite membrane using 8 M methanol (100 μL/hr), and dual-layer anode catalyst at 2.5° C., 25° C., and 35° C. The performance of the direct methanol micro fuel cell was inferior at higher temperature, similar to when hydrogen was used as the fuel. The best performance was at 2.5° C. FIG. 31 shows the current density of the cell over a 12 hour period at a constant potential of 250 mV using 1.0 M methanol at a flow rate of 2 μL/hr. The cell produced a consistent current density of 0.4 mA/cm$^2$. The one-pass fuel utilization was 11.2%. It was not possible to reliably flow the fuel at lower rates.

Discussion:

The performance of the microfabricated fuel cell was improved by using a layer of Nafion™ on the glass membrane forming a composite structure. The anode catalyst was also improved by layering the anode catalyst. However, the performance of the thin-film structure was still considerably below that of the conventional, membrane assembly fuel cell. Since the electrode and membrane structures are limited by the construction methods in order to integrate them on silicon with other electronic circuits present. While the low proton conductivity of the glass can be compensated for by making it thin, the modest catalytic activity of sputter-deposited anode is a function of its thinness needed for noncatalytic titanium, needed for adhesion. It is necessary to deposit a titanium adhesion layer on top of the Pt/Ru or Pt before glass deposition because the glass does not adhere well to Pt/Ru or Pt. Although, the amount of Ti needed for adhesion has been minimized in order to keep the interface area between the catalyst and electrolyte as high as possible, further improvements would likely improve the open circuit potential and current density. For example, it can be seen in FIG. 23 that the improvements in open-circuit potential and current density are dramatic even though the increase in catalyst loading during the second layer of catalyst deposition was small (8.5 μg/cm² in comparison with the 34 μg/cm² of the first layer). One of the reasons for low catalyst utilization is the carbonaceous residue that could result from the decomposition of the sacrificial polymer at the catalyst surface used to form the microchannels. In contrast, the surface of the second layer of catalyst, which is embedded in the glass electrolyte, is free from polymer residue and has greater contact with the electrolyte leading to the increase in performance. Removing the sacrificial polymer residue from the anode catalyst surface is one of the cell improvements.

Conclusion:

Casting a layer of Nafion™ on the $SiO_2$ or PSG to form a dual-layer, or composite, PEM improved the overall device performance, particularly the long-term reliability and power. The conductivity of the PSG films was greater than the undoped low-temperature $SiO_2$. Due to this increase in conductivity, thicker PEM layers could be deposited to improve the mechanical strength of the devices while still having a lower resistance to proton transport. The thicker films also improved the open-circuit potential, leading to better overall performance.

The anode catalyst in the fuel cell was a porous, solid film sputter-deposited between the sacrificial polymer (used to form the fuel channels) and the membrane. Thus, the anode catalyst loading was limited by its porosity and not commensurate with the cathode catalyst loading. Electrochemical testing indicated that the performance of the fuel cells with composite membranes was limited by the effectiveness of the anode catalyst. Depositing a multi-layered anode was an effective way of improving the electrode and the fuel cell performance.

The fuel cells with Nafion™/PSG composite membranes and dual-layer anode catalyst showed the best performances and reliability with hydrogen or methanol as the fuel. The glass layer reduces the crossover of methanol from anode to cathode. A high concentration of methanol could be used as the fuel resulting in high energy density.

References, each of which are included herein by reference:
1. C. K. Dyer, *J. Power Sources* 106 (2002) 31-34.
2. T. j. Yen, N. Fang, X. Zhang, G. Q. Liu, and C. Y. Wang, *Applied Physics Letters* 83 (2003) 4056-4058.
3. C. Moore and P. Kohl, *ECS Proceedings Volume* 2002-6: *Microfabricated Systems and MEMS VI* (2002) 183-189.
4. C. Moore, J. Li and P. Kohl, 204th *Meeting of The Electrochemical Society*. Orlando, Fla., Oct. 12-16 (2003).
5. D. Bhusari, J. Li, C. Moore, and P. Kohl, *Electrochem. Solid-State Lett.* submitted, (2005).
6. J. Li, C. W. Moore, and P. A. Kohl, *J. Power Sources* 136 (2004) 211-215.
7. C. W. Moore, J. Li, and P. A. Kohl, *Journal of the Electrochemical Society* (Submitted).
8. M. Cappadonia, J. W. Erning, S. M. Saberi Niaki, U. Stimming, *Solid State Ionics* 77 (1995) 65-69.
9. Y. Yin, J. Fang, T. Watari, K. Tanaka, H. Kita, and K. Okamoto, *J. Mater. Chem.* 14 (2004) 1062-1070.
10. J. D. Halla, M. Mamak, D. E. Williams, and G. A. Ozin, *Adv. Funct, Mater.* 13 (2003) 133-138.
11. Q. Guo, P. N. Pintauro, H. Tang, S. O'Connor, *Journal of Membrane Science* 154 (1999) 175-181.
12. T. Kobayashi, M. Rikukawa, K. Sanui, N. Ogata, *Solid State Ionics* 106 (1998) 219-225.
13. B. Andreaus, A. J. McEvoy, G. G. Scherer, *Electrochimica Acta* 47 (2002) 2223-2229.
14. T. Romero-Castañón, L. G. Arriaga and U. Cano-Castillo, *J. Power Sources* 118 (2003) 179-182.
15. L. Schlapbach and A. Züttel, *Nature* 414 (2001) 353-358
16. Z. Shao and I. Hsing, *Electrochem. Solid-State Lett.* 5 (2002) A185-187.

EXAMPLE 3

Now having described the embodiments of the fuel cells in general, Example 3 describes some embodiments of the fuel cells and uses thereof. The following is a non-limiting illustrative example of an embodiment of the present disclosure that is described in more detail "Microfabricated Fuel Cells with Composite Proton Exchange Membranes" *Journal of the Electrochemical Society* (submitted), which is incorporated herein by reference. This example is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

Phosphorus-doped silicon dioxide (PSG) thin films with improved ionic conductivity were deposited via PECVD for application as thin film proton exchange membrane (PEM) in micro-fabricated fuel cells. More than three orders of magnitude improvement in the ionic conductivity is obtained by P doping of low temperature deposited $SiO_2$. The area resistance of 3 μm thick film of PSG is comparable to a 200 μm thick film of Nafion™. Application of these PSG films as PEM in micro-fuel cells yielded more than one order of magnitude improvement in power density compared to low-temperature, undoped $SiO_2$ membranes.

Some fuel cells use Nafion™ as the fuel cell membrane. One reason for replacing Nafion™ with low-temperature $SiO_2$ as the PEM is the incompatibility of Nafion™ (greater than 100 μm thick) with the thin film integrated processing sequence. The ionic conductivity of low-temperature $SiO_2$ was of the order of $10^{-5}$-$10^{-7}$ S/cm, which is 3-5 orders of magnitude lower than that of Nafion™, and very sensitive to the deposition temperature.[6] Some of the conductivity decrease was compensated by decreasing the thickness of the PEM by a factor of nearly 100. The low temperature $SiO_2$ membrane, therefore, is the major performance-limiting factor in the micro-fuel cells. Development of a thin film PEM with improved ionic conductivity and compatibility with the CMOS processing sequence is desirable for micro fabrication of fuel cells on Si substrates.

Alkaline-earth metal doped phosphate glasses ($P_2O_5$) are well known for their high ionic conductivity.[7,8] The mobility of protons in $P_2O_5$ doped with alkaline earth metals such as Be, Mg, Ca, Sr, Ba, La etc. has been reported to be up to $10^8$ times higher than in the silica glass ($SiO_2$).[9] The reason for this high mobility of protons in $P_2O_5$ glasses is the reduction in the strength of O—H bonding in these glasses compared to that in $SiO_2$. This is due to hydrogen bonding between the hydroxyl groups that are attached to a network-forming cation (X) such as $Si^{4+}$ or $P^{5+}$ and a counter oxygen (X—O—H . . . O—X). The extent of this reduction in the O—H bonding strength due to formation of the hydrogen bond is much higher in phosphate glasses compared to silicate glasses, giving them a higher ionic conductivity. The strength of hydrogen bonding also depends on the oxygen bonding, which is weaker in the case where a bridging oxygen exists (X—O—X) compared to the case where the oxygen is non-bridging (X—O⁻).[10] The type of network modifying cations also modifies the hydrogen bond strength, allowing further improvement in the ionic conductivity through substitution of the network-forming cation with other element, such as alkaline earth metals as mentioned before, which improve the ionic conductivity by up to 8 orders of magnitude.[9] In this example, the ionic conductivity of the low temperature PECVD $SiO_2$ has been improved through substitutional doping with phosphorus. 3-4 orders of magnitude higher ionic conductivity in the phosphorus doped $SiO_2$ (PSG) has been obtained compared to undoped glass under optimized growth conditions. Consequently, the micro-fuel cells fabricated using PSG as the PEM have shown more than one order of magnitude higher current density than undoped $SiO_2$ membranes.

Experimental:

Undoped $SiO_2$ films were deposited on crystalline Si substrates in a Unaxis RF PECVD system using semiconductor grade gas mixture of $SiH_4$ (5% $SiH_4$ in He) and $N_2O$. The PSG films used a mixture of $SiH_4$ and 0.3% $PH_3$ as the feed gas. Other baseline deposition parameters were: substrate temperature 100° C., deposition pressure 600 mTorr, RF power 400 W, $N_2O$ gas flow rate 450 sccm, and $SiH_4$ gas flow rate (with or without premixed $PH_3$) 200 sccm. The ionic conductivity of PSG films was optimized by varying the above deposition parameters from their baseline values.

The chemical composition (phosphorus concentration in the film) and local bonding environments of Si, O and P were studied with x-ray photo-electron spectroscopy (XPS), while the ionic conductivity was measured by impedance spectroscopy. The thickness of the films deposited on bare Si substrates for XPS measurements was 2-3 µm, measured with an alpha-step profilometer. For the electrochemical impedance spectroscopy measurements, Al coated Si substrates were used. The XPS spectra were recorded using a Perkin Elmer XPS system (Model PHI 1600). The ionic conductivity of the films was measured by impedance spectroscopy using EG&G PARSTAT 2263 electrochemical system with a mercury probe. The frequency range for impedance measurement was from 100 mHz to 1 MHz, with an AC signal amplitude of 10 mV. These measurements were carried out at room temperature at the relative humidity of 22%, using a 4-probe measurement. Fuel cells were fabricated on Si substrates using the sacrificial polymer process described herein. Thickness of the PSG and undoped $SiO_2$ PEM in the fuel cells was 3 µm. Humidified hydrogen at an inlet pressure if 1 psig was used as the fuel.

Figure 32:
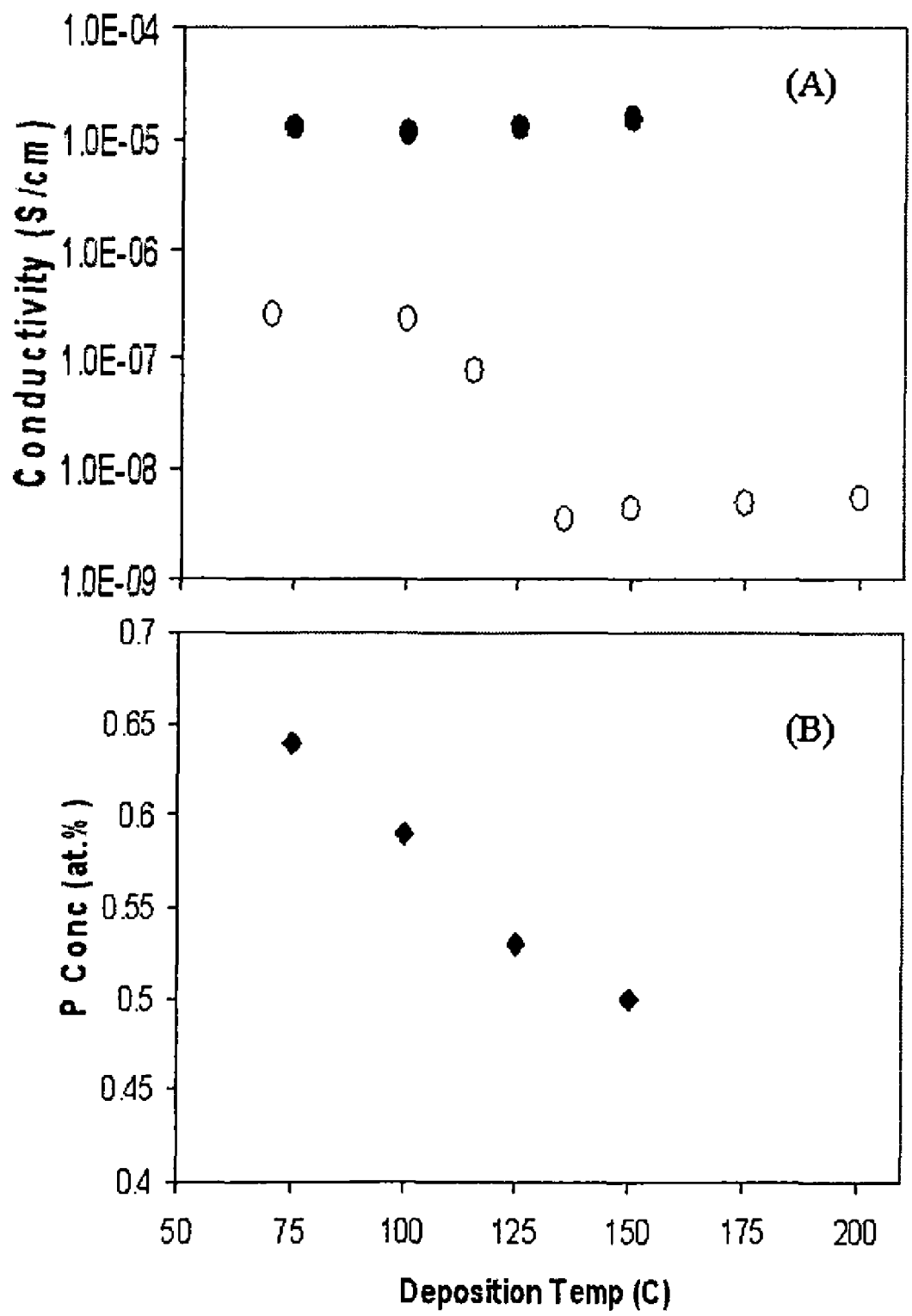
FIG. 32 is a plot that illustrates the variations in (A) ionic conductivity of P-doped (●) and undoped (O) $SiO_2$ films and (B) P concentration with deposition temperature.

Results and Discussion:

The ionic conductivity of low temperature deposited undoped $SiO_2$ is known to depend on the deposition temperature to a great extent, decreasing rapidly with increase in temperature above 100° C. FIG. 32 shows the variation in ionic conductivity and P concentration in PSG films with increase in deposition temperature from 75° C. to 150° C. For comparison, the ionic conductivity of undoped $SiO_2$ as a function of deposition temperature is also plotted in FIG. 32. FIG. 32a shows that the conductivity of undoped $SiO_2$ decreases rapidly by about 2 orders of magnitude from $10^{-7}$ S/cm to $10^{-9}$ S/cm with increase in deposition temperature from 100° C. to 130° C. However, the conductivity of PSG is higher by almost 2 orders of magnitude compared to undoped $SiO_2$. Also, the conductivity of P-doped glass is nearly independent of the deposition temperature. Interestingly, the conductivity of PSG remains nearly independent of the deposition temperature despite the reduction in its P content from 0.64 at % at 75° C. to 0.5 at % at 150° C., as can be seen in FIG. 32b. This behavior underscores the hypothesis that ionic conductivity in doped glasses is controlled more by the structural intermediate range order than the dopant concentration itself, as mentioned earlier. Further, this result is important for the application of PSG films as PEM in micro-fuel cells because depositing the glass at high-temperature is more desirable than at low-temperature owing to its higher mechanical strength and density, resulting in lower fuel cross-over. The highest ionic conductivity obtained under baseline growth conditions (given in the experimental section) at 100° C. was $1.1\times10^{-5}$ S/cm. The water content of these films has not been determined yet, but is expected to be greater than 5 wt. % based on previous results reported in the literature. The growth rate of these PSG films was 20-25 A/sec without a systematic dependence on the deposition temperature. The growth rate of the undoped $SiO_2$ films was 12-13 A/sec under otherwise identical growth conditions. Thus, in addition to the higher ionic conductivity, the PSG also has a higher deposition rate by almost a factor of two, which is beneficial for high fabrication throughput.

Further optimization of the growth parameters yielded PSG films with ionic conductivity as high as $1.2\times10^{-4}$ S/cm, an order of magnitude improvement over the baseline growth conditions. This optimized ionic conductivity in PSG obtained here is two orders of magnitude lower than that of Nafion™. Since the glass thickness is also two orders of magnitude less than Nafion™ when used as a PEM, the two will have comparable area-conductivity values ($S/cm^2$). (Area-conductivity is the figure of merit for membrane resistance and is conductivity divided by thickness or resistance times area). The optimized growth conditions included a reduced $N_2O$ flow rate of 80 sccm (from 450 sccm in baseline condition) and reduced pressure of 200 mTorr (from 600 mTorr in baseline conditions).

Figure 33:
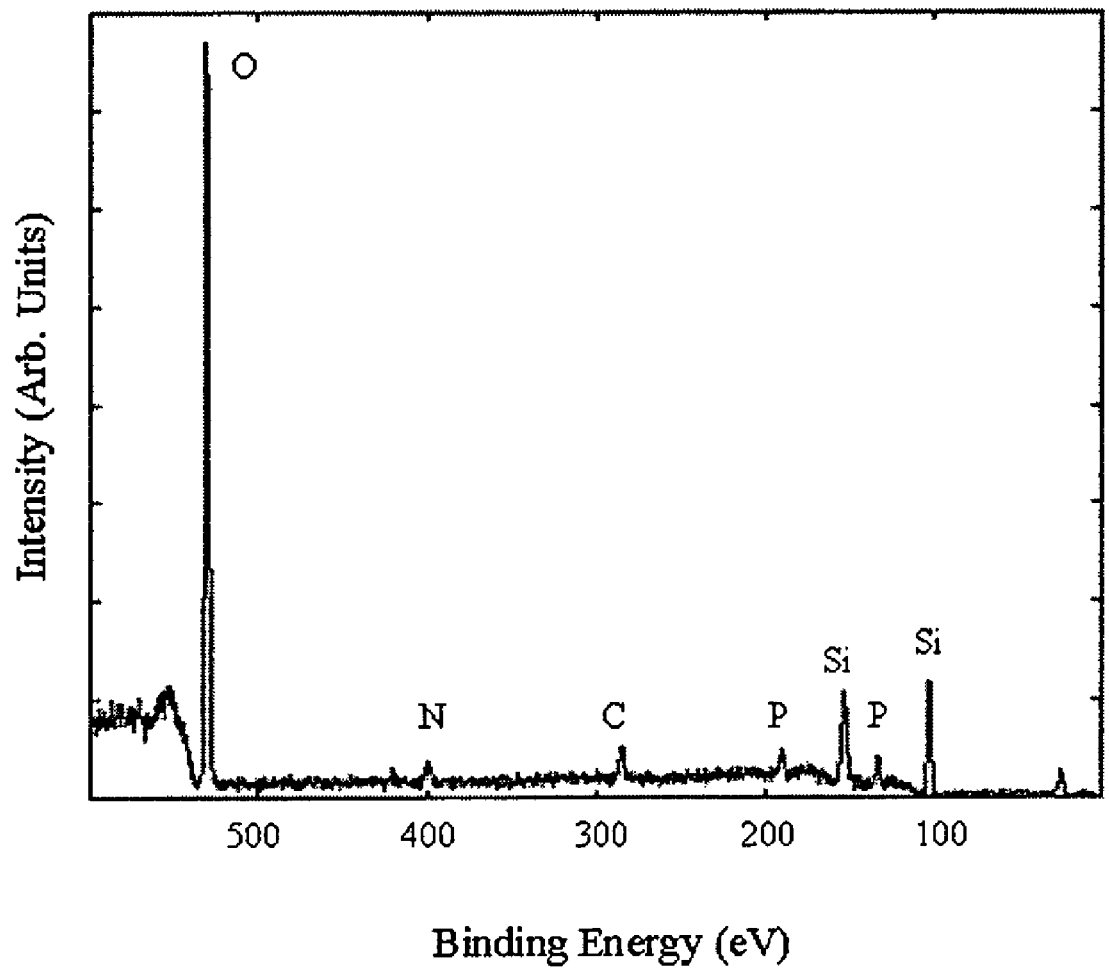
FIG. 33 is a plot that illustrates typical XPS survey scan spectrum of a PSG film.

A typical XPS survey scan spectrum for PSG film grown at 100° C. is presented in FIG. 33. In addition to the expected Si, O, and P peaks, small amounts of C and N are present as impurities, due presumably to the cross-contamination of the deposition chamber. The overall chemical composition of the films was Si 29-30 at %, O 69-70 at %, and P 0.5-0.7 at %. The Si/O ratio in the films was found to be nearly independent of the deposition temperature, while the P concentration decreases with increase in deposition temperature (see FIG. 32b).

Figure 34:
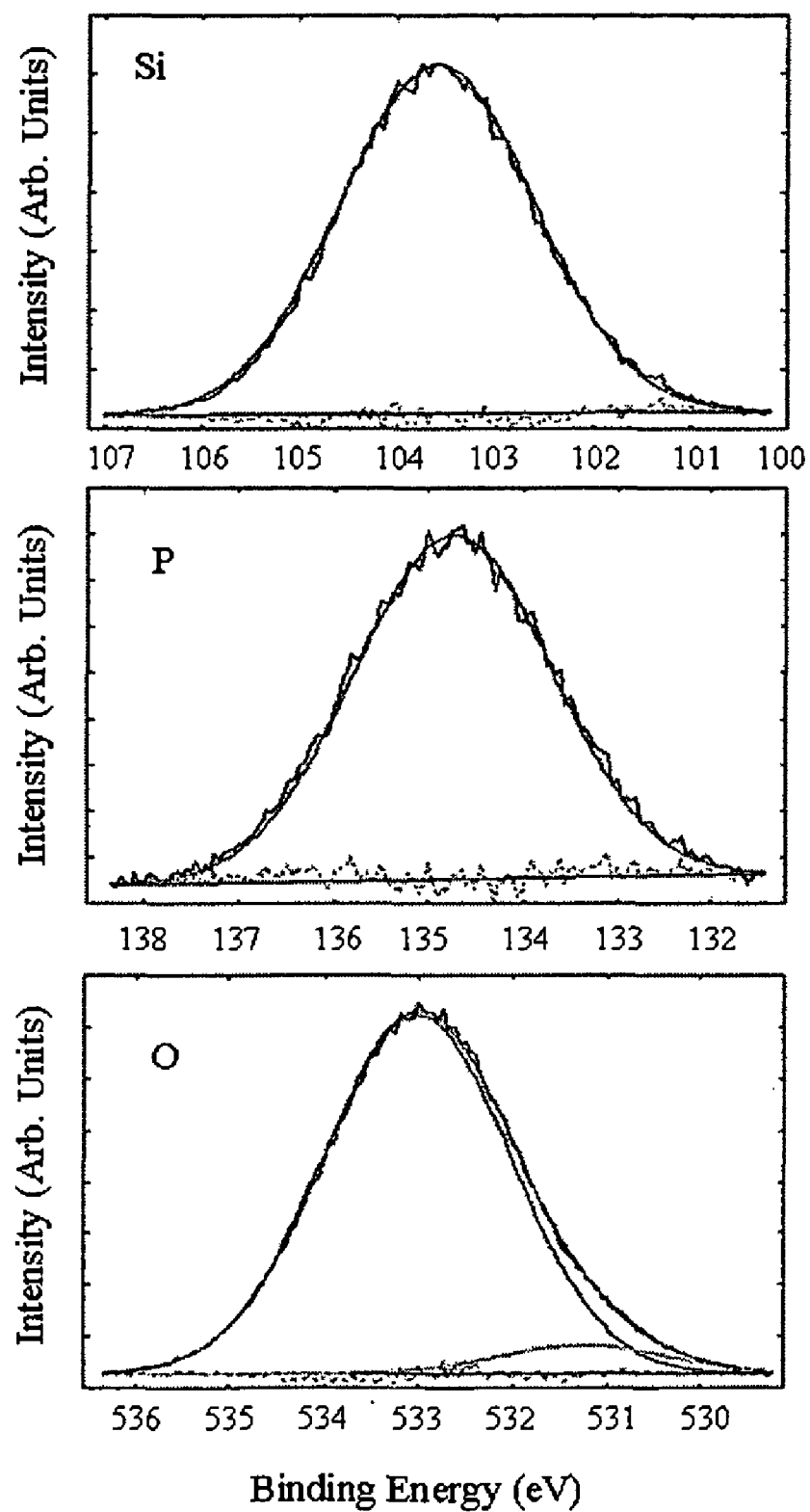
FIG. 34 is a plot that illustrates the core level XPS spectra of Si, P, and O peaks for PSG film.

The local bonding configurations of Si, O, and P were studied from their respective core level photo-electron peaks, which are presented in FIG. 34. The Si 2p peak can be seen to be fitted adequately with a single Gaussian peak centered at 103.6 eV, indicating that Si is present in the Si—O bonding only. The absence of a contribution at 99.3 eV confirms that no Si—Si bonding is present. The P 2p photo-electron peak can also be fitted adequately with a single Gaussian peak centered at 134.8 eV, again indicating that P is present in the P—O bonding only, and that P is indeed present in the substitutional state. The O 1s peak, on the other hand, displays two components at 531.2 eV and 533.1 eV, corresponding to O—P and O—Si bonding, respectively. Consistent with this result, the relative fraction of the 531.2 eV component in the 0 peak that corresponds to the O—P bonding is also found to be directly proportional to the P concentration in the film. Thus, the core level photo-electron spectra in FIG. 34 show that the PSG films grown in this example are chemically homogeneous and maintain stoichiometry even at low deposition temperatures.

Figure 35:
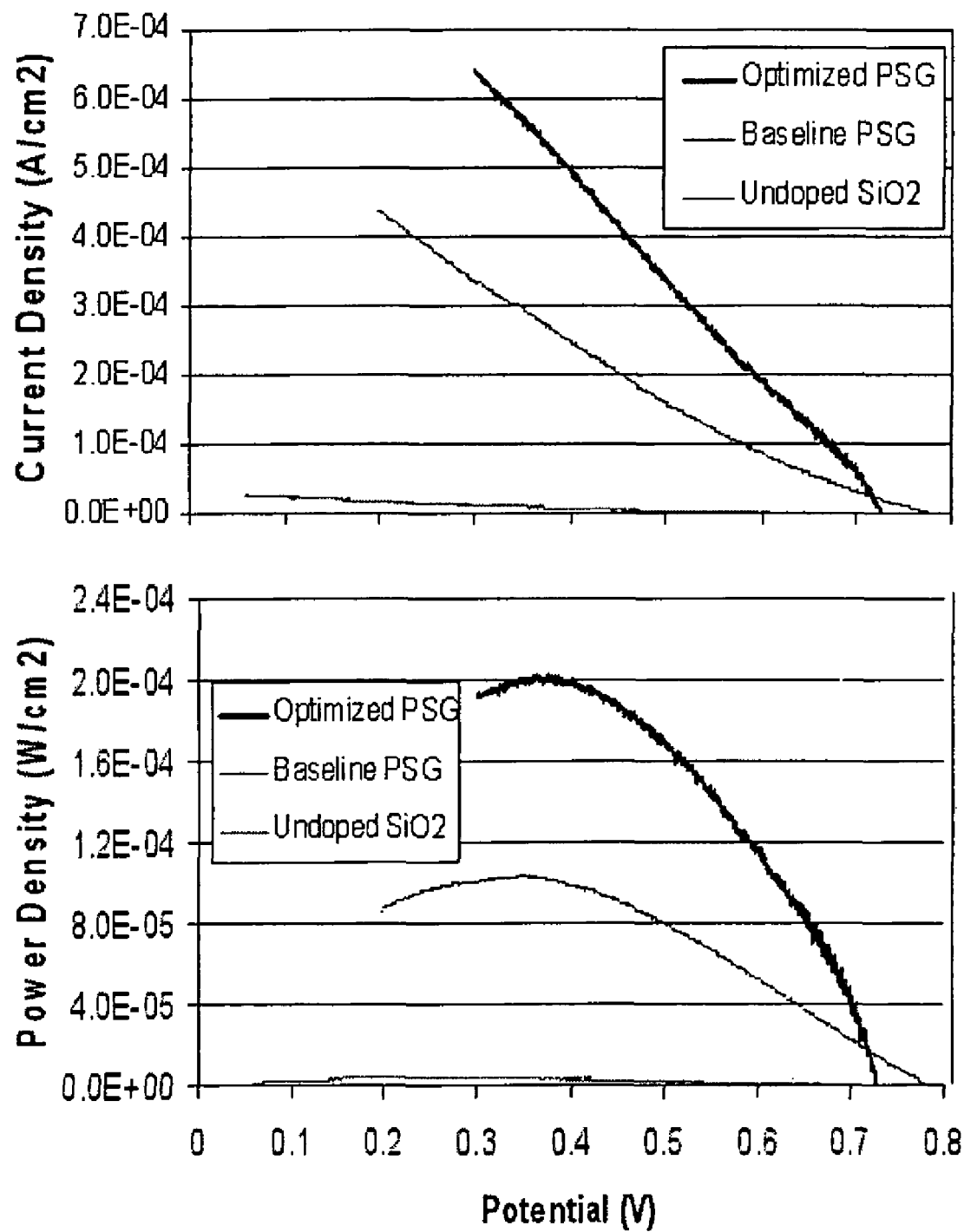
FIG. 35 is a plot that illustrates the room temperature I-V and power characteristics of fuel cells with undoped $SiO_2$ and two different PSG proton exchange membranes.

Micro-fuel cells were fabricated on Si substrates incorporating 3 µm thick PSG films as proton exchange membrane. The typical room temperature I-V characteristics of two cells with humidified hydrogen fuel, one with the membrane deposited at the baseline conditions, and another with the membrane deposited at optimized growth conditions, are shown in FIG. 35a. For comparison, the room temperature I-V characteristics of a similar cell but with an undoped $SiO_2$ membrane are also shown. The fuel cell with an undoped $SiO_2$ membrane shows an open circuit voltage of 670 mV and the highest current density of 27 µA/cm² at 60 mV. The fuel cell with a PSG membrane deposited at baseline conditions (as given in the experimental section) that yielded ionic conductivity of $1.1 \times 10^{-5}$ S/cm, on the other hand, shows an open circuit voltage of 780 mV and a current density of 437 µA/cm² at 200 mV. Thus, substitutional doping of $SiO_2$ with P under otherwise identical deposition conditions improved the open circuit voltage by more than 100 mV as well as improving the current density. The fuel cell with PSG membrane deposited under optimized growth conditions (lower $N_2O$ flow rate and lower deposition pressure than baseline conditions) yielded a film with higher ionic conductivity of $1.2 \times 10^{-4}$ S/cm, which further improved the current density by a factor of two. The power density curves of these three cells are compared in FIG. 35b. The cell with undoped $SiO_2$ membrane yielded a power density of 3.9 µW/cm², the cell with baseline PSG membrane had a power density of 104 µW/cm², and the cell with PSG grown under optimized conditions had a power density of 200 µW/cm², an improvement of a factor of 50 over undoped $SiO_2$ membrane. In order to test their lifetime, these cells have been operated at 0.4 to 0.6 V for longer than 100s of hours. The cells with a single layer PSG membrane were found to be stable (no decrease in current density) for a few 10s of hours. On the other hand, fuel cells with a composite membrane (a thin layer of Nafion™ over the PSG membrane) were found to be stable for several 100s of hours.

Conclusion:

Phosphorus doped $SiO_2$ films deposited by PECVD at low temperatures are shown to display higher ionic conductivity by three to four orders of magnitude compared to the undoped $SiO_2$ films. Furthermore, the ionic conductivity of PSG is almost independent of the deposition temperature, making them suitable candidates for micro-fabricated fuel cells. Micro-fuel cells fabricated incorporating the PSG films as proton exchange membrane have been shown to yield power density as high as 200 µW/cm² at room temperature, compared to only 4 µW/cm² yielded by the undoped $SiO_2$ membrane cells.

References, each of which are incorporated herein by reference:
1. S. J. Lee, A. Chang-Chien, S. W. Cha, R. O'Hayre, Y. I. Park, Y. Saito and F. B. Prinz, *J. Power Sources* 122, 410 (2002).
2. M. Hayase, T. Kawase and T. Hatsuzawa, *Electrochem. Solid-State Lett.* 7, A231 (2004).
3. J. Yu, P. Chenga, Z. Maa and B. Yi, *J. Power Sources* 124, 40 (2003).
4. C. Moore, J. Li and P. Kohl, *J. Electrochem. Soc.* (In Press, 2005).
5. S. Slade, S. A. Campbell, T. R. Ralph and F. C. Walsh, *J. Electrochem. Soc.* 149, 1556 (2002).
6. M. F. Ceiler Jr., P. A. Kohl and S. A. Bidstrup, *J. Electrochem. Soc.* 142, 2067 (1995).
7. Y. Abe, H. Shimakawa and L. L. Hench, *J. Non-Cryst. Solids* 51, 357 (1982).
8. M. D. Ingram, *Phys. Chem. Glasses* 28, 215 (1987).
9. Y. Abe, H. Hosona and Y. Ohta, *Phys. Rev. B* 38, 10166 (1988).
10. H. Scholze, *Glastech. Ber.* 32, 81 (1959).

It should be noted that ratios, concentrations, amounts, dimensions, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited range of about 0.1% to about 5%, but also include individual ranges (e.g., 1%, 2%, 3%, and 4%) and the sub-ranges (e.g., 0.5%, 1.1%, 2.2%, 3.3%, and 4.4%) within the indicated range.

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

The invention claimed is:

1. A fuel cell, comprising:
   a membrane comprising a membrane material selected from organic conducting materials, inorganic conducting materials, and combinations thereof, wherein the membrane includes at least a first membrane layer and a second membrane layer, wherein the first membrane layer is about 10 to 100Å thick and the second membrane layer is about 0.01 to 10 µm thick;
   a first catalyst layer disposed between the first and the second membrane layers, wherein the first catalyst layer has a thickness of about 50 to 250 Å;
   a second catalyst layer disposed on the first membrane layer on the side opposite the second membrane layer, wherein the second catalyst layer has a thickness of about 50 to 250 Å; and
   a third catalyst layer disposed on the second membrane layer on the side opposite the first membrane layer.

2. The fuel cell of claim 1, wherein the catalyst is selected from at least from one of the following: platinum, platinum/ruthenium, nickel, tellurium, titanium, alloys of each, and combinations thereof.

3. The fuel cell of claim 1, wherein the membrane has a thickness of about 0.01 to 10 µm, and wherein the membrane has an area resistivity of about 0.1 to 1000 ohms cm².

4. The fuel cell of claim 1, wherein the membrane has a permeability of about $10^{-8}$ to $10^{-14}$ g/cm*s*Torr.

5. The fuel cell of claim 1, wherein each catalyst layer has a thickness of about 50 to 250 Å.

6. The fuel cell of claim 1, wherein the membrane material is selected from at least from one of the following: silicon dioxide, doped silicon dioxide, silicon nitride, doped silicon nitride, silicon oxynitride, doped silicon oxynitride, metal oxides, doped metal oxides, metal nitrides, doped metal nitrides, metal oxynitrides, doped metal oxynitrides, and combinations thereof.

7. The fuel cell of claim 6, wherein the doped silicon dioxide is selected from at least from one of the following: phosphorous doped silicon dioxide, boron doped silicon dioxide, and combinations thereof.

8. The fuel cell of claim 1, wherein the catalyst comprises platinum/ruthenium.

9. The fuel cell of claim 1, further comprising a concentrated methanol fuel having a concentration of greater than about 5M methanol.

10. The fuel cell of claim 1, wherein the first membrane layer and the second membrane layer are different materials.

11. The fuel cell of claim 1, wherein the first membrane layer and the second membrane layer are same material.

12. A fuel cell, comprising:
a membrane comprising a membrane material selected from organic conducting materials, inorganic conducting materials, and combinations thereof, wherein the membrane has a thickness of about 0.01 to 10 μm, wherein the membrane has a permeability of about $10^{-8}$ to $10^{-14}$ g/cm*s*Torr;
wherein the membrane includes at least a first membrane layer and a second membrane layer, wherein the first membrane layer is about 10 to 100Å thick and the second membrane layer is about 0.01 to 10 μm thick;
a first catalyst layer disposed between the first and the second membrane layers, wherein the first catalyst layer has a thickness of about 50 to 250 Å;
a second catalyst layer disposed on the first membrane layer on the side opposite the second membrane layer, wherein the second catalyst layer has a thickness of about 50 to 250 Å; and
a third catalyst layer disposed on the second membrane layer on the side opposite the first membrane layer.

13. The fuel cell of claim 12, wherein the membrane has a permeability of about $10^{-9}$ to $10^{-14}$ g/cm*s*Torr.

14. The fuel cell of claim 12, wherein the membrane has a permeability of about $10^{-10}$ to $10^{-14}$ g/cm*s*Torr.

15. The fuel cell of claim 12, wherein the membrane has a permeability of about $10^{-11}$ to $10^{-14}$ g/cm*s*Torr.

16. The fuel cell of claim 12, wherein the membrane has a permeability of about $10^{-12}$ to $10^{-14}$ g/cm*s*Torr.

17. The fuel cell of claim 12, wherein the membrane has an area resistivity of about 0.1 to 1000 ohms cm².

18. The fuel cell of claim 12, wherein the membrane material is selected from at least from one of the following: silicon dioxide, doped silicon dioxide, silicon nitride, doped silicon nitride, silicon oxynitride, doped silicon oxynitride, metal oxides, doped metal oxides, metal nitrides, doped metal nitrides, metal oxynitrides, doped metal oxynitrides, and combinations thereof.

19. The fuel cell of claim 18, wherein the doped silicon dioxide is selected from at least from one of the following: phosphorous doped silicon dioxide, boron doped silicon dioxide, and combinations thereof.

20. The fuel cell of claim 12, further comprising a concentrated methanol fuel having a concentration of greater than about 3M methanol.

21. A fuel cell, comprising:
a membrane comprising a membrane material selected from at least from one of the following: organic conducting materials, inorganic conducting materials, and combinations thereof, wherein the membrane includes at least a first membrane layer and a second membrane layer, wherein the first membrane layer is about 10 to 100Å thick and the second membrane layer is about 0.01 to 10 μm thick;
a first catalyst layer disposed between the first and the second membrane layers, wherein the first catalyst layer has a thickness of about 50 to 250 Å;
a second catalyst layer disposed on the first membrane layer on the side opposite the second membrane layer, wherein the second catalyst layer has a thickness of about 50 to 250 Å;
a third catalyst layer disposed on the second membrane layer on the side opposite the first membrane layer; and
a concentrated methanol fuel having a concentration of greater than about 3M methanol.

22. The fuel cell of claim 21, wherein the concentration of the methanol fuel is greater than 5M methanol.

23. The fuel cell of claim 21, wherein the concentration of the methanol fuel is greater than 8M methanol.

24. The fuel cell of claim 21, wherein the concentration of the methanol fuel is greater than 10M methanol.

25. The fuel cell of claim 21, wherein the membrane has a permeability of about $10^{-8}$ to $10^{-14}$ g/cm*s*Torr.

26. The fuel cell of claim 21, wherein the membrane has an area resistivity of about 0.1 to 1000 ohms cm².

* * * * *

UNITED STATES PATENT AND TRADEMARK OFFICE
CERTIFICATE OF CORRECTION

| | | |
|---|---|---|
| PATENT NO. | : 7,875,404 B2 | Page 1 of 1 |
| APPLICATION NO. | : 11/596607 | |
| DATED | : January 25, 2011 | |
| INVENTOR(S) | : Moore et al. | |

It is certified that error appears in the above-identified patent and that said Letters Patent is hereby corrected as shown below:

Column 1, lines 12-19, the paragraph under "STATEMENT REGARDING FEDERALLY SPONSORED RESEARCH OR DEVELOPMENT" should read:

This invention was made with Government support under Agreement No. F33615-01-1-2173, awarded by the United States Air Force. The Government has certain rights in this invention.

Signed and Sealed this
Nineteenth Day of April, 2011

David J. Kappos
*Director of the United States Patent and Trademark Office*